(12) United States Patent
Huang et al.

(10) Patent No.: US 11,553,375 B2
(45) Date of Patent: Jan. 10, 2023

(54) METHOD AND APPARATUS FOR SIGNALING FOR BEAM INDICATION IN A WIRELESS COMMUNICATION SYSTEM

(71) Applicant: ASUSTek Computer Inc., Taipei (TW)

(72) Inventors: Chun-Wei Huang, Taipei (TW); Yi-Hsuan Kung, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/831,389

(22) Filed: Jun. 2, 2022

(65) Prior Publication Data

US 2022/0394548 A1 Dec. 8, 2022

Related U.S. Application Data

(60) Provisional application No. 63/208,435, filed on Jun. 8, 2021.

(51) Int. Cl.
*H04W 28/06* (2009.01)
*H04W 72/04* (2009.01)

(52) U.S. Cl.
CPC ......... *H04W 28/06* (2013.01); *H04W 72/042* (2013.01); *H04W 72/046* (2013.01); *H04W 72/048* (2013.01)

(58) Field of Classification Search
CPC . H04W 28/06; H04W 72/042; H04W 72/046; H04W 72/048
See application file for complete search history.

(56) References Cited

U.S. PATENT DOCUMENTS

| | | | | |
|---|---|---|---|---|
| 2020/0196383 | A1* | 6/2020 | Tsai | H04L 5/0092 |
| 2020/0267734 | A1* | 8/2020 | Khoshnevisan | H04W 76/11 |
| 2021/0014931 | A1* | 1/2021 | Noh | H04W 72/042 |
| 2021/0036822 | A1* | 2/2021 | Lyu | H04L 5/006 |
| 2021/0243763 | A1* | 8/2021 | Zhou | H04L 5/0094 |

FOREIGN PATENT DOCUMENTS

CN 113597779 A 11/2021

* cited by examiner

*Primary Examiner* — Jaison Joseph
(74) *Attorney, Agent, or Firm* — Skaar Ulbrich Macari, P.A.

(57) ABSTRACT

Methods and apparatuses are provided for ensuring, for a unified TCI framework, a MAC CE format for associating code-point of a TCI field, and a TCI state for DL/UL beam indications. A UE can receive a MAC CE for associating at least one TCI state with at least one code-point of a TCI field in a DCI, wherein the MAC CE comprises at least a first octet including a first TCI state ID field associated with a first TCI state and a first field indicating DL or UL for the first TCI state, a second octet including a second TCI state ID field associated with a second TCI state and a second field indicating DL or UL for the second TCI state, and a third octet including a third field for the UE to determine whether the first TCI state and the second TCI state are associated with a same code-point or different code-points of the TCI field.

20 Claims, 27 Drawing Sheets

| CORE SET Pool ID | Serving Cell ID | | | BWP ID | | | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |
| ... | | | | | | | | |
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

FIG. 5 (Prior Art)

| R | Serving Cell ID | BWP ID | Oct 1 |
|---|---|---|---|
| $C_0$ | TCI state $ID_{0,1}$ | | Oct 2 |
| R | TCI state $ID_{0,2}$ | | Oct 3 (Optional) |
| ... | | | |
| $C_N$ | TCI state $ID_{N,1}$ | | Oct M-1 |
| R | TCI state $ID_{N,2}$ | | Oct M (Optional) |

FIG. 6 (Prior Art)

| CORESET ID (optional) | Serving Cell ID | BWP ID |
|---|---|---|
| C0 | DL TCI state $ID_{0,1}$ | |
| R | DL TCI state $ID_{0,2}$ (optional) | |
| C1 | DL TCI state $ID_{1,1}$ | |
| R | DL TCI state $ID_{0,2}$ (optional) | |
| ... | | |
| Cn | DL TCI state $ID_{n,1}$ | |
| R | DL TCI state $ID_{n,2}$ (optional) | |

FIG. 25

| CORESET POOL ID | Serving cell index (e.g., CC ID) | | BWP ID |
|---|---|---|---|
| N3 | N2 | N1 | N0 |
| N7 | N6 | N5 | N4 |
| D/U | TCI state $ID_{0,1}$ | | |
| D/U | TCI state $ID_{1,1}$ | | |
| D/U | TCI state $ID_{1,2}$ | | |
| D/U | TCI state $ID_{1,3}$ | | |
| D/U | TCI state $ID_{1,4}$ | | |
| D/U | TCI state $ID_{2,1}$ | | |

FIG. 26

METHOD AND APPARATUS FOR SIGNALING FOR BEAM INDICATION IN A WIRELESS COMMUNICATION SYSTEM

CROSS-REFERENCE TO RELATED APPLICATIONS

The present application claims priority to and the benefit of U.S. Provisional Patent Application Ser. No. 63/208,435, filed Jun. 8, 2021, which is fully incorporated herein by reference.

FIELD

This disclosure generally relates to wireless communication networks and, more particularly, to a method and apparatus for signaling for beam indication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for ensuring, for a unified Transmission Configuration Indicator (TCI) framework, a Medium Access Control (MAC) Control Element (CE) format for associating code-point of a TCI field, and a TCI state for separate Downlink (DL)/Uplink (UL) TCI beam indication.

In various embodiments, with this and other concepts, systems, and methods of the present invention, a method for a UE in a wireless communication system comprises receiving a MAC CE for associating at least one TCI state with at least one code-point of a TCI field in a DCI, wherein the MAC CE comprises at least: a first octet including a first TCI state ID field associated with a first TCI state and a first field indicating DL or UL for the first TCI state, a second octet including a second TCI state ID field associated with a second TCI state and a second field indicating DL or UL for the second TCI state, a third octet including a third field for the UE to determine whether the first TCI state and the second TCI state are associated with a same code-point or different code-points of the TCI field, with the method further including receiving the DCI with a specific code-point of the TCI field, and determining one or more TCI states associated with the specific code-point based on the MAC CE.

In various embodiments, with this and other concepts, systems, and methods of the present invention, a method for a UE in a wireless communication system comprises receiving a message for associating one or more TCI states and one or more code-point(s) of a TCI field, wherein the message comprises a first number of bits for indicating first information corresponding to the one or more TCI states and a second number of bits for indicating second information corresponding to the one or more code-point(s) of the TCI field, and wherein the first information at least indicates either DL or UL for one TCI state and the second information at least indicates a number of TCI state(s) for one code-point of the TCI field, and upon receiving a DCI with code-point of a TCI field indicative of DL and UL, updating a beam for a plurality of DL UE-specific signals and channels and updating the beam for a plurality of UL UE-specific signals and channels.

BRIEF DESCRIPTION OF THE DRAWINGS

FIG. 5 is a reproduction of FIG. 6.1.3.14-1 of TS 38.321 Rel-16: TCI States Activation/Deactivation for UE-specific PDSCH MAC CE.

FIG. 6 is a reproduction of FIG. 6.1.3.24-1 of TS 38.321 Rel-16 Enhanced TCI States Activation/Deactivation for UE-specific PDSCH MAC CE.

FIG. 25 is an example of a first MAC CE containing a serving cell ID indicating the associated serving cell for the indicated TCI states, in accordance with embodiments of the present invention.

FIG. 26 is an example wherein D/Ux field(s) could correspond to the first portion of information, Nx field(s) could correspond to the second portion of information, and N0 could be 0 (e.g., number of TCI state IDs associated with the code-point 0 is 1 (TCI state ID0,1)), in accordance with embodiments of the present invention.

DETAILED DESCRIPTION

Figure 1:
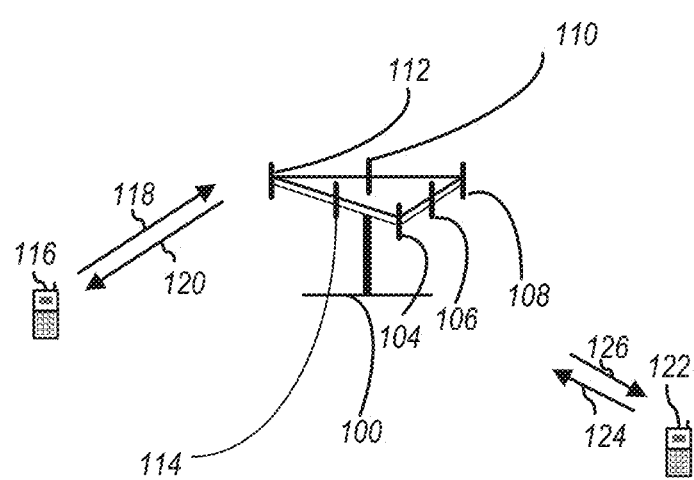
FIG. 1 shows a diagram of a wireless communication system, in accordance with embodiments of the present invention.

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2

UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.321 V16.4.0 (2021 March) 3rd Generation Partnership Project; Technical Specification Group Radio Access Network; NR; Medium Access Control (MAC) protocol specification (Release 16); [2] 3GPP TS 38.212 V16.5.0 (2021 March) 3rd Generation Partnership Project; Technical Specification Group Radio Access Network; NR; Multiplexing and channel coding (Release 16); [3] 3GPP TS 38.213 V16.5.0 (2021 March) 3rd Generation Partnership Project; Technical Specification Group Radio Access Network; NR; Physical layer procedures for control (Release 16); [4] 3GPP TS 38.214 V16.5.0 (2021 March) 3rd Generation Partnership Project; Technical Specification Group Radio Access Network; NR; Physical layer procedures for data (Release 16); [5] RP-193133 New WID: Further enhancements on MIMO for NR, Samsung; [6] 3GPP TS 38.331 V16.4.1 (2021 March) 3rd Generation Partnership Project; Technical Specification Group Radio Access Network; NR; Radio Resource Control (RRC) protocol specification (Release 16); [7] Final Report of 3GPP TSG RAN WG1 #102-e v1.0.0, (Online meeting, 17-28 Aug. 2020); [8] Final Report of 3GPP TSG RAN WG1 #103-e v1.0.0, (Online meeting, 26 Oct.-13 Nov. 2020); [9] Draft Report of 3GPP TSG RAN WG1 #104-e v0.3.0, (Online meeting, 25 Jan.-5 Feb. 2021); [10]Chairman's Notes RAN1#104b-e final (https://www.3gpp.org/ftp/tsg_ran/WG1_RL1/TSGR1_104b-e/Inbox/Chair_notes); [11] Chair's Notes RAN1#105-e v012 (https://www.3gpp.org/ftp/tsg_ran/WG1_RL1/TSGR1_105-e/Inbox/Chair_notes/Chair's%20Notes%2ORAN1%23105-e%20v012.zip); [12] R1-2102675, Enhancement on multi-beam operation, MediaTek Inc.; [13] R1-2105291, Multi-beam enhancements, Samsung; and [14] R1-2105353, Enhancement on multi-beam operation, MediaTek Inc. The standards and documents listed above are hereby expressly and fully incorporated herein by reference in their entirety.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
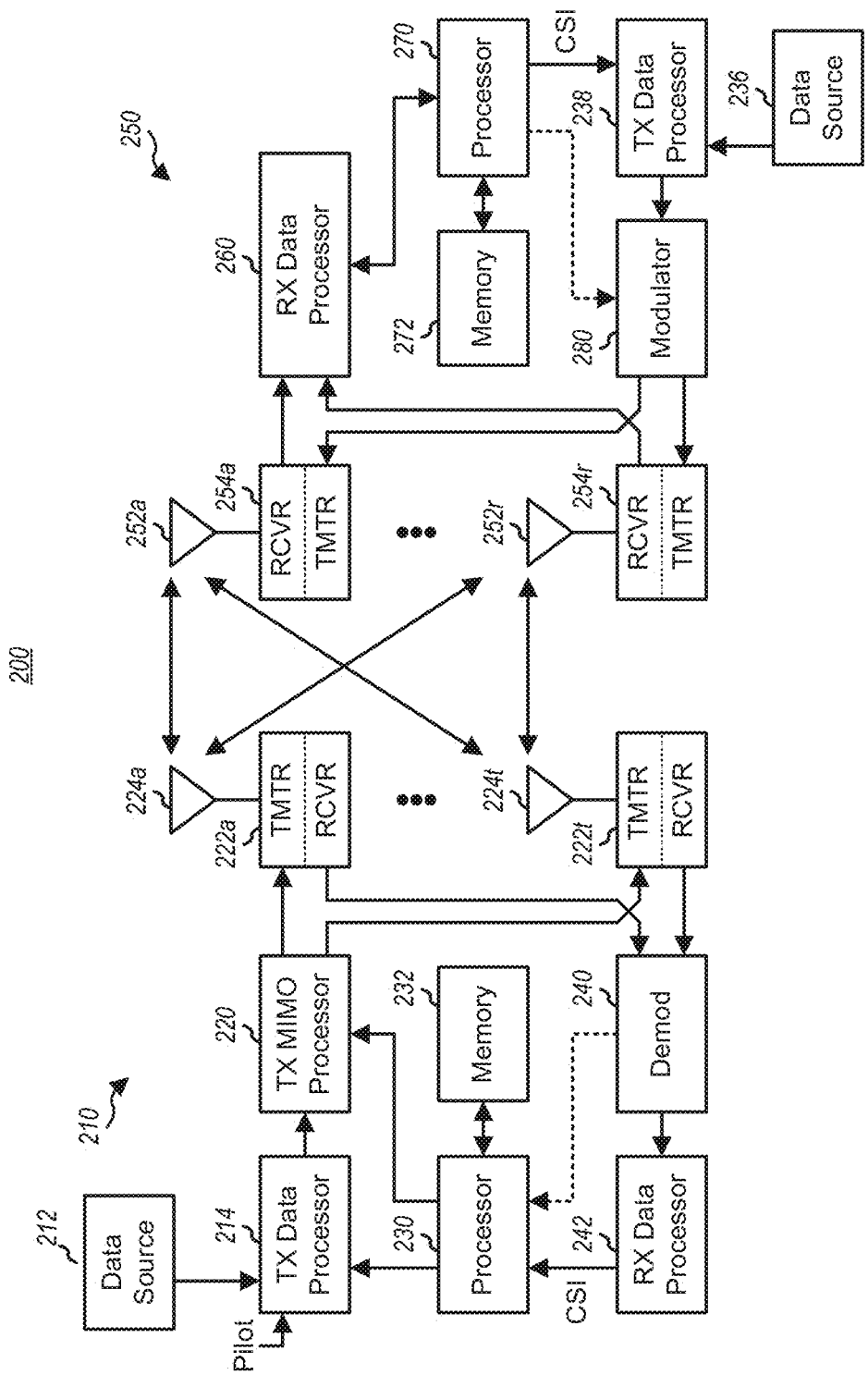
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
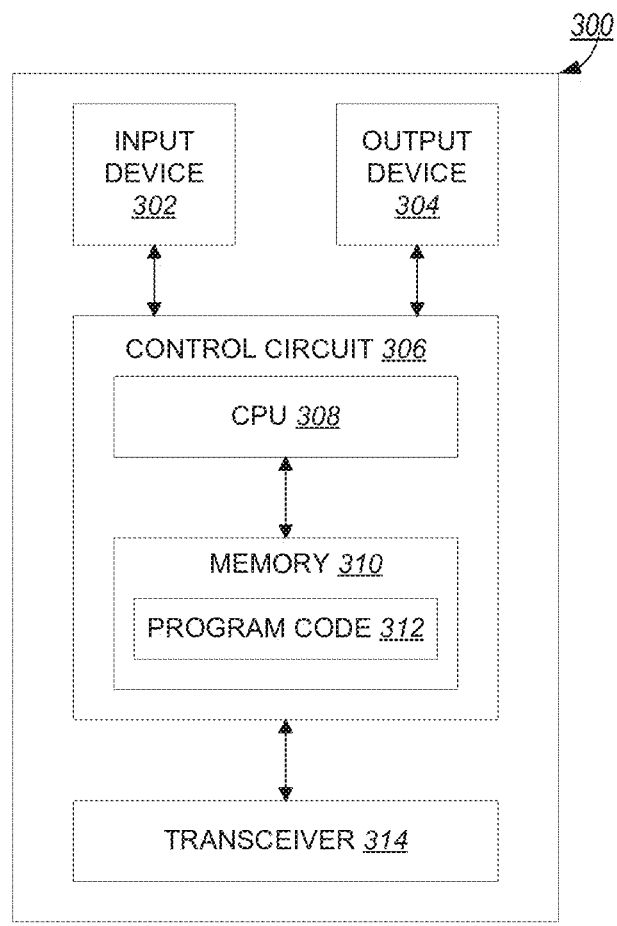
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
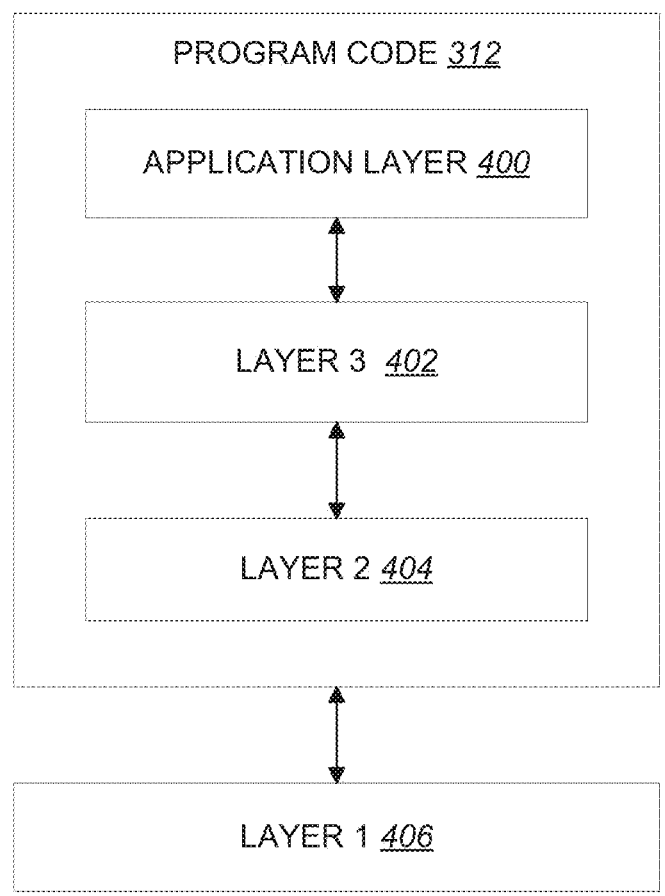
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention may be combined logically, reasonably, and properly to form a specific method.

Any sentence, paragraph, (sub-)bullet, point, action, or claim described in each of the following invention may be implemented independently and separately to form a specific method. Dependency, e.g., "based on", "more specifically", etc., in the following invention is just one possible embodiment which would not restrict the specific method.

Some related text in NR are quoted below from TS 38.321 Rel-16

\*\*\*\*\*\*\*\*\*\*\*\*\*\*\*\*\*\*\*\*\*\*\*\*\*\*\*\*\*\*\*\*\*\*\*\* QUOTATION [1] START \*\*\*\*\*\*\*\*\*\*\*\*\*\*\*\*\*\*\*\*\*\*\*\*\*\*\*\*\*\*\*\*\*\*\*\*

5.18.4 Activation/Deactivation of UE-Specific PDSCH TCI State

The network may activate and deactivate the configured TCI states for PDSCH of a Serving Cell or a set of Serving Cells configured in simultaneousTCI-UpdateList1 or simultaneousTCI-UpdateList2 by sending the TCI States Activation/Deactivation for UE-specific PDSCH MAC CE described in clause 6.1.3.14. The network may activate and deactivate the configured TCI states for a codepoint of the DCI Transmission configuration indication field as specified in TS 38.212 [9] for PDSCH of a Serving Cell by sending the Enhanced TCI States Activation/Deactivation for UE-specific PDSCH MAC CE described in clause 6.1.3.24. The configured TCI states for PDSCH are initially deactivated upon configuration and after a handover.

6.1.3.14 TCI States Activation/Deactivation for UE-Specific PDSCH MAC CE

The TCI States Activation/Deactivation for UE-specific PDSCH MAC CE is identified by a MAC subheader with LCID as specified in Table 6.2.1-1. It has a variable size consisting of following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;

$T_i$: If there is a TCI state with TCI-StateId i as specified in TS 38.331 [5], this field indicates the activation/deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field, as specified in TS 38.214 [7]. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8;

CORESET Pool ID: This field indicates that mapping between the activated TCI states and the codepoint of the DCI Transmission Configuration Indication set by field $T_i$ is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORSET Pool ID field shall be ignored when receiving the MAC CE.

FIG. 5 is a reproduction of FIG. 6.1.3.14-1 of TS 38.321 Rd-16: TCI States Activation/Deactivation for UE-specific PDSCH MAC CE.

6.1.3.24 Enhanced TCI States Activation/Deactivation for UE-Specific PDSCH MAC CE The Enhanced TCI States Activation/Deactivation for UE-specific PDSCH MAC CE is identified by a MAC PDU subheader with eLCID as specified in Table 6.2.1-1b. It has a variable size consisting of following fields:

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

BWP ID: This field indicates a DL BWP for which the MAC CE applies as the codepoint of the DCI bandwidth part indicator field as specified in TS 38.212 [9]. The length of the BWP ID field is 2 bits;

$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;

TCI state $ID_{i,j}$: This field indicates the TCI state identified by TCI-StateId as specified in TS 38.331 [5], where i is the index of the codepoint of the DCI Transmission configuration indication field as specified in TS 38.212 [9] and TCI state $ID_{i,j}$ denotes the $j^{th}$ TCI state indicated for the $i^{th}$ codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $ID_{i,2}$ is optional based on the indication of the $C_i$ field. The maximum number of activated TCI codepoint is 8 and the maximum number of TCI states mapped to a TCI codepoint is 2.

FIG. 6 is a reproduction of FIG. 6.1.3.24-1 of TS 38.321 Rd-16: Enhanced TCI States Activation/Deactivation for UE-specific PDSCH MAC CE.

*********************************** QUOTATION [1] END*******************************

Some related texts in NR are quoted below from TS 38.212 Rel-16 [2].

*************************** QUOTATION [2] START******************************

7.3.1 DCI Formats

The DCI formats defined in table 7.3.1-1 are supported.

TABLE 7.3.1-1

DCI formats

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |

7.3.1.2 DCI Formats for Scheduling of PDSCH 7.3.1.2.2 Format 1_1

DCI format 1_1 is used for the scheduling of PDSCH in one cell.

The following information is transmitted by means of the DCI format 1_1 with CRC scrambled by C-RNTI or CS-RNTI or MCS-C-RNTI:

Identifier for DCI formats—1 bits
   The value of this bit field is always set to 1, indicating a DL DCI format Carrier indicator—0 or 3 bits as defined in Clause 10.1 of [5, TS 38.213].

Bandwidth part indicator—0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where

. . .

Frequency domain resource assignment—number of bits determined by the following, where $N_{RB}^{DL,BWP}$ s the size of the active DL bandwidth part:

. . .

Time domain resource assignment—0, 1, 2, 3, or 4 bits as defined in Clause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.

. . .

HARQ process number—4 bits

. . .

PUCCH resource indicator—3 bits as defined in Clause 9.2.3 of [5, TS 38.213]

PDSCH-to-HARQ_feedback timing indicator—0, 1, 2, or 3 bits as defined in Clause 9.2.3 of [5, TS 38.213]. The bitwidth for this field is determined as $\lceil \log_2(I) \rceil$ bits, where I is the number of entries in the higher layer parameter dl-DataToUL-ACK.

. . .

Transmission configuration indication—0 bit if higher layer parameter tci-PresentInDCI is not enabled; otherwise 3 bits as defined in Clause 5.1.5 of [6, TS38.214].

******************************** QUOTATION [2] END ******************************

Some related texts in NR are quoted below from TS 38.213 Rel-16 [3].

*************************** QUOTATION [3] START******************************

10.2 PDCCH Validation for DL SPS and UL Grant Type 2

A UE validates, for scheduling activation or scheduling release, a DL SPS assignment PDCCH or a configured UL grant Type 2 PDCCH if the CRC of a corresponding DCI format is scrambled with a CS-RNTI provided by cs-RNTI, and the new data indicator field in the DCI format for the enabled transport block is set to '0', and the DFI flag field, if present, in the DCI format is set to '0', and if validation is for scheduling activation and if the PDSCH-to-HARQ_feedback timing indicator field in the DCI format is present, the PDSCH-to-HARQ_feedback timing indicator field does not provide an inapplicable value from dl-DataToUL-ACK-r16.

If a UE is provided a single configuration for UL grant Type 2 PUSCH or for SPS PDSCH, validation of the DCI format is achieved if all fields for the DCI format are set according to Table 10.2-1 or Table 10.2-2.

Validation of the DCI format is achieved if all fields for the DCI format are set according to Table 10.2-4.

If validation is achieved, the UE considers the information in the DCI format as a valid activation or valid release of DL SPS or configured UL grant Type 2. If validation is not achieved, the UE discards all the information in the DCI format.

TABLE 10.2-1

Special fields for single DL SPS or single UL grant Type 2 scheduling activation PDCCH validation when a UE is provided a single SPS PDSCH or UL grant Type 2 configuration in the active DL/UL BWP of the scheduled cell

| | DCI format 0_0/0_1/0_2 | DCI format 1_0/1_2 | DCI format 1_1 |
|---|---|---|---|
| HARQ process number | set to all '0's | set to all '0's | set to all '0's |
| Redundancy version | set to all '0's | set to all '0's | For the enabled transport block: set to all '0's |

TABLE 10.2-2

Special fields for single DL SPS or single UL grant Type 2 scheduling release PDCCH validation when a UE is provided a single SPS PDSCH or UL grant Type 2 configuration in the active DL/UL BWP of the scheduled cell

| | DCI format 0_0/0_1/0_2 | DCI format 1_0/1_1/1_2 |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with $\mu = 1$ set to all '1's, otherwise | set to all '0's for FDRA Type 0 or for dynamicSwitch set to all '1's for FDRA Type 1 |

A UE is expected to provide HARQ-ACK information in response to a SPS PDSCH release after N symbols from the last symbol of a PDCCH providing the SPS PDSCH release. If processingType2Enabled of PDSCH-ServingCellConfig is set to enable for the serving cell with the PDCCH providing the SPS PDSCH release, N=5 for $\mu=0$, N=5.5 for $\mu=1$, and N=11 for $\mu=2$, otherwise, N=10 for $\mu=0$, N=12 for $\mu=1$, N=22 for $\mu=2$, and N=25 for $\mu=3$, wherein $\mu$ corresponds to the smallest SCS configuration between the SCS configuration of the PDCCH providing the SPS PDSCH release and the SCS configuration of a PUCCH carrying the HARQ-ACK information in response to a SPS PDSCH release.

\*\*\*\*\*\*\*\*\*\*\*\*\*\*\*\*\*\*\*\*\*\*\*\*\*\*\*\*\*\*\*\*\*\*\*\* QUOTATION [3] END \*\*\*\*\*\*\*\*\*\*\*\*\*\*\*\*\*\*\*\*\*\*\*\*\*\*\*\*\*\*\*\*\*\*\*\*

Some related texts in NR are quoted below from TS 38.214 Rel-16 [4].

\*\*\*\*\*\*\*\*\*\*\*\*\*\*\*\*\*\*\*\*\*\*\*\*\*\*\*\*\*\*\*\*\*\*\*\* QUOTATION [4] START\*\*\*\*\*\*\*\*\*\*\*\*\*\*\*\*\*\*\*\*\*\*\*\*\*\*\*\*\*\*\*\*\*\*\*\*

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'typeA': {Doppler shift, Doppler spread, average delay, delay spread}

'typeB': {Doppler shift, Doppler spread}

'typeC': {Doppler shift, average delay}

'typeD': {Spatial Rx parameter}

The UE receives an activation command, as described in clause 6.1.3.14 of [10, TS 38.321], used to map up to 8 TCI states to the codepoints of the DCI field 'Transmission Configuration Indication' in one CC/DL BWP or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

When a UE supports two TCI states in a codepoint of the DCI field 'Transmission Configuration Indication' the UE may receive an activation command, as described in clause 6.1.3.24 of [10, TS 38.321], the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, as described in clause 6.1.3.14 and 6.1.3.24 of [10, TS38.321], only the first S activated codepoints are applied for DCI format 1_2.

When the UE would transmit a PUCCH with HARQ-ACK information in slot n corresponding to the PDSCH carrying the activation command, the indicated mapping between TCI states and codepoints of the DCI field 'Transmission Configuration Indication' should be applied starting from the first slot that is after slot $n+3N_{slot}^{subframe,\mu}$ where $\mu$ is the SCS configuration for the PUCCH. If tci-PresentInDCI is set to 'enabled' or tci-PresentDCI-1-2 is configured for the CORESET scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the SS/PBCH block determined in the initial access procedure with respect to qcl-Type set to 'typeA', and when applicable, also with respect to qcl-Type set to 'typeD'.

\*\*\*\*\*\*\*\*\*\*\*\*\*\*\*\*\*\*\*\*\*\*\*\*\*\*\*\*\*\*\*\*\*\*\* QUOTATION [4] END \*\*\*\*\*\*\*\*\*\*\*\*\*\*\*\*\*\*\*\*\*\*\*\*\*\*\*\*\*\*\*\*\*\*

Some contents related to Rel-17 FeMIMO work item are quoted below [5].

\*\*\*\*\*\*\*\*\*\*\*\*\*\*\*\*\*\*\*\*\*\*\*\*\*\*\*\*\*\*\*\*\*\* QUOTATION [5] START\*\*\*\*\*\*\*\*\*\*\*\*\*\*\*\*\*\*\*\*\*\*\*\*\*\*\*\*\*\*\*\*\*\*\*\*

3 Justification

The Rel-15 NR includes a number of MIMO features that facilitate utilization of a large number of antenna elements at base station for both sub-6 GHz and over-6 GHz frequency bands. The Rel-16 NR enhances Rel-15 by introducing enhanced Type II codebook with DFT-based compression, support for multi-TRP transmission especially for eMBB and PDSCH, enhancements for multi-beam operation including reduction in latency and/or overhead for various reconfigurations (QCL-related, measurements), SCell beam failure recovery (BFR), and L1-SINR. In addition, low PAPR reference signals and features enabling uplink full-power transmission are also introduced.

As NR is in the process of commercialization, various aspects that require further enhancements can be identified from real deployment scenarios. Such aspects include the following. First, while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. This also includes reducing the occurrence of beam failure events. Second, while enhancements for enabling panel-specific UL beam selection was investigated in Rel-16, there was not sufficient time to complete the work. This offers some potential for increasing UL coverage including, e.g. mitigating the UL coverage loss due to meeting the MPE (maximum permissible exposure) regulation. It is noted that MPE issue may occur on all transmit beams from the panel, therefore, a solution for MPE mitigation may only be performed per panel basis to meet the regulatory requirement for scenarios of interest.

Third, channels other than PDSCH can benefit from multi-TRP transmission (as well as multi-panel reception) which also includes multi-TRP for inter-cell operations. This includes some new use cases for multi-TRP such as UL dense deployment within a macro-cell and/or heterogeneous-network-type deployment scenarios. Fourth, due to the use of SRS for various scenarios, SRS can and should be further enhanced at least for capacity and coverage. Fifth, although Rel-16 supports enhanced Type II CSI, some room for further enhancements can be perceived. This includes CSI designed for multi-TRP/panel for NC-JT use case and the utilization of partial reciprocity on channel statistics such as angle(s) and delay(s) mainly targeting FR1 FDD deployments.

4 Objective 4.1 Objective of SI or Core Part WI or Testing Part WI

The work item aims to specify the further enhancements identified for NR MIMO. The detailed objectives are as follows:

Extend specification support in the following areas [RAN1]
1. Enhancement on multi-beam operation, mainly targeting FR2 while also applicable to FR1:
    a. Identify and specify features to facilitate more efficient (lower latency and overhead) DL/UL beam management to support higher intra- and L1/L2-centric inter-cell mobility and/or a larger number of configured TCI states:
        i. Common beam for data and control transmission/reception for DL and UL, especially for intra-band CA
        ii. Unified TCI framework for DL and UL beam indication
        iii. Enhancement on signaling mechanisms for the above features to improve latency and efficiency with more usage of dynamic control signaling (as opposed to RRC)

\*\*\*\*\*\*\*\*\*\*\*\*\*\*\*\*\*\*\*\*\*\*\*\*\*\*\*\*\*\*\*\*\*\*\*\* QUOTATION [5] END \*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\* QUOTATION [6] START\*\*\*\*\*\*\*\*\*\*\*\*\*\*\*\*\*\*\*\*\*\*\*\*\*\*\*\*\*\*\*\*\*\*\*\*

ControlResourceSet

The IE ControlResourceSet is used to configure a time/frequency control resource set (CORESET) in which to search for downlink control information (see TS 38.213 [13], clause 10.1).

ControlResourceSet Information Element

```
ControlResourceSet ::= SEQUENCE {
    controlResourceSetId ControlResourceSetId,
    frequencyDomainResources BIT STRING (SIZE (45)),
    duration INTEGER (1..maxCoReSetDuration),
    ...
    tci-StatesPDCCH-ToAddList          SEQUENCE(SIZE
        (1..maxNrofTCI-StatesPDCCH)) OF TCI-StateId
    OPTIONAL, -- Cond NotSIB1-initialBWP
    tci-StatesPDCCH-ToReleaseList      SEQUENCE(SIZE
        (1..maxNrofTCI-StatesPDCCH)) OF TCI-StateId
    OPTIONAL, -- Cond NotSIB1-initialBWP
    tci-PresentInDCI ENUMERATED {enabled}
    OPTIONAL, -- Need S
    ...
    tci-PresentDCI-1-2-r16 INTEGER (1..3)
    OPTIONAL, -- Need S
    coresetPoolIndex-r16 INTEGER (0..1)
    OPTIONAL, -- Need S
    controlResourceSetId-v1610         ControlResourceSetId-
        v1610
    OPTIONAL -- Need S
    ]]
}
```

| ControlResourceSet field descriptions |
|---|
| ... |
| tci-PresentInDCI |
| This field indicates if TCI field is present or absent in DCI format 1_1. When the field is absent the UE considers the TCI to be absent/disabled. In case of cross carrier scheduling, the network sets this field to enabled for the ControlResourceSet used for cross carrier scheduling in the scheduling cell if enableDefaultBeamForCCS is not configured (see TS 38.214 [19], clause 5.1.5). |

-continued

| ControlResourceSet field descriptions |
|---|
| tci-PresentDCI-1-2
Configures the number of bits for "Transmission configuration indicator" in DCI format 1_2. When the field is absent the UE applies the value of 0 bit for the "Transmission configuration indicator" in DCI format 1_2 (see TS 38.212, clause 7.3.1 and TS 38.214, clause 5.1.5).
tci-StatesPDCCH-ToAddList
A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries. |

SPS-Config

The IE SPS-Config is used to configure downlink semi-persistent transmission. Multiple Downlink SPS configurations may be configured in one BWP of a serving cell.

SPS-Config Information Element

SPS-Config ::= SEQUENCE {
    periodicity ENUMERATED {ms10, ms20, ms32, ms40, ms64, ms80, ms128, ms160, ms320, ms640,
        spare6, spare5, spare4, spare3, spare2, spare1},
    nrofHARQ-Processes INTEGER (1..8),
    n1PUCCH-AN PUCCH-ResourceId
OPTIONAL, -- Need M
    mcs-Table ENUMERATED {qam64LowSE}
OPTIONAL, -- Need S
    ...,
    [[
    sps-ConfigIndex-r16 SPS-ConfigIndex-r16
OPTIONAL, -- Cond SPS-List
    harq-ProcID-Offset-r16 INTEGER (0..15)
OPTIONAL, -- Need R
    periodicityExt-r16 INTEGER (1..5120)
OPTIONAL, -- Need R
    harq-CodebookID-r16 INTEGER (1..2)
OPTIONAL, -- Need R
    pdsch-AggregationFactor-r16 ENUMERATED {n1, n2, n4, n8}
OPTIONAL -- Need S
    ]]
}

| SPS-Config field descriptions |
|---|
| harq-CodebookID
Indicates the HARQ-ACK codebook index for the corresponding HARQ-ACK codebook for SPS PDSCH and ACK for SPS PDSCH release.
...
n1PUCCH-AN
HARQ resource for PUCCH for DL SPS. The network configures the resource either as format0 or format1. The actual PUCCH-Resource is configured in PUCCH-Config and referred to by its ID. See TS 38.213 [13], clause 9.2.3.
nrofHARQ-Processes
Number of configured HARQ processes for SPS DL (see TS 38.321 [3], clause 5.8.1). |

TCI-State

The IE TCI-State associates one or two DL reference signals with a corresponding quasi-colocation (QCL) type.

TCI-State Information Element

TCI-State ::= SEQUENCE {
    tci-StateId TCI-StateId,
    qcl-Type1 QCL-Info,
    qcl-Type2 QCL-Info
OPTIONAL, -- Need R
    ...
}
QCL-Info ::= SEQUENCE {
    cell ServCellIndex
OPTIONAL, -- Need R
    bwp-Id BWP-Id
OPTIONAL, -- Cond CSI-RS-Indicated
    referenceSignal CHOICE {
        csi-rs NZP-CSI-RS-ResourceId,
        ssb SSB-Index
    },
    qcl-Type ENUMERATED {typeA, typeB, typeC, typeD},
    ...
}

| QCL-Info field descriptions |
|---|
| bwp-Id
The DL BWP which the RS is located in.
cell
The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5.
referenceSignal
Reference signal with which quasi-collocation information is provided as specified in TS 38.214 [19] subclause 5.1.5.
qcl-Type
QCL type as specified in TS 38.214 [19] subclause 5.1.5. |

\*\*\*\*\*\*\*\*\*\*\*\*\*\*\*\*\*\*\*\*\*\*\*\*\*\*\*\*\*\*\*\*\*\*\*\*\* QUOTATION [6] END \*\*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\*\* QUOTATION [7] START\*\*\*\*\*\*\*\*\*\*\*\*\*\*\*\*\*\*\*\*\*\*\*\*\*\*\*\*\*\*\*

Agreement

[Issue 1] For Rel. 17 NR FeMIMO, on the unified TCI framework
  a) Support joint TCI for DL and UL based on and analogous to Rel. 15/16 DL TCI framework
    The term "TCI" at least comprises a TCI state that includes at least one source RS to provide a reference (UE assumption) for determining QCL and/or spatial filter
    The source reference signal(s) in M TCIs provide common QCL information at least for UE-dedicated reception on PDSCH and all or subset of CORESETs in a CC
      Working Assumption: Select between M=1 and M>=1
    The source reference signal(s) in N TCIs provide a reference for determining common UL TX spatial filter(s) at least for dynamic-grant/configured-grant based PUSCH, all or subset of dedicated PUCCH resources in a CC,
      Optionally, this UL TX spatial filter can also apply to all SRS resources in resource set(s) configured for antenna switching/codebook-based/
non-codebook-based UL transmissions
   Working Assumption: Select between N=1 and
   N>=1
b) In RAN1#103-e, investigate, for the purpose of
down selection, the following alternatives for
accommodating the case of separate beam indication
for UL and DL
Alt1. Utilize the joint TCI to include references for both
DL and UL beams
Alt2. Utilize two separate TCI states, one for DL and
one for UL. The TCI state for the DL is the same as
agreed in 1a. The TCI state for the UL can be newly
introduced.
   Alt 2-1: The UL TCI state is taken from the same
   pool of TCI states as the DL TCI state
   Alt 2-2: The UL TCI state is taken from another pool
   of TCI states than the DL TCI state
   Note: The resulting beam indication directly refers to
   the associated source RS(s)
************************************ QUOTATION
[7] END *********************************
************************************ QUOTATION
[8] START*******************************
Agreement
On beam indication signaling medium to support joint or
separate DL/UL beam indication in Rel. 17 unified TCI
framework:
   Support L1-based beam indication using at least UE-
   specific (unicast) DCI to indicate joint or separate
   DL/UL beam indication from the active TCI states
   The existing DCI formats 1_1 and 1_2 are reused for
   beam indication
   Support a mechanism for UE to acknowledge success-
   ful decoding of beam indication
      The ACK/NAK of the PDSCH scheduled by the DCI
      carrying the beam indication can be used as an
      ACK also for the DCI
   Support activation of one or more TCI states via MAC CE
   analogous to Rel. 15/16:
      At least for the single activated TCI state, the activated
      TCI state is applied
      The content for the MAC CE is determined based on
      the outcome of issue 1
Agreement
On Rel-17 unified TCI framework, to accommodate the case
of separate beam indication for UL and DL:
   Utilize two separate TCI states, one for DL and one for
   UL.
   Note: For FR1, UE does not expect UL TCI to provide
   a reference for determining common UL TX spatial
   filter(s), if UL TCI is supported for FR1
   For the separate DL TCI:
      The source reference signal(s) in M TCIs provide QCL
      information at least for UE-dedicated reception on
      PDSCH and for UE-dedicated reception on all or
      subset of CORESETs in a CC
   For the separate UL TCI:
      The source reference signal(s) in N TCIs provide a
      reference for determining common UL TX spatial
      filter(s) at least for dynamic-grant/configured-grant
      based PUSCH, all or subset of dedicated PUCCH
      resources in a CC
   Optionally, this UL TX spatial filter can also apply to
      all SRS resources in resource set(s) configured for
      antenna switching/codebook-based/non-codebook-
      based UL transmissions
************************************ QUOTATION
[8] END *********************************
************************************ QUOTATION
[9] START*******************************
Conclusion
On Rel. 17 unified TCI framework, based on the agreements
in RAN1#102-e and 103-e, the following terms are defined
as follows (at least for the purpose of discussion and
reaching agreements).
For M=1:
   DL TCI: The source reference signal(s) (analogous to Rel.
      15, two, if qcl_Type2 is configured in addition to
      qcl_Type1) in the DL TCI provides QCL information at
      least for UE-dedicated reception on PDSCH and all of
      CORESETs in a CC
For N=1:
   UL TCI: The source reference signal in the UL TCI
      provides a reference for determining UL TX spatial
      filter at least for dynamic-grant/configured-grant based
      PUSCH and all of dedicated PUCCH resources in a CC
For M=N=1:
   Joint DL/UL TCI: A TCI refers to at least a common
      source reference RS used for determining both the DL
      QCL information and the UL TX spatial filter.
   Separate DL/UL TCI: The DL TCI and UL TCI are
      distinct (therefore, separate).
For M>1:
   DL TCI: Each of the M source reference signals (or 2M,
      if qcl_Type2 is configured in addition to qcl_Type1) in
      the M DL TCIs provides QCL information at least for
      one of the M beam pair links for UE-dedicated recep-
      tions on PDSCH and/or subset of CORESETs in a CC
For N>1:
   UL TCI: Each of the N source reference signals in the N
      UL TCIs provide a reference for determining UL TX
      spatial filter at least for one of the N beam pair links
      associated with dynamic-grant(s)/configured-grant(s)
      based PUSCH, and/or subset of dedicated PUCCH
      resources in a CC
For M>1 and/or N>1:
   Joint DL/UL TCI: A TCI refers to at least a common
      source reference RS used for determining both the DL
      QCL information and the UL TX spatial filter. In this
      case, M=N.
   Separate DL/UL TCI: The M DL TCIs and N UL TCIs are
      distinct (therefore, separate).
Agreement
On the Rel. 17 DCI-based beam indication, in
RAN1#104bis-e, down-select at least one of the following
alternatives regarding the support of DCI format(s) for beam
indication in addition to the agreed DCI formats 1_1/1_2
with DL assignment (in RAN1#103-e):
   Alt0: No additional DCI format is supported
   Alt1: DCI formats 1_1 and 1_2 without DL assignment,
      applicable for joint TCI as well as separate DL/UL TCI
      Support DCI acknowledgment mechanism, e.g. based
         on SPS PDSCH release, based on triggered SRS,
         based on DCI indicating SCell dormancy
      FFS: How to identify DCI formats 1_1/1_2 used for
         beam indication only (not for scheduling a PDSCH
         reception, not indicating a SPS PDSCH release, or
         not indicating SCell dormancy), considering impacts
         on PDCCH coverage and scheduling mechanism
      FFS: Whether the UE can/shall assume the gNB con-
         figured application time is after ACK transmission Alt2: Dedicated DCI format other than 1_1/1_2 without DL assignment, applicable for joint TCI as well as separate DL/UL TCI Support DCI acknowledgment mechanism, e.g. based on SPS PDSCH release, based on triggered SRS, based on DCI indicating SCell dormancy FFS: If the format is based on an existing DCI format, how to identify the DCI format used for beam indication only FFS: Whether the UE can/shall assume the gNB configured application time is after ACK transmission Alt3: UL-related DCI formats 0_1/0_2 with UL grant, applicable only for UL-only TCI of separate DL/UL TCI

********************************** QUOTATION [9] END *************************************
********************************** QUOTATION [10] START*************************************

Agreement

For beam indication with Rel-17 unified TCI, support DCI format 1_1/1_2 without DL assignment:

Use ACK/NACK mechanism analogous to that for SPS PDSCH release with both type-1 and type-2 HARQ-ACK codebook:

Upon a successful reception of the beam indication DCI, the UE reports an ACK

Note that upon a failed reception of the beam indication DCI, a NACK can be reported.

For type-1 HARQ-ACK codebook, a location for the ACK information in the HARQ-ACK codebook is determined based on a virtual PDSCH indicated by the TDRA field in the beam indication DCI, based on the time domain allocation list configured for PDSCH For type-2 HARQ-ACK codebook, a location for the ACK information in the HARQ-ACK codebook is determined according to the same rule for SPS release The ACK is reported in a PUCCH k slots after the end of the PDCCH reception where k is indicated by the PDSCH-to-HARQ_feedback timing indicator field in the DCI format, or provided dl-DataToUL-ACK or dl-DataToUL-ACK-ForDCI-Format1-2-r16 if the PDSCH-to-HARQ_feedback timing indicator field is not present in the DCI When used for beam indication:

CS-RNTI is used to scramble the CRC for the DCI

The values of the following DCI fields are set as follows:

RV=all '1's

MCS=all '1's

NDI=0

Set to all '0's for FDRA Type 0, or all '1's for FDRA Type 1, or all '0's for dynamicSwitch (same as in Table 10.2-4 of TS38.213)

Use the existing TCI field (always present) to signal the following: 1) Joint DL/UL TCI state, 2) DL-only TCI state (for separate DL/UL TCI), 3) UL-only TCI state (for separate DL/UL TCI)

FFS: Whether both DL TCI and UL TCI states can be signaled in one instance of beam indication DCI FFS: Relation with joint vs separate TCI (DL and/or UL) switching, including M/N>1 if supported In addition, use the following DCI fields as the fields are being used in Rel-16:

Identifier for DCI formats

Carrier indicator

Bandwidth part indicator

TDRA

Downlink assignment index (if configured)

TPC command for scheduled PUCCH

PUCCH resource indicator

PDSCH-to-HARQ_feedback timing indicator (if present)

The remaining unused DCI fields and codepoints are reserved in R17

Support UE to report whether or not to support TCI update by DCI format 1_1/1_2.

For a UE supporting TCI update by DCI format 1_1/1_2, it must support TCI update by using DCI 1_1/1_2 with DL assignment, and support of the above feature for TCI update by DCI format 1_1/1_2 without DL assignment is UE optional

********************************** QUOTATION [10] END *************************************
********************************** QUOTATION [11] START*************************************

Agreement

For M=N=1, on Rel-17 unified TCI, for separate DL/UL TCI, one instance of beam indication using DCI formats 1_1/1_2 (with and without DL assignment) can be used as follows:

One TCI field codepoint represents a pair of DL TCI state and UL TCI state. If the DCI indicates such a TCI field codepoint, the UE applies the corresponding DL TCI state and UL TCI state.

One TCI field codepoint represents only a DL TCI state. If the DCI indicates such a TCI field codepoint, the UE applies the corresponding DL TCI state, and keeps the current UL TCI state.

One TCI field codepoint represents only an UL TCI state. If the DCI indicates such a TCI field codepoint, the UE applies the corresponding UL TCI state, and keeps the current DL TCI state.

********************************** QUOTATION [11] END *************************************
********************************** QUOTATION [12] START*************************************

Support of Additional DCI Format for TCI Update

In our view, support only DCI format 1_1/1_2 with DL assignment for TCI update is not quite sufficient and flexible due to the dependence of DL traffic. For example, TCI update may be still required for CSI acquisition or SRS transmission even these is no DL or UL traffic. When there is UL-only or UL-heavy traffic, TCI update for UL transmission is also needed. In order to support for wider and flexible use cases, we see support of additional DCI format(s) for TCI update is needed.

Regarding Alt1: support of DCI format 1_1/1_2 without DL assignment for beam indication, this could be beneficial for NW scheduling flexibility due to dependence of DL and UL traffics. Moreover, the unused fields in DCI format 1_1/1_2 can be re-purposed for potential usages in unified TCI framework. In Rel-15/16, a DCI format 1_1/1_2 without DL assignment can be used for indicating SPS PDSCH activation/release or SCell dormancy. After a successful decoding of the DCI format 1_1/1_2, UE will send ACK feedback for it as a part of HARQ-ACK codebook. If DCI format 1_1/1_2 without DL assignment is supported for beam indication, the followings are our views on the issues identified in the agreement:
Identify DCI formats 1_1/1_2 used for beam indication only: First, we prefer to re-use CS-RNTI to scramble beam indication DCI w/o DL assignment, is the simplest way to differentiate from DCI for SCell dormancy indication w/o DL assignment and normal DCI with DL assignment. Second, special values on some fields can be applied to beam indication DCI w/o DL assignment to differentiate DCI scrambled by CS-RNTI for other purposes, including:
  DCI format 1_1/1_2 for retransmission of DL SPS
  DCI format 1_2 for DL SPS activation w/o DL assignment
  DCI format 1_1/1_2 for DL SPS release w/o DL assignment
In summary, we propose the following values/fields applied for beam indication DCI w/o DL assignment:
  FDRA with the values same as in Table 10.2-4 of TS38.213 is used to differentiate from DCI format 1_1/1_2 for retransmission of DL SPS and DCI format 1_2 for DL SPS activation w/o DL assignment
  NDI with '0' is used to differentiate from DCI format 1_1/1_2 for retransmission of DL SPS
  MCS with all '1's (only used for retransmission) is used to differentiate from DCI format 1_2 for DL SPS activation w/o DL assignment
  RV with all '1's is used to differentiate from DCI format 1_1/1_2 for DL SPS release w/o DL assignment DL related DCIs (DCI Format 1_1 and DCI Format 1_2) without DL assignment for beam indication. In that agreement, it was decided that the DCI Format includes a single TCI field (already existing in Rel-16) for beam indication, and that there will be no repurposing of additional fields for beam indication. i.e. the single TCI field (up to 3 bits) is used for beam indication in case of joint DL/UL TCI state or separate DL/UL TCI states.
We are supportive of dynamic indication of TCI state type. However, no additional field in the DCI Format can be used to indicate joint or separate TCI states (agreement from RAN1#104b-e). Therefore, we can think of two ways to dynamically indicate the type of TCI state:
  1. Partition the activated TCI state code points between joint and separate TCI states. This reduces the number of available code points for each type of TCI state by half.
  2. Use MAC CE signalling to indicate the TCI state type.
We slightly prefer MAC CE signalling to indicate the TCI state type, as the rate of change between joint and separate TCI state indication is relatively slow making MAC CE signalling more efficient than DCI indication.
Proposal 4: On Rel. 17 unified TCI framework,
  Support Alt 3: A UE can be configured with either joint DL/UL TCI or separate DL/UL TCI via MAC CE signaling.
In case of separate TCI state, a single TCI state field in the DCI Format is used to indicate a DL TCI state and/or an UL TCI state. There are at least two alternatives for the indication if the TCI state:

TABLE 2

DCI format 1_1/1_2 with CRC scrambled by CS-RNTI for different purposes

|  | DCI format 1_1/1_2 for retransmission of DL SPS | DCI format 1_2 for DL SPS activation w/o DL assignment | DCI format 1_1/1_2 for DL SPS release w/o DL assignment | DCI format 1_1/1_2 for beam indication w/o DL assignment |
|---|---|---|---|---|
| CRC scrambling | CS-RNTI | CS-RNTI | CS-RNTI | CS-RNTI |
| RV | For scheduling | Set to all '0's | Set to all '0's | Set to all '1's |
| MCS | For scheduling | For scheduling | Set to all '1's | Set to all '1's |
| NDI | Set to '1' | Set to '0' | Set to '0' | Set to '0' |
| HARQ process number | For scheduling | Set to all '0's for a single DL SPS activation | Set to all '0's for a single DL SPS release | FFS |
| FDRA | For scheduling | For scheduling | Set to all '0's for FDRA Type 0 Set to all '1's for FDRA Type 1 Set to all '0's for dynamicSwitch | Set to all '0's for FDRA Type 0 Set to all '1's for FDRA Type 1 Set to all '0's for dynamicSwitch |

\*\*\*\*\*\*\*\*\*\*\*\*\*\*\*\*\*\*\*\*\*\*\*\*\*\*\*\*\*\*\*\*\*\*\*\* QUOTATION [12] END \*\*\*\*\*\*\*\*\*\*\*\*\*\*\*\*\*\*\*\*\*\*\*\*\*\*\*\*\*\*\*\*\*\*\*\*
\*\*\*\*\*\*\*\*\*\*\*\*\*\*\*\*\*\*\*\*\*\*\*\*\*\*\*\*\*\*\*\*\*\*\*\* QUOTATION [13] START\*\*\*\*\*\*\*\*\*\*\*\*\*\*\*\*\*\*\*\*\*\*\*\*\*\*\*\*\*\*\*\*\*\*\*\*
Joint/Separate DL-UL TCI State Indication
In RAN1#104-e, it was discussed how to indicate to the UE if the TCI state ID being signalled is for a joint TCI state or a separate TCI state. There are three ways to indicate the Type of TCI state ID
  Include the TCI state type in the DCI indicating the joint or separate TCI state
  Dynamically signalling the TCI state type by MAC CE signalling.
  Configure the TCI state type by RRC signalling. If both TCI state types are configured by RRC signalling, additional dynamic signalling is needed to signal the type of TCI state being indicated.
In RAN1#104b-e, there was no agreement on further down selection. However, an agreement was made on the use of a Alt1: The uplink and downlink TCI states are paired for each code point. A TCI state ID indicates a pair of DL TCI state and UL TCI state. As the TCI state bit field is only 3 bits, 8 pairs of DL/UL TCI states can be activated for indication at a time, out of a potential of 64 pairs when 8 DL TCI states are activated and 8 UL TCI states are activated.
  Alt2: The activated code points of TCI states are either DL TCI states or UL TCI states. For example, half the activated code points are DL TCI states, and the other half of activated code points are UL TCI states. In single instance of a DCI format for beam indication can indicate either a DL TCI state or an UL TCI state. To indicate both a DL TCI state and an UL TCI state would require two DCI formats for beam indication. In this case, a TCI state field with 3 bits can potentially indicate one of 16 pairs of DL/UL TCI, over two DCI format transmissions.

There are various pros and cons to consider for Alt1 and Alt2. For example, with Alt1 a single DCI format can update the DL and UL TCI states, while Alt2 requires two TCI formats for the same. On the other hand, Alt2 allows the activation of more DL/UL TCI state pairs which would lead less MAC CE activation of TCI state compared to Alt1.

Proposal 5: On Rel. 17 unified TCI framework,
  For separate TCI state indication, further consider the following alternatives:
    Alt1: Activated TCI state code points correspond to a pair of DL and UL TCI states.
    Alt2: Activated TCI state code points are partitioned into DL, UL, and (if supported) DL+UL TCI state code points.

Proposal 7:
On Rel. 17 unified TCI framework:
  Support Alt C. UE calculates path-loss based on periodic DL RS configured as the source RS for determining spatial TX filter in UL or (if applicable) joint TCI state
    UE doesn't expect an UL/Joint TCI state to be configured with a source DL RS that is aperiodic or semi-persistent.
    If UL/Joint TCI state has an UL source RS, the PL-RS is the source RS of the UL RS that is a periodic DL RS.
  Regardless of the outcome, no fallback scheme is supported for PL-RS determination.
  The Rel-17 PL-RS determination is a basic feature when the Rel-17 unified TCI framework is supported.
  A UE maintains up to 4 PL-RS corresponding to the lowest order active UL/Joint TCI states. A UE that is signaled with an UL/Joint TCI state for which it maintains no PL-RS uses the PL-RS corresponding the TCI state associated lowest order code point with a PL RS.

TCI State Pool for Separate UL/DL

In RAN1#104b-e, this topic was not discussed. In RAN1#103-e, it is agreed to accommodate separate beam indication for UL and DL, in addition to joint beam indication. An open point from the RAN1#103-e agreements is whether to use common (same) or separate TCI state pools from DL TCI state. There are two cases to consider for DL/UL beam indication:
  Case 1: Joint DL/UL beam indication. Since beam correspondence is default, a common beam indication RS can be used for DL and UL transmissions. In this case, one RS can be used as a source RS for QCL Type-D or spatial relation information for both DL and UL transmissions respectively. Thus, the TCI state indicates a same source RS for DL and UL transmissions.
  Case 2: Separate DL/UL beam indication. For a special case of MPE where an UL beam is chosen not to correspond to the DL beam, separate beam indication RSs can be used for DL and UL transmissions.

According to case 1 and case 2, there are three types of TCI state indications:
  Joint TCI state for DL and UL beam indication (case 1).
  DL TCI state in case of separate DL and UL beam indication (case 2 DL).
  UL TCI state in case of separate DL and UL beam indication (case 2 UL).

A TCI state used for joint beam indication includes components for beam indication of DL channels, as well as components for beam indication of UL channels. Hence, it seems natural to reuse the same pool of TCI states in case of separate DL/UL beam indication, whereby A DL TCI state is indicated from the common TCI state pool, such that the components related to DL beam indication are used to determine the DL beam.
  An UL TCI state is indicated from the common TCI state pool, such that the components related to UL beam indication are used to determine the UL beam.

This is especially true when symmetry between source RS used for DL QCL reference and UL spatial reference exists. This is feasible with beam correspondence and motivates the use of SRS as a source RS for DL QCL reference.

Figure 7:
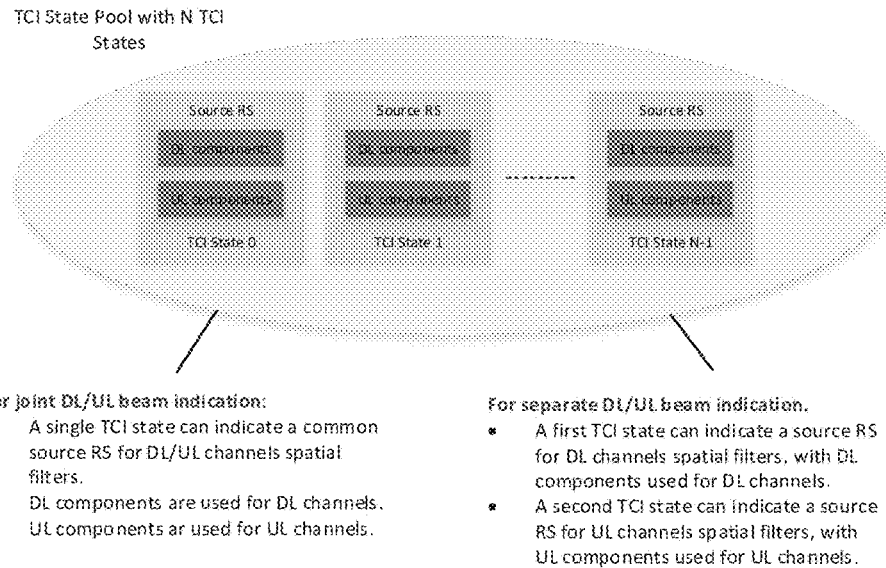
FIG. 7 is a reproduction of FIG. 1 of R1-2105291, Multi-beam enhancements: A common TCI state pool for joint and separate DL/UL beam indication.

FIG. 7 is a reproduction of FIG. 1 of R1-2105291, Multi-beam enhancements: A common TCI state pool for joint and separate DL/UL beam indication.

Proposal 8:
For the purpose of UL TCI state indication, in case of separate DL/UL beam indication, the TCI state is chosen from a common TCI state pool. The same pool is also used for joint TCI state indication, as well as DL TCI state indication in case of separate DL/UL beam indication.

******************************* QUOTATION [13] END *******************************
******************************* QUOTATION [14] START*******************************

TCI State Pool for UL TCI (of Separate DL/UL TCI)

Later, in RAN1#103 [2], it was agreed that two separate TCI states (Alt2), one for DL and one for UL, are utilized for separate DL/UL TCI update. Thus, according to the agreements in RAN1#102 [1] and RAN1#103 [2], a DL TCI state would be the same as a joint DUUL TCI state, where the DL TCI state is taken from the same TCI state pool for joint DL/UL TCI update. The remaining issue is whether Alt2-1 or Alt2-2 is adopted for UL TCI state.

In RAN1#104, a FL proposal [4] was provided for this pending issue:

---

FL Procosal 1.2: On Rel.17 unified TCI framework, in case of separate DL7UL TCI. decide between the following two alternatives for UL TCI state pool design upon the conclusion of source RS type support for DL QCL reference and UL TX spatial reference:
  Alt1. UL TCI shares the same TCI state pool as joint DL/UL TCI
  Alt2. UL TCI uses a separate TCI state pool from joint DL/UL TCI Note:
By previous agreements, DL TCI shares the same TCI state pool as joint DL/UL TCI.

---

On Alt1, since DL TCI is taken the same TCI pool for joint DL/UL TCI update, UL TCI state will be taken the same pool as well, which means one single TCI state pool can be used to support joint or separate DL/UL TCI update. Compared with Alt1, Alt2 requires one additional TCI state pool dedicated for UL TCI. In a primary FR2 operation where beam correspondence generally holds, both Rx beam for DL reception and Tx beam for UL transmission can be determined according to DL measurements on a same set of DL RSs. Thus, a separate TCI state pool UL seems to be redundant. Moreover, if the TCI state pool can be used for joint DL/UL TCI update, we don't see why the same pool cannot be used for separate TCI update for UL.

Proposal 9: On Rel. 17 unified TCI framework, in case of separate DL/UL TCI, support UL TCI shares the same TCI state pool as joint DL/UL TCI.
  Note: By previous agreements, DL TCI shares the same TCI state pool for joint DL/UL TCI

******************************* QUOTATION [14] END *******************************

Some or all of the following terminology and assumptions may be used herein.

Base Station (BS): a network central unit or a network node in New Radio (NR) which is used to control one or multiple Transmission/Reception Points (TRPs) which are associated with one or multiple cells. Communication between a BS and TRPs is via fronthaul. A BS may be referred to as Central Unit (CU), eNB, gNB, or NodeB.

TRP: a transmission and reception point provides network coverage and directly communicates with User Equipment (UEs). A TRP may be referred to as a Distributed Unit (DU) or a network node.

Cell: a cell is composed of one or multiple associated TRPs, e.g., coverage of the cell is composed of coverage of all associated TRP(s). One cell is controlled by one BS. A Cell may be referred to as TRP group (TRPG).

In NR Rel-15, beamforming technology is adopted to conquer the high-power penetration in high frequency band, e.g., above 6 GHz. Hence, gNB and UE may both use some transmission beams and/or receiving beams to make high throughput data in such high frequency band reliable. How to choose suitable transmission beams and/or receiving beams has played an important role in NR Rel-15. Beam indication for various channels and reference signals are also well discussed and captured in the specification along with the development of NR. The following would briefly introduce some of beam indication in Rel-15. Beam indication for Physical Downlink Control Channel (PDCCH) is that the UE could be configured with one or more Transmission Configuration Indicator (TCI) states for PDCCH, and/or receives Medium Access Control (MAC) Control Element (CE) activating one TCI state. Beam indication for Physical Downlink Shared Channel (PDSCH) is that the UE could be configured with one or more TCI states for PDSCH, receives MAC CE activating one or more TCI states, and/or receives Downlink Control Information (DCI) indicating one TCI state via a TCI field. Beam indication for Channel State Information Reference Signal (CSI-RS) is that the UE could be configured with CSI-RS with an associated TCI state or with a Quasi Co-location (QCL) source Reference Signal (RS) (which could be considered as one TCI state). Beam indication for Physical Uplink Control Channel (PUCCH) is that the UE could be configured with PUCCH associated to a source RS indicated by PUCCH spatial relation, and/or the UE could receive MAC CE to update the source RS or PUCCH spatial relation for beam indication for PUCCH. Beam indication for Configured-Grant (CG) Physical Uplink Shared Channel (PUSCH) is that the UE could be configured with CG type-1 PUSCH associated to a source RS indicated by Sounding Reference Signal (SRS) resource indicator. Beam indication for CG PUSCH is that the UE could be configured with CG type-2 PUSCH associated to a source RS indicated by SRS resource indicator by a (activation) DCI. Beam indication for PUSCH is that the UE could be configured with one or more SRS resources and receives DCI indicating one SRS resource as QCL source reference associated to the scheduled PUSCH.

As for PDSCH in NR Rel-15, the UE could receive MAC CE (e.g., session 6.1.3.14 in [1]3GPP TS 38.321 V16.4.0 (2021 March)) for indicating up to 8 TCI states among maximum number of (configured) TCI states (e.g., 128 configured TCI states). The UE could receive DCI with a TCI field indicating one code-point associated to the MAC CE indicating a TCI state. Nonetheless, in NR Rel-15, beam indication for receiving Downlink (DL) transmission only considers transmission from a single TRP and/or using panel within a time duration (e.g., one slot or mini-slot), at least from the perspective of the UE.

In NR Rel-16, people and companies resume to consider DL transmission from multiple TRPs and/or panels. For transmission from multiple TRPs and/or panels, it may imply that a single DL transmission may be performed by different beams from multiple TRPs and/or panels. It may also mean that the UE may receive multiple DL transmissions from multiple TRPs and/or panels within a time duration (e.g., one slot or mini-slot). In NR Rel-16, enhancement to Ultra-Reliable Low Latency Communication (URLLC) with consideration of multiple TRP scenarios has also been made. Hence, we have some PDSCH repetition schemes to improve reliability of receiving PDSCH. Some examples could be Spatial Division Multiplexing (SDM) repetition scheme, Frequency Division Multiplexing (FMD) repetition scheme, mini-slot based repetition scheme and slot based repetition scheme. With multiple Transmission and Reception Points (mTRP) PDSCH, one Transport Block (TB) could be transmitted by more than one beam, or TCI state, or spatial relation. In order to indicate two TCI states for mTRP by a single DCI, MAC CE (e.g., session 6.1.3.24 in [1] 3GPP TS 38.321 V16.4.0 (2021 March)) is used for associating one or more code-points of a TCI field to one or more TCI state identities (IDs). MAC CE could associate up to 16 TCI state IDs, and field Ci could indicate either one or two TCI states for a code-point of TCI field. UE could receive a DCI with TCI field indicating one code-point, and if the one code-point indicates one TCI state as MAC CE associating, the UE considers single TRP, while if the one code-point indicates two TCI states as MAC CE associating, the UE considers mTRP/multiple TRP.

In NR Rel-17, people try to have a unified beam indication framework for DL and UL, and for UE-specific DL channel and/or signal, and for UE-specific Uplink (UL) channel and/or signal. One motivation is to reduce signaling overhead and have a unified for DL and UL channel and/or signal. One motivation is that the UE in most real deployment uses has the same UE beam(s) for downlink reception and/or same UE beam(s) for uplink transmission. In addition, in typical Frequency Range 2 (FR2) band, since beam correspondence may be a major scenario, it is justified to have one joint beam for DL and UL. In comparison, due to some Maximum Permissible Exposure (MPE) issues for some UE beams (e.g., regulation considering maximum transmit power restriction toward human body with respect to some UE beam), joint beam for DL and UL cannot guarantee, while separate beam indication for DL and UL may be useful for this scenario. As for separate DL/UL TCI states, with respect to signaling overhead, beam indication for two TCI states associating to DL TCI state and UL TCI state may be considered. However, if the UE is configured with separate one or more DL TCI states and one or more UL TCI states which may share a same TCI state ID, how does the UE identify one code-point of the TCI field associate to which TCI state and whether associate to DL+UL TCI states? Another issue is that if a UE is configured with one or more TCI states and each TCI state could refer to or comprise DL and/or UL TCI states or components, how does UE identify one code-point of the TCI field associated to which part of the TCI state? For example, considering separate DL/UL TCI states and a shared TCI state pool with TCI state comprising DL and UL TCI components, when the UE receives a DCI with TCI field indicating a code-point associating to a TCI state, how does the UE know it refers to "DL", "UL", "DL+UL" of the TCI state? Further, considering mTRP PDSCH in Rel-16 and mTRP PUSCH in Rel-17, with introduction of another two TCI states associating DL TCI and UL TCI, 8 possible combination could be: "1 DL", "1 UL", "2 DL", "2 UL", "1 DL+1 UL", "1 DL+2 UL", "2 DL+1 UL", "2 DL+2 DL". How a UE knows a code-point of a TCI field is associated to which combination may be further designed.

Preferably in certain embodiments, one (DL or UL) TCI state may comprise any one or a combination of the following:
  TCI state ID.
  One or two DL/UL identifiers.
  One or two Cell ID/CC IDs.
  One or two Source RS (IDs) for indicating information of QCL type-D and/or spatial information.
  One or two QCL-types.
  One or two PL RS (IDs).
  One or two power control parameters (e.g., p0-ID, alpha, and/or closed loop index)

Preferably in certain embodiments, one TCI state may comprise a DL component and a UL component.

Preferably in certain embodiments, a DL component of one TCI state may comprise any one or a combination of the following:
  One or two DL/UL identifiers.
  One or two Cell ID/CC IDs.
  One or two Source RS (IDs) for indicating information of QCL type-D and/or spatial information.
  One or two QCL-types.

Preferably in certain embodiments, a UL component of one TCI state may comprise any one or a combination of the following:
  One or two DL/UL identifiers.
  One or two Cell ID/CC IDs.
  One or two Source RS (IDs) for indicating information of QCL type-D and/or spatial information.
  One or two QCL-types.
  One or two PL RS (IDs).
  One or two power control parameters (e.g., p0-ID, alpha, and/or closed loop index).

Preferably in certain embodiments, source RS for spatial filter in one TCI state for a DL (component) and for a UL (component) could be different.

According to current RAN1 agreements, a DCI format 1_1/1_2, with or without downlink assignment, could be used for beam indication for unified TCI framework. With this unified beam indication via DCI, beam updates could be faster compared to some beam indications in a legacy release using MAC CE and/or RRC signaling. With reusing a TCI field in DCI format 1_1/1_2, code-points of the TCI field could at least indicate a Joint TCI state, Separate DL TCI state, and/or Separate UL TCI state. Joint TCI state may mean or refer to a TCI state being applied for DL and UL (e.g., being applied to one or more DL channels/signals and being applied to one or more UL channels/signals). Separate UL TCI states may mean or refer to a TCI state being applied for DL only (e.g., being applied to one or more DL channels/signals). Separate UL TCI states may mean or refer to a TCI state being applied for UL only (e.g., being applied to one or more UL channels/signals). A UE may transmit a HARQ-ACK feedback corresponding to the DCI format 1_1/1_2. Timing for the UE applying new or updated beam indications according to Rel-17 beam indication may be a first symbol or a first slot after another timing plus a time gap. The said another timing could be the UE receiving DCI format 1_1/1_2 for indicating unified beam indication, receiving PDSCH scheduled by DCI format 1_1/1_2 for indicating unified beam indication, receiving DCI format 1_1/1_2 for indicating unified beam indication plus a second time gap, and/or transmitting HARQ-ACK feedback corresponding to scheduled PDSCH or DCI format 1_1/1_2. Preferably, it can be assumed the said another timing may be that the UE transmits HARQ-ACK feedback corresponding to DCI format 1_1/1_2.

Preferably in certain embodiments, one or more bits in DCI format 1_1/1_2 could indicate information of applied direction of beam indication and/or information of sTRP or mTRP. Preferably, one or more bits in DCI format 1_1/1_2 may be used for differentiating a TCI field in DCI format 1_1/1_2 are associated to which applied direction of beam indication and/or a number of 1 or 2 TCI states (e.g., 1 TCI state is associated to sTRP and 2 TCI states is associated to mTRP). Preferably, the one or more bits in DCI format 1_1/1_2 could indicate information of one of 1 DL, 1 UL, 1 DL+1 UL. Preferably, the one or more bits in DCI format 1_1/1_2 could indicate information of one of 1 DL, 1 UL, 1 DL+1 UL, 1 DL+2 UL, 2 DL+1 UL, 2 DL, 2 UL, 2 DL+2 UL. For example, two bits are included in the DCI format 1_1/1_2 for indicating information of applied direction of beam indication. For the two bits indicating information of combination as "1DL", code-point(s) of a TCI field is associated to a TCI state from DL TCI state pool or DL component of one TCI state. For the bits indicating information of combination as "1 DL+1 UL", code-point(s) of a TCI field is associated to a TCI state from DL TCI state pool and from UL TCI state pool, or DL component and UL component of one TCI state.

Alternatively and/or preferably in certain embodiments, one or more bits in DCI format 1_1/1_2 could indicate information of applied direction of beam indication and one or more bits in MAC CE could indicate information of sTRP or mTRP. In other words, MAC CE could provide information of whether one code-point of a TCI field is associated to sTRP or mTRP. For the (i+1)-th code-point of a TCI field being associated to mTRP, upon receiving DCI format 1_1/1_2 with the one or more bits indicative of 1 DL and indicative of the (i+1)-th code-point of a TCI field, the UE could determine that DCI format 1_1/1_2 provides information of beam indication for mTRP for DL. For the (i+1)-th code-point of a TCI field being associated to sTRP, upon receiving DCI format 1_1/1_2 with the one or more bits indicative of 1 DL+1 UL and indicative of the (i+1)-th code-point of a TCI field, the UE could determine that DCI format 1_1/1_2 provides information of beam indication for sTRP for DL and sTRP for UL.

Preferably in certain embodiments, information for one code-point of a TCI field may comprise one or more TCI state IDs.

Preferably in certain embodiments, information for one code-point of a TCI field may comprise information for locating one or more TCI state IDs. Preferably, information for one code-point of the TCI field may comprise Bandwidth Part (BWP) ID, and/or CC ID.

Preferably in certain embodiments, information for one code-point of a TCI field may comprise information indicating any of one"1 DL", "1 UL", "1 DL+1 UL" for the one code-point of the TCI field.

Preferably in certain embodiments, information for one code-point of a TCI field may comprise information for identifying one TCI state ID is associated to which DL/UL TCI state pool. Preferably, "1" for DL TCI state pool and "0" for UL TCI state pool or vice versa.

Preferably in certain embodiments, information for one code-point of a TCI field may comprise information indicating either DL or UL for a first TCI state ID for the one code-point of the TCI field.

Preferably in certain embodiments, information for one code-point of a TCI field may comprise information indicating number of a TCI state ID associated to the one code-point of the TCI field.

Preferably in certain embodiments, information for one code-point of a TCI field may comprise information indicating either one or two TCI state IDs associated to the one code-point of the TCI field.

Preferably in certain embodiments, information for one code-point of a TCI field may comprise information indicating two TCI state IDs associated to DL and UL respectively for the one code-point of the TCI field.

Preferably in certain embodiments, information for one code-point of a TCI field may comprise information indicating any of one"1 DL", "1 UL", "2 DL", "2 UL", "1 DL+1 UL", "1 DL+2 UL", "2 DL+1 UL", "2 DL+2 DL" for the one code-point of the TCI field.

Preferably in certain embodiments, information for one code-point of a TCI field may comprise information indicating two TCI state IDs both associated to DL or UL, respectively, 2 DL, or 2 UL for the one code-point of the TCI field.

Preferably in certain embodiments, information for one code-point of a TCI field may comprise information indicating three TCI state IDs associated to 2 DL and 1 UL, or 1 DL and 2 UL for the one code-point of the TCI field.

Preferably in certain embodiments, information for one code-point of a TCI field may comprise information indicating four TCI state IDs associated to 2 DL and 2 UL for the one code-point of the TCI field.

Preferably in certain embodiments, information for one code-point of a TCI field may comprise information indicating any of "1 DL", "1 UL", "1 DL+1 UL" for the one code-point of the TCI field.

Preferably in certain embodiments, information for one code-point of a TCI field may comprise information indicating DL component/part, UL component/part, or DL+UL component/part of one TCI state ID (for the code-point of the TCI field).

Preferably in certain embodiments, information for one code-point of a TCI field may comprise information indicating which component/part of one TCI state ID is associated to the one code-point of the TCI field.

For example, as for code-point "000" of a TCI field, the UE may receive information indicating a TCI state ID associated to the code-point "000" of the TCI field, and the UE may receive information indicating using a DL component, a UL component, or a DL+UL component of the TCI state ID. If the information indicates a UL component, code-point "000" of the TCI field may associate to TCI state ID, and/or the UE considers "000" as a beam indication for UL TCI. Preferably, upon receiving a DCI with a TCI field indicating code-point "000", the UE update UL TCI state or UL beam for one or more UL channels or signals based on UL component of the TCI state ID (if current/old UL TCI state or UL beam is different from the UL TCI state or UL beam). The UE may transmit uplink transmission via an updated UL beam from the first slot with a time duration after the UE transmits HARQ-ACK information corresponding to the DCI.

Preferably in certain embodiments, information for one code-point of a TCI field may comprise information indicating any of one"1 DL", "1 UL", "2 DL", "2 UL", "1 DL+1 UL", "1 DL+2 UL", "2 DL+1 UL", "2 DL+2 DL" for the one code-point of the TCI field.

Preferably in certain embodiments, information for one code-point of a TCI field may comprise information indicating any of one"1 DL", "1 UL", "2 DL", "2 UL", "1 DL+1 UL", "1 DL+2 UL", "2 DL+1 UL", "2 DL+2 DL" for one or two TCI state ID(s) associated to the one code-point of the TCI field.

Preferably in certain embodiments, information for one code-point of a TCI field may comprise information indicating one or two TCI state ID(s) for the code-point of the TCI field.

Preferably in certain embodiments, information for one code-point of a TCI field may comprise information indicating whether there are 2 TCI state IDs for the same transmit direction. Preferably, information for one code-point of a TCI field may comprise information indicating whether there are 2 TCI state IDs for DL and/or whether there are 2 TCI state IDs for UL. Preferably, information for one code-point of a TCI field may comprise information indicating whether a DL component of 1 TCI state ID or 2 TCI state IDs are applied or used. Preferably, information for one code-point of a TCI field may comprise information indicating whether a UL component of 1 TCI state ID or 2 TCI state IDs are applied or used. Preferably, information for one code-point of a TCI field may comprise information indicating at least a DL component and a UL component of 1 TCI state ID (associated to code-point of the TCI field) is applied or used. Preferably, information for one code-point of a TCI field may comprise information indicating whether a DL component or a UL component of the other TCI state ID (associated to code-point of the TCI field) is applied or used.

Preferably in certain embodiments, one or two octets could be a bit-map (for indicating information for up to 8 code-point of a TCI field).

Preferably in certain embodiments, the most left bit in an octet is MSB. Preferably, the most right bit in an octet is LSB. Alternatively, the most left bit in an octet is LSB. Alternatively, the most right bit in an octet is MSB.

Concept 1

This concept is to have at least two octets in a MAC CE for indicating information associated to usage or applied transmit direction for a number of code-point(s) of a TCI field. Alternatively, this concept is to have at least two bits in a MAC CE for indicating information associated to usage or applied transmit direction for one code-point of the TCI field. Each of the at least two bits included in the MAC CE may not be consecutive (e.g., consecutive may refer to being in the same octet, or LSB of x-th octet and MSB of (x+1)-th octet, or MSB of x-th octet and LSB of (x+1)-th octet).

The UE could be configured with one or more DL TCI states and one or more UL TCI states in a BWP and/or in a Component Carrier (CC). At least one of the one or more DL TCI states is with a TCI state ID being the same as the TCI state ID of at least one of the one or more UL TCI states.

(Each) two bits (from the two octets) could indicate information associated to usage or applied direction of beam indication for one code-point of a TCI field.

(Each) two bits (from the two octets) could indicate information that whether one TCI state ID (associated to code-point of a TCI field) is associated to the one or more DL TCI states or is associated to the one or more UL TCI states.

(Each) two bits (from the two octets) could indicate information of whether one code-point of a TCI field associated to one or two TCI state ID(s).

(Each) two bits (from the two octets) could indicate information of whether one code-point of a TCI field associated to one or two TCI state(s).

Based on the MAC CE, at least one of one or more code-points of a TCI field could associate to DL beam indication, UL beam indication, and/or DL beam indication and UL beam indication.

Based on the MAC CE, at least one of one or more code-points of a TCI field could associate to one DL TCI state, one UL TCI state, or one DL TCI state and one UL TCI state.

Figure 8:
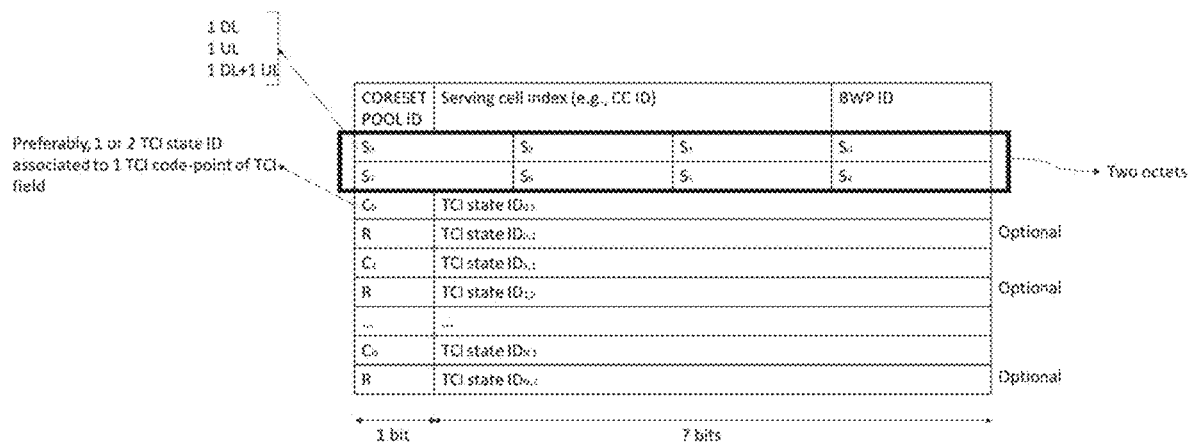
FIG. 8 is an example of at least two octets (e.g., the second and third top octets) included in a MAC CE, in accordance with embodiments of the present invention.

For example, FIG. 8 illustrates at least two octets (the second and third top octets in FIG. 8) are included in a MAC CE. The two octets comprise eight 2-bit fields (e.g., S0~S7). Si indicates information of DL, UL or DL+UL for the (i+1)-th code-point of a TCI field. Preferably, Si indicates information of DL, UL, DL+UL, or UL_DL for the (i+1)-th code-point of the TCI field. Preferably, Si may indicate one or more TCI state IDs associated to the (i+1)-th code-point of the TCI field. The (i+1)-th code-point of the TCI field could associate to TCI state IDi,1 and TCI state IDi,2, (if present). Preferably, (if Si does not indicate association between DL+UL and the two TCI state IDs), the first TCI state ID (e.g., TCI state ID i,1) is associated to DL and the second TCI state ID (e.g., TCI state ID i,2). Based on Si being indicative of information of DL+UL, the (i+1)-th code-point of a TCI field may comprise two TCI states associated to DL and UL, respectively. In FIG. 8, MAC CE may comprise information for locating TCI state IDs (e.g., CC ID, and/or BWP ID). Preferably, in method A, Ci may be a reserved bit.

Figure 9:
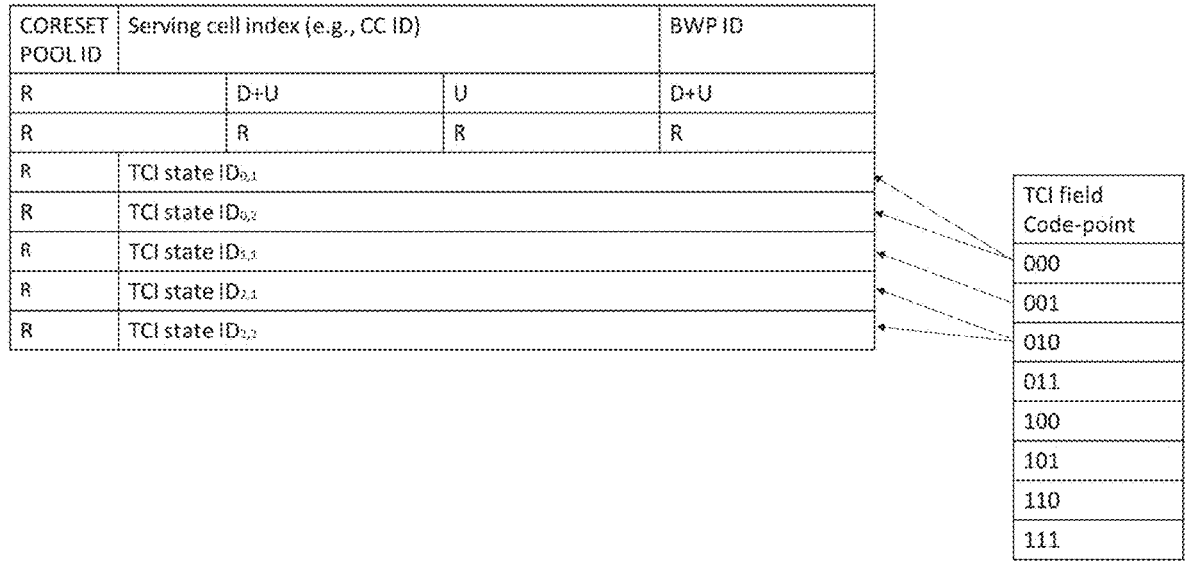
FIG. 9 is an example based on the MAC CE format of FIG. 8, wherein S0 indicates information of D+U, S1 indicates information of U, and S2 indicates information of D+U, in accordance with embodiments of the present invention.

For example, FIG. 9 is an example based on MAC CE format of FIG. 8, where S0 indicates information of D+U, and S1 indicates information of U, and S2 indicates information of D+U. If MAC CE comprises 5 octets with information of a TCI state ID, the UE would determine the first and second octets with information of the TCI state ID is associated to code-point of a TCI field "000". The UE would determine the third octet with information of the TCI state ID is associated to code-point of the TCI field "001". The UE would determine the fourth and fifth octets with information of the TCI state ID is associated to code-point of the TCI field "010". Based on at least the number of octets associated with information of the TCI state ID and Si, the UE could determine association between code-point of the TCI field and one or two TCI state IDs. In this example, since there are only 5 octets associated to information of the TCI state ID, code-point of the TCI field ("011", "100", "101", "110", "111") may not have activated the TCI state (due to no associated TCI state ID). The UE may ignore S3~S7. With this MAC CE format, the number of activated TCI states could be lower than the number of code-points of the TCI field. Preferably, it may help to reduce number of activated TCI states for the UE to maintain and measurement which have the benefit of power saving.

The UE could be configured with one or more TCI states. Preferably, each of the one or more TCI states comprise DL components and/or UL components.

(Each) two bits (from the two octets) could indicate information of applied DL component/part and/or UL component/part of one or two TCI state(s) associated to one code-point of the TCI field.

(Each) two bits (from the two octets) could indicate information of usage or applied direction of beam indication for one code-point of the TCI field.

(Each) two bits (from the two octets) could indicate information that which component of the DL component and/or the UL component of the TCI state associated to one code-point of the TCI field is applied or used.

(Each) two bits (from the two octets) could indicate information of whether one code-point of the TCI field is associated with one or two TCI state ID(s).

(Each) two bits (from the two octets) could indicate information of whether one code-point of the TCI field is associated with one or two TCI state(s).

Based on the MAC CE, at least one of one or more code-points of the TCI field could be associated with applied DL component/part and/or UL component/part of one or two TCI state(s), wherein the one or two TCI state(s) could be associated with the one code-point of the TCI field.

Based on the MAC CE, at least one of one or more code-points of the TCI field could associate to DL component/part of a TCI state and/or UL component/part of the TCI state.

For example, FIG. 8 illustrates at least two octets included in a MAC CE. The two octets comprise eight 2-bit fields (e.g., S0~S7). Alternatively and/or preferably in certain embodiments, Si may be not consecutive for consecutive value i. Si may not be a consecutive field. Si indicates information of DL, UL or DL+UL for the (i+1)-th code-point of the TCI field. Preferably, Si indicates information of DL, UL, DL+UL, or UL_DL for the (i+1)-th code-point of the TCI field. Preferably, Si may indicate which component of the TCI state associated to the (i+1)-th code-point of the TCI field is used or applied. The (i+1)-th code-point of the TCI field could associate to the TCI state IDi,1. As for the mTRP mechanism, one code-point of the TCI field may need to associate to two DL TCI states or two UL TCI states. Preferably, Ci could indicate whether there is a TCI state IDi,2 for the (i+1)-th code-point of the TCI state. Preferably, information indicated by Si could also be applied to the TCI state IDi,2. Based on Si being indicative of information of DL+UL, the (i+1)-th code-point of the TCI field may comprise information of DL component and UL component of the TCI state associated to the TCI state ID i,1. Preferably, for Ci being indicative of information of 2 TCI states, TCI state IDi,1 and TCI state IDi,2 are associated to DL and UL, respectively. Preferably, the UE may ignore information indicated by Si.

Figure 10:
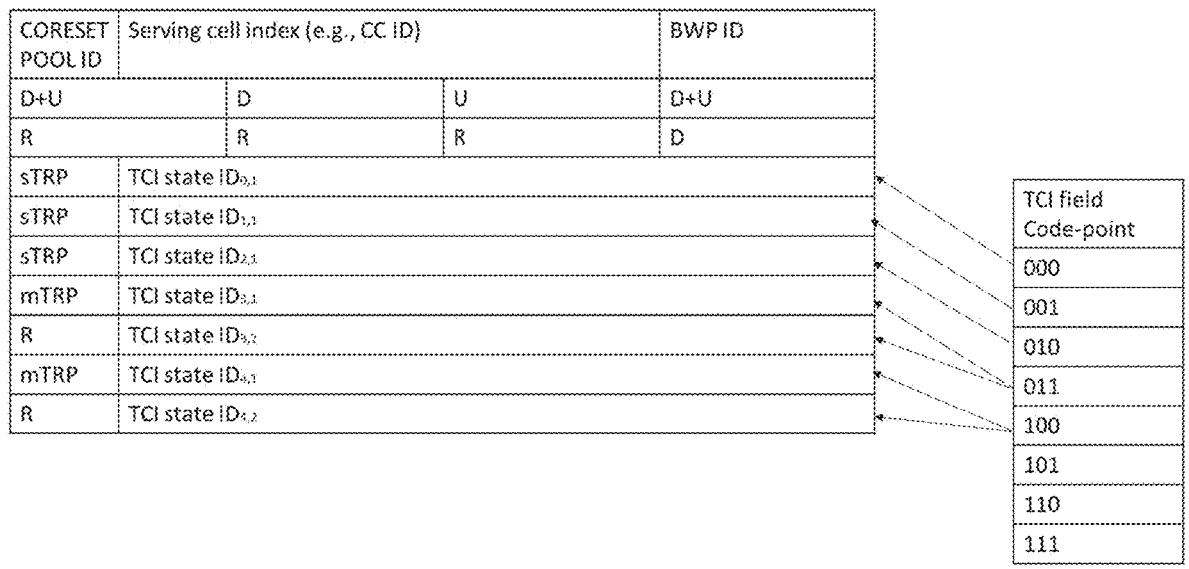
FIG. 10 is an example based on the MAC CE format of FIG. 8, wherein S0 indicates information of D+U, S1 indicates information of U, S2 indicates information of D, S3 indicates information of D+U, and S4 indicates information of D, in accordance with embodiments of the present invention.

For example, FIG. 10 is an example based on the MAC CE format of FIG. 8. S0 indicates information of D+U, and S1 indicates information of U, S2 indicates information of D, S3 indicates information of D+U, and S4 indicates information of D. Alternatively and/or preferably, Si may be not consecutive for consecutive value i. Based on S0, DL and UL component of TCI state with the TCI state ID0,1 is associated to code-point "000" of the TCI field. Based on S0, code-point "000" of the TCI field is used to indicate the beam for DL and the beam for UL. Based on S0, upon receiving DCI having code-point "000" of the TCI field, the UE performs updating DL beam and UL beam. Based on C3 indicating information of mTRP (e.g., 2 TCI state ID), TCI state ID3,1 and TCI state ID3,2 are associated to code-point "011" of the TCI field. According to S3 and C3, the DL and UL component of two TCI states are associated to TCI state ID3,1 and TCI state ID3,2 are associated to code-point "011" of the TCI field.

If MAC CE comprises 7 octets with information of TCI state ID, the UE would determine the first octet with information of the TCI state ID is associated to code-point of the TCI field "000". The UE would determine the second octet with information of the TCI state ID is associated to code-point of the TCI field "001". The UE would determine the third octet with information of the TCI state ID is associated to code-point of the TCI field "010". The UE would determine the fourth and fifth octet with information of the TCI state ID is associated to code-point of the TCI field "011". The UE would determine the sixth and seventh octet with information of the TCI state ID is associated to code-point of the TCI field "100". Based on at least the number of octets associated with information of the TCI state ID, Si and, Ci, the UE could determine association between code-point of the TCI field and one or two TCI state IDs. In this example, since there are only 7 octets associated to information of the TCI state ID, code-point of the TCI field ("101", "110", "111") may not have an activated TCI state (due to no associated TCI state ID). The UE may ignore S5~S7. With this MAC CE format, the number of activated TCI states could be lower than number of code-points of the TCI field. Preferably, it may help to reduce number of activated TCI states for the UE to maintain and measurement which have the benefit of power saving.

One alternative is that at least the two octets (e.g., S0~S7 in FIG. 17) are included in the MAC CE for indicating information of DL component, UL component, or DL+UL component for the TCI state with the TCI state IDi,1 associated with (i+1)-th Tj with value 1 starting from T0. Alternatively and/or preferably, Si may be not consecutive for consecutive value i. Preferably and/or alternatively, Si (e.g., 2 bits) included in the MAC CE indicates information of DL component, UL component, or DL+UL component for the TCI state with the TCI state IDi,1 associated with (i+1)-th Tj with value 1 starting from T0. Tj with value 1 indicates an activated TCI state. The (i+1)-th code-point(s) of the TCI field is associated to the (i+1)-th Tj with value 1 starting from T0. The MAC CE may comprise octets comprising a bit-map from T0~T(N−4)*8+7. For example, if T8, T10 among the bit-map are with value 1, respectively, T8 is associated to S0 and T10 is associated to S1. For Si indicative of information of DL component, the (i+1)-th Tj with value 1 is associated to DL component of the TCI state, and/or the (i+1)-th code-point of the TCI state is associated to DL beam indication. For Si indicative of information of UL component, the (i+1)-th Tj with value 1 is associated to UL component of the TCI state, and/or the (i+1)-th code-point of the TCI state is associated to UL beam indication. For Si indicative of information of DL+UL component, the (i+1)-th Tj with value 1 is associated to DL+UL component of the TCI state, and/or the (i+1)-th code-point of the TCI state is associated to DL+UL beam indication.

Another alternative is that at least the two octets (e.g., S0~S7 in FIG. 17) are included in the MAC CE for indicating information of a DL TCI state pool, UL TCI state pool, or DL+UL TCI state pool for the TCI state with TCI state IDi,1 associated with (i+1)-th Tj with value 1 starting from T0. Alternatively and/or preferably, Si may be not consecutive for consecutive value i. Preferably and/or alternatively, Si (e.g., 2 bits) included in the MAC CE indicates information of the DL TCI state pool, UL TCI state pool, or DL+UL TCI state pool for the TCI state with TCI state IDi,1 associated with (i+1)-th Tj with value 1 starting from T0. Tj with value 1 indicates an activated TCI state. The (i+1)-th code-point(s) of the TCI field is associated to the (i+1)-th Tj with value 1 starting from T0. The MAC CE may comprise octets comprising a bit-map from T0~T(N−4)*8+7. For example, if T8, T10 among the bit-map are with value 1, respectively, T8 is associated to S0 and T10 is associated to S1. For Si indicative of information of the DL TCI state pool, the (i+1)-th Tj with value 1 is associated to the TCI state from the DL TCI state pool, and/or the (i+1)-th code-point of the TCI state is associated to DL beam indication. For Si indicative of information of the UL TCI state pool, the (i+1)-th Tj with value 1 is associated to the TCI state from UL TCI state pool, and/or the (i+1)-th code-point of the TCI state is associated to UL beam indication. For Si indicative of information of the DL+UL TCI state pool, the (i+1)-th Tj with value 1 is associated to the TCI state from the DL TCI state pool and from UL TCI state pool, and/or the (i+1)-th code-point of the TCI state is associated to the DL+UL beam indication. Preferably, the TCI state from the DL TCI state pool with a TCI state ID is associated to the TCI state from the UL TCI state pool with the (same) TCI state ID. In other words, for Si indicative of information of DL+UL TCI state pool, there are two TCI states associated to the (i+1)-th code-point of the TCI field, wherein one is associated with the TCI state from the DL TCI state pool and the other is associated with the TCI state from the UL TCI state pool (with same TCI state ID).

Figures 17, 18:
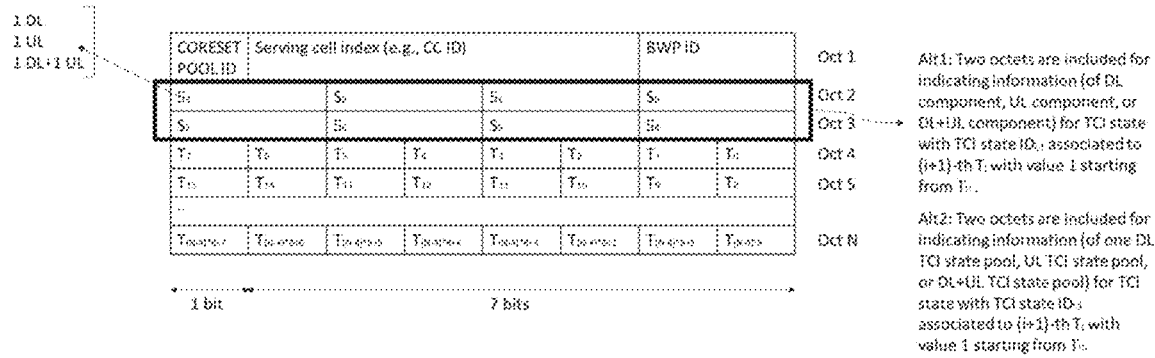
FIG. 17 is an example of at least the two octets (e.g., S0~S7) included in the MAC CE for indicating information of DL component, UL component, or DL+UL component for TCI state with TCI state IDi,1 associated with (i+1)-th Tj with value 1 starting from T0, in accordance with embodiments of the present invention.
FIG. 18 is an example of MAC CE format based on FIG. 17, wherein the MAC CE may comprise the last two octets (e.g., S0~S7), in accordance with embodiments of the present invention.

Another option for MAC CE format (based on FIG. 17) could be illustrated by FIG. 18. The MAC CE may comprise the last two octets (e.g., S0~S7). Alternatively and/or preferably, Si may be not consecutive for consecutive value i. The MAC CE may comprise one or more two bits (e.g., Si). The UE could determine whether the MAC CE comprises "Oct N+2" based on at least number of value "1"s in the bit-map (e.g., T0~T(N−2)*8+7). For the bit-map comprising a number of "1"s being smaller than or equal to 4, the MAC CE does not comprise Oct N+2. For the bit-map comprising a number of "1"s being larger than 4, the MAC CE comprises Oct N+2.

Figure 19:
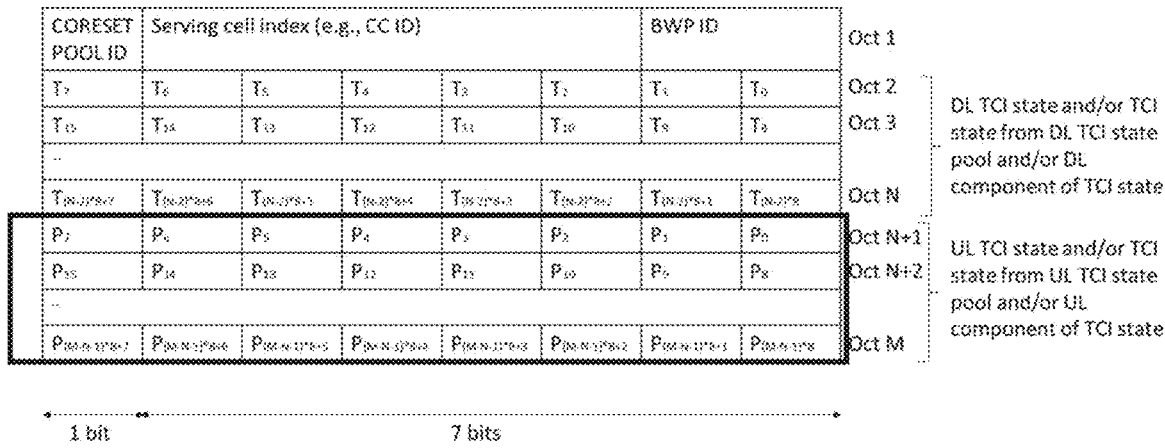
FIG. 19 is an example wherein Oct N+1~Oct M may provide a second bit-map (e.g., P0~P(M−N−1)*8+7) for indicating information related to TCI state for UL, in accordance with embodiments of the present invention.

Another option for MAC CE format (based on FIG. 17) may not comprise the two octets. Instead, the MAC CE may comprise a second bit-map for indicating information related to the TCI state for the UL (e.g., UL TCI state). As illustrated in FIG. 19, Oct N+1~Oct M may provide a second bit-map (e.g., P0~P(M−N−1)*8+7) for indicating information related to the TCI state for UL. The (i+1)-th code-point of TCI field is associated to one or more TCI states based on at least the first bit-map (e.g., T0~T(M−N−1)*8+7) and the second bit-map (e.g., P0~P(M−N−1)*8+7). The (i+1)-th code-point of the TCI field is associated to the (i+1)-th Tj with value 1, if any, and the (i+1)-th Pk with value 1, if any. Preferably, value of j could be the same or different than value of k. In other words, one code-point of the TCI field may be used for beam indication for DL, UL, or DL and UL (based on number of TCI state associated to the code-point of the TCI field). The first bit-map may indicate information of the DL TCI state and/or the TCI state from the DL TCI state pool and/or the DL component of the TCI state. The first bit-map may indicate information of the UL TCI state and/or the TCI state from the UL TCI state pool and/or the UL component of the TCI state.

The MAC CE (also) indicates one or more TCI state ID(s).

The MAC CE (also) indicates one or two TCI state IDs associated to one code-point of the TCI field.

The MAC CE provides/indicates one or two TCI states by the one or two TCI state IDs associated to one code-point of the TCI field.

Based on the one or two TCI state IDs, one code-point of the TCI field could associate to one or more TCI states (associated to the one or two TCI state IDs).

Based on the MAC CE, at least one of one or more code-points of the TCI field could associate to one or more TCI state(s).

The number of code-point(s) are up to 8.

The MAC CE is used for activating a number of the TCI state(s).

The number of TCI state(s) is up to 16.

Preferably in certain embodiments, the one or more DL TCI states could be associated to a DL TCI state pool.

Preferably in certain embodiments, the one or more UL TCI states could be associated to a UL TCI state pool.

Preferably in certain embodiments, one DL and/or UL TCI state pool could be associated to a BWP and/or a CC.

Concept 2

This concept is to have at least one octet in a MAC CE for indicating a first portion of information for a number of code-point(s) of a TCI field. Preferably, a second portion of information for a number of code-point(s) of the TCI field may be indicated by a MSB/LSB bit for the number of octets associated to the number of code-point(s) of the TCI field. Alternatively, this concept is to have at least one bit in a MAC CE for indicating a first portion of information for one code-point of the TCI field. Each of one or more one bits included in the MAC CE may be not consecutive (e.g., consecutive may refer being in same octet or LSB of x-th octet and MSB of (x+1)-th octet or MSB of x-th octet and LSB of (x+1)-th octet).

The first portion of information for a number of code-point(s) of the TCI field may comprise information indicating DL or UL for the number of code-point(s) of the TCI field, respectively.

The first portion of information for a code-point of the TCI field may comprise information indicating DL or UL for the first TCI state (ID) for the code-point of the TCI field.

Alternatively and/or preferably in certain embodiments, the first portion of information for a number of code-point(s) of the TCI field may comprise information indicating one or two TCI states (ID) for the number of code-point(s) of the TCI field, respectively.

Alternatively and/or preferably in certain embodiments, the first portion of information for a code-point of the TCI field may comprise information indicating one or two TCI states (ID) for the code-point of the TCI field.

The second portion of information for a number of code-point(s) of the TCI field may comprise information indicating DL or UL for the number of code-point(s) of the TCI field, respectively.

The second portion of information for a code-point of the TCI field may comprise information indicating DL or UL for the first TCI state (ID) for the code-point of the TCI field.

Alternatively and/or preferably in certain embodiments, the second portion of information for a number of code-point(s) of the TCI field may comprise information indicating one or two TCI states (ID) for the number of code-point(s) of the TCI field, respectively.

Alternatively and/or preferably in certain embodiments, the second portion of information for a code-point of the TCI field may comprise information indicating one or two TCI states (ID) for the code-point of the TCI field.

The UE could be configured with one or more DL TCI states and one or more UL TCI states in a BWP and/or in a CC. At least one of the one or more DL TCI states is with a TCI state ID being the same as the TCI state ID of at least one of the one or more UL TCI states.

(Each) one bit (from the one octet) could indicate first portion of information for (each) one code-point of the TCI field.

Preferably in certain embodiments, (each) one bit (from the one octet) could indicate information of usage or applied direction of beam indication for one code-point of the TCI field.

Preferably in certain embodiments, (each) one bit (from the one octet) could indicate information that whether the first TCI state ID (associated to code-point of TCI field) is associated to the one or more DL TCI states or is associated to the one or more UL TCI states.

Alternatively and/or preferably in certain embodiments, (each) one bit (from the one octet) could indicate information of whether (each) one code-point of the TCI field associated to one or two TCI state ID(s).

Alternatively and/or preferably in certain embodiments, (each) one bit (from the one octet) could indicate information of whether (each) one code-point of the TCI field associated to one or two TCI state(s).

Based on the MAC CE, at least one of one or more code-point of the TCI field could associate to DL beam indication, UL beam indication, and/or DL beam indication and UL beam indication.

Based on the MAC CE, at least one of one or more code-points of the TCI field could associate to one DL TCI state, one UL TCI state, or one DL TCI state and one UL TCI state.

Figure 11:
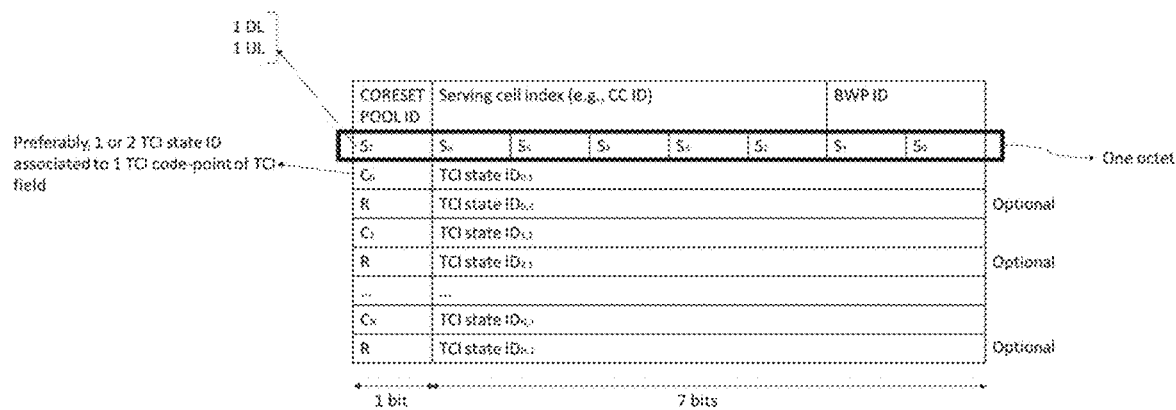
FIG. 11 is an example of at least one octet (e.g., the second top octet) included in a MAC CE, in accordance with embodiments of the present invention.

For example, FIG. 11 illustrates at least one octet (the second top octet in FIG. 11) are included in a MAC CE. The one octet comprises eight 1-bit fields (e.g., S0~S7). Alternatively and/or preferably, $S_i$ may be not consecutive for consecutive value i. $S_i$ indicates information of DL, UL for the (i+1)-th code-point of a TCI field (especially for the TCI state IDi,1). The (i+1)-th code-point of the TCI field could associate to the TCI state IDi,1 and the TCI state IDi,2, (if present). $C_i$ may be the MSB/LSB bit of octet associated to the TCI state IDi,1 or associated to the (i+1)-th code-point of the TCI field. Based on $C_i$, the UE could determine whether there are TCI state IDi,2 associated to (i+1)-th code-point of the TCI field. Based on at least $S_i$ and $C_i$, the UE could determine that the TCI state IDi,1, TCI state IDi,2 are associated to "DL TCI state, UL TCI state" or "UL TCI state, DL TCI state". Based on $S_i$, the UE could determine the TCI state ID i,1 is associated to the one or more DL TCI states or the one or more UL TCI states. Based on $C_i$ being indicative of 2 TCI states for the (i+1)-th code-point of the TCI field, the UE could consider the (i+1)-th code-point of the TCI field corresponds to at least 1 DL and at least 1 UL. In other words, the (i+1)-th code-point of the TCI field indicates DL beam indication (via one of the two TCI states (ID) associated to the (i+1)-th code-point of TCI field) and UL beam indication (via the other one of the two TCI states (ID) associated to the (i+1)-th code-point of the TCI field). Upon receiving DCI with TCI field indicative of the (i+1)-th code-point, the UE would update DL beam and UL beam based on the two TCI states associated to the (i+1)-th code-point of the TCI field. In FIG. 11, MAC CE may comprise information for locating the TCI state ID (e.g., CC ID, and/or BWP ID). Preferably, for $C_i$ being indicative of information of 2 TCI states, TCI state IDi,1 and TCI state IDi,2 are associated to DL and UL, respectively. Preferably, the UE may ignore information indicated by $S_i$.

Figure 12:
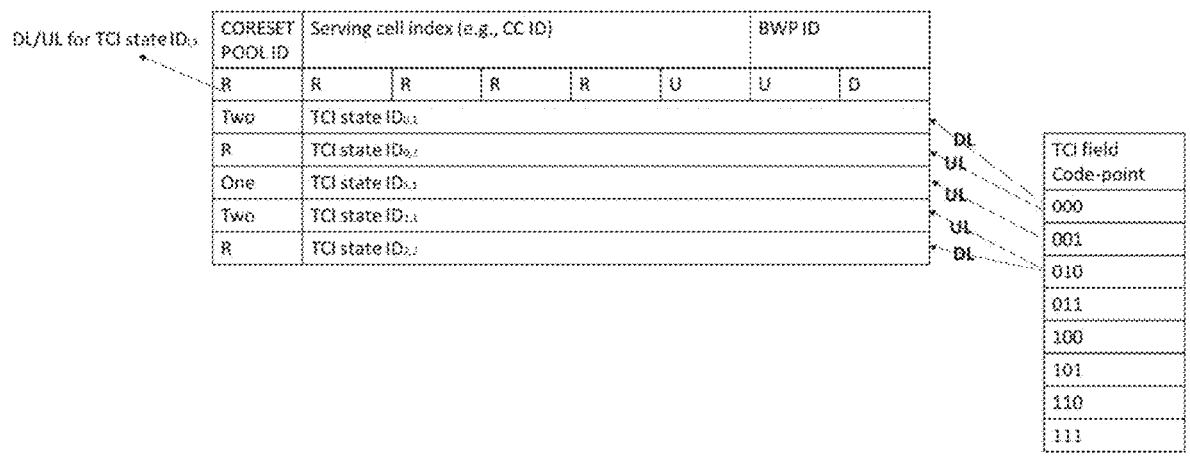
FIG. 12 is an example based on the MAC CE format of FIG. 11, wherein S0 indicates information of D, S1 indicates information of U, and S2 indicates information of U, in accordance with embodiments of the present invention.

For example, FIG. 12 is an example based on MAC CE format of FIG. 11. S0 indicates information of D, and S1 indicates information of U, and S2 indicates information of U. Alternatively and/or preferably, $S_i$ may be not consecutive for consecutive value i. If MAC CE comprises 5 octets with information of the TCI state ID, the UE would determine the first and second octet with information of the TCI state ID is associated to code-point of TCI field "000" based upon at least C0 indicating 2 TCI state ID. The UE would determine the third octet with information of the TCI state ID is associated to code-point of the TCI field "001". The UE would determine the fourth and fifth octet with information of the TCI state ID is associated to code-point of the TCI field "010" based upon at least C2 indicating 2 TCI state ID. Based on at least the number of octets associated with information of the TCI state ID and Si, the UE could determine association between code-point of the TCI field and one or two TCI state IDs. In this example, since there are only 5 octets associated to information of the TCI state ID, code-point of the TCI field ("011", "100", "101", "110", "111") may not have activated TCI state (due to no associated TCI state ID). The UE may ignore S3~S7. With this MAC CE format, number of activated TCI states could be lower than number of code-point of the TCI field. Preferably, TCI state ID0,1 is associated to one DL TCI state (of the one or more DL TCI state). Preferably, TCI state ID0,2 is associated to one UL TCI state (of the one or more UL TCI state). Preferably, code-point "000" of the TCI field is associated to 1 DL TCI state and 1 UL TCI state. In other words, code-point "000" of the TCI field could indicate DL beam via the 1 DL TCI state and indicate UL beam via the 1 UL TCI state. Preferably, it may help to reduce number of activated TCI state for the UE to maintain and measurement which have the benefit of power saving.

Figure 13:
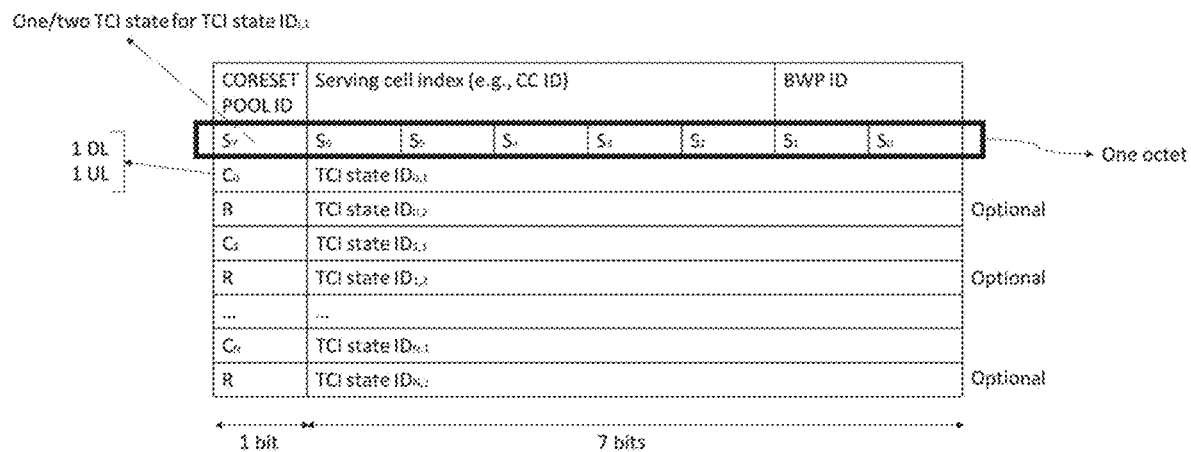
FIG. 13 is an example of at least one octet (e.g., the second top octet) included in a MAC CE, in accordance with embodiments of the present invention.

As an alternative example (compared to FIG. 11), FIG. 13 illustrates at least one octet (the second top octet in FIG. 13) are included in a MAC CE. The one octet comprises eight 1-bit fields (e.g., S0~S7). Alternatively and/or preferably, Si may be not consecutive for consecutive value i. Si indicates information of one or two TCI state (ID) for the (i+1)-th code-point of the TCI field. The (i+1)-th code-point of the TCI field could associate to the TCI state IDi,1 and the TCI state IDi,2, (if present and/or if Si indicates two TCI state (ID)). Ci may be the MSB/LSB bit of octet associated to the TCI state IDi,1 or associated to the (i+1)-th code-point of the TCI field. Ci may indicate either DL or UL for the TCI state IDi,1. Preferably, for Si being indicative of information of 2 TCI states, TCI state IDi,1 and TCI state IDi,2 are associated to DL and UL, respectively. Preferably, the UE may ignore information indicated by Si.

The UE could be configured with one or more TCI states. Preferably, each of the one or more TCI states comprises DL components and/or UL components.

(Each) one bit (from the one octet) could indicate first portion of information for (each) one code-point of the TCI field.

Preferably in certain embodiments, (each) one bit (from the one octet) could indicate information that whether the TCI state (associated to code-point of the TCI field) is associated to at least DL component of the TCI state or UL component of the TCI state.

Alternatively and/or preferably in certain embodiments, (each) one bit (from the one octet) could indicate information whether (each) one code-point of the TCI field associated to one component or two component of one TCI state.

Alternatively and/or preferably in certain embodiments, (each) one bit (from the one octet) could indicate information that one or two component of the TCI state associated to one code-point of the TCI field.

Based on the MAC CE, at least one of one or more code-point of the TCI field could associate to DL beam indication, UL beam indication, and/or DL beam indication and UL beam indication.

Based on the MAC CE, at least one of one or more code-points of the TCI field could associate to DL component of one TCI state, UL component of one TCI state, or one DL component and UL component of one TCI state.

Figure 14:
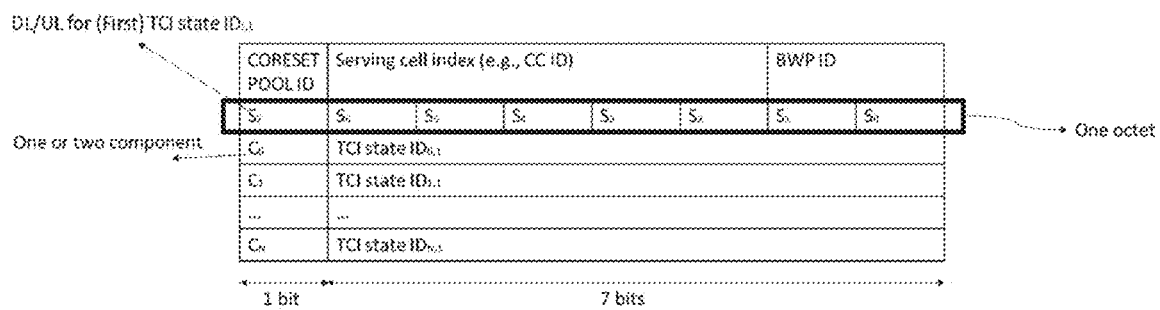
FIG. 14 is an example of at least one octet included in a MAC CE, wherein the at least one octet comprises eight 1-bit fields (e.g., S0~S7), in accordance with embodiments of the present invention.

For example, FIG. 14 illustrates that at least one octet is included in a MAC CE. The one octet comprises eight 1-bit fields (e.g., S0~S7). Alternatively and/or preferably, Si may be not consecutive for consecutive value i. Si indicates information of at least DL component, or UL component of one TCI state associated to the TCI state IDi,1 (associated to the (i+1)-th code-point of the TCI field). Preferably, Si indicates information of at least DL (beam indication), or UL (beam indication) for the (i+1)-th code-point of the TCI field. Preferably, Si may indicate which component of the TCI state associated to the (i+1)-th code-point of the TCI field is used or applied. The (i+1)-th code-point of the TCI field could associate to the TCI state IDi,1. Preferably, for Ci being indicative of information of 2 TCI states, the (i+1)-th code-point of the TCI field is associated to DL and UL component of the TCI state associated to the TCI state IDi,1. Preferably, the UE may ignore information indicated by Si.

Figure 15:
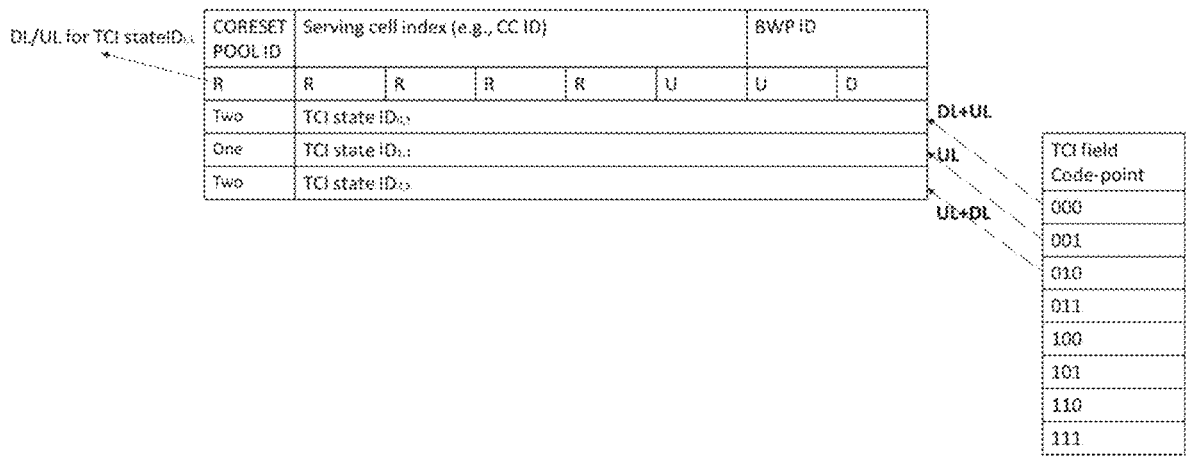
FIG. 15 is an example of S0 indicating information of DL, S1 indicating information of UL, and S2 indicating information of UL, in accordance with embodiments of the present invention.

For example, in FIG. 15, S0 indicates information of DL, S1 indicates information of UL, and S2 indicates information of UL. Alternatively and/or preferably, Si may be not consecutive for consecutive value i. There are three octets with TCI state ID. C0 indicates information of two components, C1 indicates information of one components, and C2 indicates information of two components. In this example, one octet with TCI state ID is associated to one code-point of the TCI field. Code-point "000" of TCI field (e.g., 1-st code-point of TCI field) is associated to the TCI state ID0,1. Based on information indicated by C0 (e.g., two component), the UE would determine that DL component and UL component of the TCI state associated to the TCI state ID0,1 is associated or applied. Based on information indicated by C0 (e.g., two component), the UE would determine that code-point "000" of the TCI field could indicate beam or update beam for DL and UL. Upon receiving a DCI with TCI field indicating code-point "000", the UE could (simultaneously) update DL beam and UL beam based on the TCI state with the TCI state ID0,1.

Figure 16:
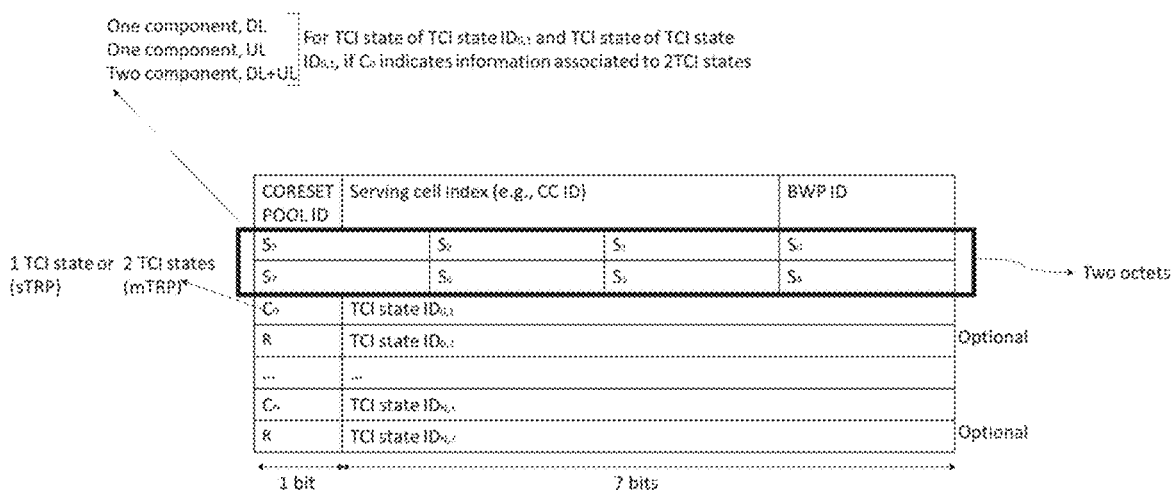
FIG. 16 is an example of a mTRP mechanism, and at least two octets (e.g., S0~S7) indicating which component of TCI state is used, in accordance with embodiments of the present invention.

For another example, FIG. 16 illustrates mTRP mechanism, and at least two octets (e.g., S0~S7) indicates which component of the TCI state is used. Si, is at least associated to the TCI state IDi,1. Alternatively and/or preferably, Si may be not consecutive for consecutive value i. Si, could indicate information of (applying/using) DL component, (applying/using) UL component, or (applying/using) DL component and UL component of a TCI state associated to at least the TCI state IDi,1. Ci, may indicate information that whether there is TCI state IDi,2. Preferably, if Ci indicate information of two TCI states (e.g., mTRP), information by Si could (also) apply to the TCI state IDi,2. One code-point of the TCI field may need to associate to one or two TCI states based on Ci. Preferably, Ci could indicate whether there is a TCI state IDi,2 for the (i+1)-th code-point of the TCI state. Preferably, information indicated by Si could also applied to the TCI state IDi,2. Based on Si being indicative of information of DL+UL, the (i+1)-th code-point of the TCI field may comprise information of DL component and UL component of the TCI state associated to the TCI state IDi,1.

Preferably in certain embodiments, the one octet in the MAC CE could be a bit-map (for indicating information for up to 8 code-point of the TCI field).

Preferably in certain embodiments, one bit, in a bit-map, may indicate information for 1 code-point of the TCI field.

Preferably in certain embodiments, one bit, in a bit-map, may indicate information for one or two TCI states of 1 code-point of the TCI field.

Preferably in certain embodiments, one bit (Si), in a bit-map, may indicate information for UL or DL TCI state of (the first one TCI state, TCI state IDi,1) of 1 code-point of the TCI field.

Preferably in certain embodiments, one bit (Si), in a bit-map, may indicate information that (the first one TCI state, TCI state IDi,1) of 1 code-point of the TCI field is associated to the one or more DL TCI states or the one or more UL TCI states.

Preferably in certain embodiments, one bit (Si), in a bit-map, may indicate information that (the first one TCI state, TCI state IDi,1) of 1 code-point of the TCI field is associated to the DL TCI state pool or UL TCI state pool.

Alternatively and/or preferably in certain embodiments, one bit (Si), in a bit-map, may indicate information for one or two components of one TCI state (e.g., TCI state IDi,1) of 1 code-point of the TCI field (e.g., (i+1)-th code-point of the TCI field).

Alternatively and/or preferably in certain embodiments, one component of the TCI state could be either DL component of the TCI state or UL component of the TCI state.

Alternatively and/or preferably in certain embodiments, one component of the TCI state could be DL component of the TCI state and UL component of the TCI state.

Alternatively and/or preferably in certain embodiments, one bit, in a bit-map, may indicate information for DL/UL or DL+UL component of one TCI state (ID) of 1 code-point of the TCI field.

Alternatively and/or preferably in certain embodiments, one bit (Si), in a bit-map, may indicate information for at least applying UL component or DL component of the first one TCI state (TCI state IDi,1) of 1 code-point of the TCI field (e.g., (i+1)-th code-point of the TCI field).

Preferably in certain embodiments, MAC CE may comprise an octet for indicating information of BWP ID, and/or CC ID, and/or CORESETPoolIndex ID (, if coresetPoolIndex is configured).

Preferably in certain embodiments, MAC CE may comprise one or more bits for indicating information of BWP ID, and/or CC ID, and/or CORESETPoolIndex ID (, if coresetPoolIndex is configured).

Preferably in certain embodiments, CORESETPoolIndex ID is 0 or 1.

Preferably in certain embodiments, BWP ID is 0, 1, 2 or 3.

Preferably in certain embodiments, CC ID (e.g., serving cell ID) is from 0, 1, . . . , or 31. Preferably in certain embodiments, for the UE being not configured with mTRP scheme (e.g., RepetitionSchemeConfig), FIG. 14 could be an example of MAC CE (format) for activating the TCI state for DL beam indication and/or UL beam indication.

Preferably in certain embodiments, for the UE being configured with mTRP scheme (e.g., RepetitionSchemeConfig), FIG. 16 could be an example of MAC CE (format) for activating the TCI state for DL beam indication and/or UL beam indication with mTRP scheme.

Concept 3

This concept is to have at least three octets in a MAC CE for indicating information associated to usage or applied transmit direction and sTRP or mTRP for a number of code-point(s) of the TCI field. Alternatively, this concept is to have at least three bits in a MAC CE for indicating information associated to usage or applied transmit direction for one code-point of the TCI field. Each of one or more three bits included in the MAC CE may be not consecutive (e.g., consecutive may refer being in same octet or LSB of x-th octet and MSB of (x+1)-th octet or MSB of x-th octet and LSB of (x+1)-th octet).

The UE could be configured with one or more DL TCI states and one or more UL TCI states in a BWP and/or in a CC. At least one of the one or more DL TCI states is with a TCI state ID being the same as the TCI state ID of at least one of the one or more UL TCI states.

(Each) three bits (from the three octets) could indicate information associated to usage or applied direction of beam indication and sTRP or mTRP for one code-point of the TCI field.

(Each) three bits (from the three octets) could indicate information that whether one TCI state ID (associated to code-point of TCI field) is associated to the one or more DL TCI states or is associated to the one or more UL TCI states.

(Each) three bits (from the three octets) could indicate information of whether one code-point of the TCI field associated to one or two TCI state ID(s).

(Each) three bits (from the three octets) could indicate information of whether one code-point of the TCI field associated to one or two TCI state(s).

Based on the MAC CE, at least one of one or more code-points of the TCI field could associate to DL beam indication, UL beam indication, and/or DL beam indication and UL beam indication.

Based on the MAC CE, at least one of one or more code-points of the TCI field could associate to one DL TCI state, one UL TCI state, or one DL TCI state and one UL TCI state.

Based on the MAC CE, at least one of one or more code-points of the TCI field could associate to sTRP DL, sTRP UL, mTRP DL, mTRP UL, sTRP DL and sTRP UL, sTRP DL and mTRP UL, sTRP UL and mTRP DL, or mTRP DL and mTRP UL.

Preferably in certain embodiments, sTRP may associate to one TCI state.

Preferably in certain embodiments, mTRP may associate to more than one TCI state.

Preferably in certain embodiments, mTRP may associate to two TCI states.

Figure 20:
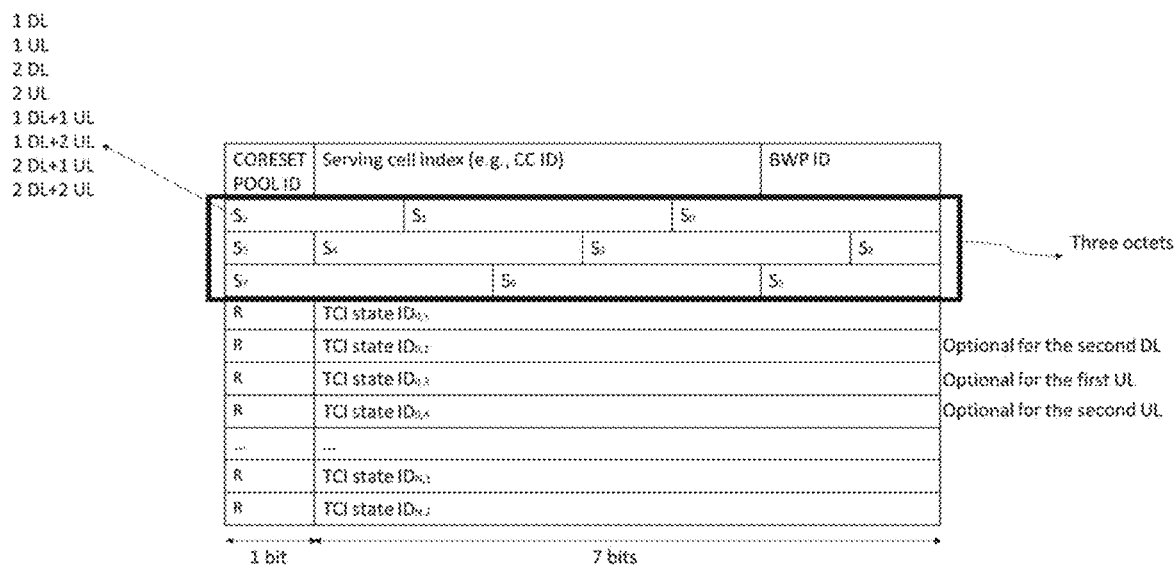
FIG. 20 is an example wherein Si could indicate information of sTRP/mTRP and DL/UL, in accordance with embodiments of the present invention.

For example, in FIG. 20, Si could indicate information of sTRP/mTRP and DL/UL. For total number of DLs and ULs associated to information indicated by Si, the MAC CE may comprise at least the total number of octets for the (i+1)-th code-point of the TCI field. Alternatively and/or preferably, Si may be not consecutive for consecutive value i. If S0 indicates information of 2DL+2UL, the MAC CE may comprise at least four octets for the first code-point of the TCI field (e.g., "000" or "00" or "0" of TCI field). TCI state ID0,1 may associate to (a first) TCI state from DL TCI state pool. TCI state ID0,2 may associate to (a second) TCI state from DL TCI state pool. TCI state ID0,3 may associate to (a first) TCI state from UL TCI state pool. TCI state ID0,4 may associate to (a second) TCI state from UL TCI state pool. For another example, if S0 indicates information of 2UL, the MAC CE does not comprise octet(s) associated to TCI state ID0,3 and TCI state ID0,4. In this example, TCI state ID0,1 is associated to (a first) TCI state from UL TCI state pool, and TCI state ID0,2 is associated to (a second) TCI state from UL TCI state pool. A number of octet(s) associated to a code-point of the TCI field (e.g., the (i+1)-th code-point of TCI field) may be determined based on at least information from Si. If there are one or two DL from information from Si, octet associated to the TCI state IDi,1 is associated to the TCI state from DL TCI state pool, and octet associated to the TCI state IDi,2 is associated to the TCI state from DL TCI state pool, if two DL from information Si is indicated.

The UE could be configured with one or more TCI states. Preferably, each of the one or more TCI states comprises DL components and/or UL components.

(Each) three bits (from the three octets) could indicate information of applied DL component/part and/or UL component/part of one or two TCI state(s) associated to one code-point of the TCI field.

(Each) three bits (from the three octets) could indicate usage or applied direction of beam indication for one code-point of the TCI field.

(Each) three bits (from the three octets) could indicate information that which component of DL component and/or UL component of the TCI state associated to one code-point of the TCI field is applied or used.

(Each) three bits (from the three octets) could indicate information of whether one code-point of the TCI field associated to one or two TCI state ID(s).

(Each) three bits (from the two octets) could indicate information of whether one code-point of the TCI field associated to one or two TCI state(s).

Based on the MAC CE, at least one of one or more code-points of the TCI field could associate applied DL component/part and/or UL component/part of one or two TCI state(s) associated to one code-point of the TCI field.

Based on the MAC CE, at least one of one or more code-points of the TCI field could associate to DL component/part of a TCI state and/or UL component/part of the TCI state.

Based on the MAC CE, at least one of one or more code-points of the TCI field could associate to sTRP DL, sTRP UL, mTRP DL, mTRP UL, sTRP DL and sTRP UL, sTRP DL and mTRP UL, sTRP UL and mTRP DL, or mTRP DL and mTRP UL.

Preferably in certain embodiments, sTRP may associate to one TCI state.

Preferably in certain embodiments, mTRP may associate to more than one TCI state.

Preferably in certain embodiments, mTRP may associate to two TCI states

Figure 21:
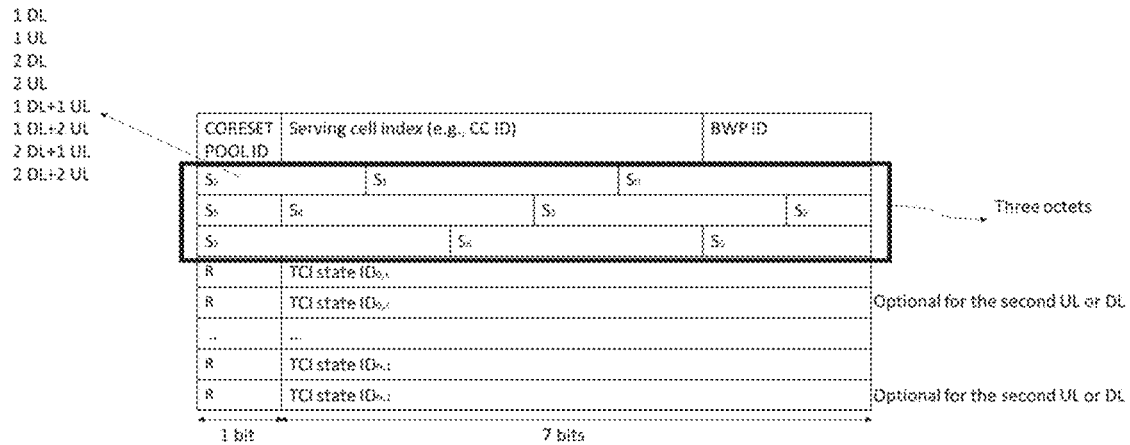
FIG. 21 is an example wherein Si could indicate information of sTRP/mTRP and DL/UL, wherein information indicated by Si, being a combination of DL and UL, at least a DL component and a UL component of one TCI state is applied or associated, in accordance with embodiments of the present invention.

For example, in FIG. 21, Si could indicate information of sTRP/mTRP and DL/UL. For information indicated by Si, being as a combination of DL and UL, at least the DL component and the UL component of one TCI state is applied or associated. For information indicated by Ci, being at least of number of 2 for DL and/or UL, the MAC CE for the (i+1)-th code-point of the TCI field may comprise the second octet comprising the TCI state IDi,2. Alternatively and/or preferably, Si may be not consecutive for consecutive value i.

Concept 4

This concept is to have at least two octet in a MAC CE for indicating a first portion of information for a number of code-point(s) of the TCI field. Preferably, a second portion of information for a number of code-point(s) of the TCI field may be indicated by a MSB/LSB bit for the number of octets associated to the number of code-point(s) of the TCI field. Alternatively, this concept is to have at least two bits in a MAC CE for indicating a first portion of information for one code-point of the TCI field. Each of one or more one bits included in the MAC CE may be not consecutive (e.g., consecutive may refer being in same octet or LSB of x-th octet and MSB of (x+1)-th octet or MSB of x-th octet and LSB of (x+1)-th octet).

The first portion of information for a number of code-point(s) of the TCI field may comprise information indicating DL and/or UL for the number of code-point(s) of the TCI field, respectively.

The first portion of information for a code-point of the TCI field may comprise information indicating DL and/or UL for the first TCI state (ID) for the code-point of the TCI field.

Alternatively and/or preferably in certain embodiments, the first portion of information for a number of code-point(s) of the TCI field may comprise information indicating one or two TCI states (ID) for the number of code-point(s) of the TCI field, respectively.

Alternatively and/or preferably in certain embodiments, the first portion of information for a code-point of TCI field may comprise information indicating one or two TCI states (ID) for the code-point of the TCI field.

The second portion of information for a number of code-point(s) of the TCI field may comprise information indicating DL and/or UL for the number of code-point(s) of the TCI field, respectively.

The second portion of information for a code-point of the TCI field may comprise information indicating DL and/or UL for the first TCI state (ID) for the code-point of the TCI field.

Alternatively and/or preferably in certain embodiments, the second portion of information for a number of code-point(s) of the TCI field may comprise information indicating one or two TCI states
(ID) for the number of code-point(s) of the TCI field, respectively.

Alternatively and/or preferably in certain embodiments, the second portion of information for a code-point of the TCI field may comprise information indicating one or two TCI states (ID) for the code-point of the TCI field.

The UE could be configured with one or more DL TCI states and one or more UL TCI states in a BWP and/or in a CC. At least one of the one or more DL TCI states is with a TCI state ID being the same as the TCI state ID of at least one of the one or more UL TCI states.

(Each) two bits (from the two octets) could indicate first portion of information for (each) one code-point of the TCI field.

Preferably in certain embodiments, (each) two bits (from the two octets) could indicate information of usage or applied direction of beam indication for one code-point of the TCI field.

Preferably in certain embodiments, (each) two bits (from the two octets) could indicate information that whether the first TCI state ID (associated to code-point of the TCI field) is associated to the one or more DL TCI states or is associated to the one or more UL TCI states.

Alternatively and/or preferably in certain embodiments, (each) two bits (from the two octets) could indicate information of whether (each) one code-point of the TCI field associated to one or two TCI state ID(s).

Alternatively and/or preferably in certain embodiments, (each) two bits (from the two octets) could indicate information of whether (each) one code-point of the TCI field associated to one or two TCI state(s).

Based on the MAC CE, at least one of one or more code-points of the TCI field could associate to DL beam indication, UL beam indication, and/or DL beam indication and UL beam indication.

Based on the MAC CE, at least one of one or more code-points of the TCI field could associate to one DL TCI state, one UL TCI state, or one DL TCI state and one UL TCI state.

Based on the MAC CE, at least one of one or more code-points of the TCI field could associate to sTRP DL, sTRP UL, mTRP DL, mTRP UL, sTRP DL and sTRP UL, sTRP DL and mTRP UL, sTRP UL and mTRP DL, or mTRP DL and mTRP UL.

Preferably in certain embodiments, sTRP may associate to one TCI state.

Preferably in certain embodiments, mTRP may associate to more than one TCI state.

Preferably in certain embodiments, mTRP may associate to two TCI states

Figure 22:
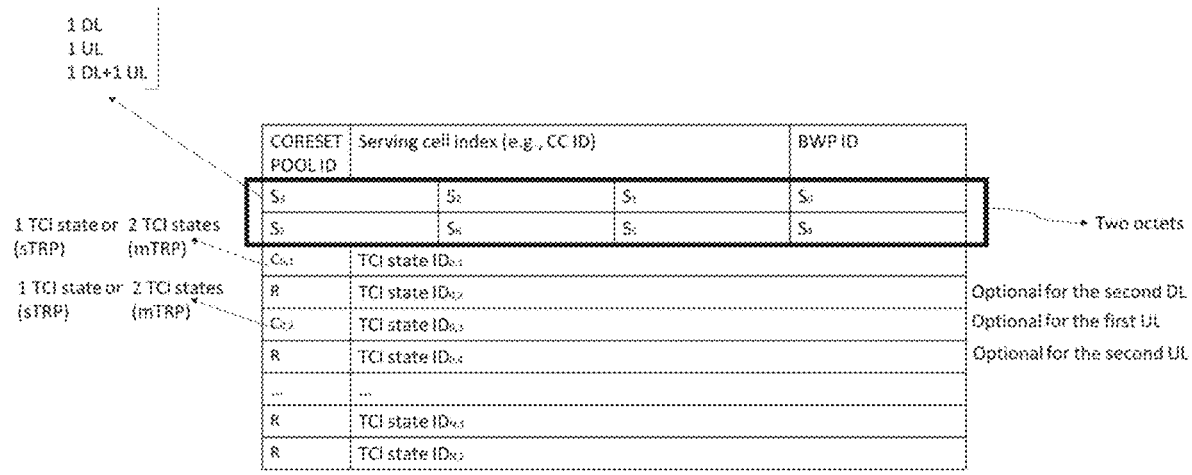
FIG. 22 is an example wherein Si could indicate information of DL and/or UL, and Ci,1 would indicate information of 1 TCI state or 2 TCI states, in accordance with embodiments of the present invention.

For example, in FIG. 22, Si could indicate information of DL and/or UL. Ci,1 would indicate information of 1 TCI state or 2 TCI states. Ci,2 would indicate information of 1 TCI state or 2 TCI states. Alternatively, Ci,2 would indicate information of 1 TCI state or 2 TCI states if information indicated by Si is DL+UL. Ci,1 and/or Ci,2 could indicate information of sTRP or mTRP. Based on information indicated by Si, the UE could determine the (i+1)-th code-point of the TCI state is associated to the TCI state from DL TCI state pool and/or from UL TCI state pool. Based on information indicated by Ci,1, the UE could determine whether mTRP is associated to the (i+1)-th code-point of the TCI field for DL or UL. If S0 indicates information of DL+UL, the MAC CE may comprise at least two octets comprising the TCI state ID associated to the first code-point of the TCI field (e.g., "000" or "00" or "0" of the TCI field). Based on information indicated by S0, and C0,1 and C0,2, if any, the UE could determine a number of octet comprising the TCI state ID associated to the first code-point of the TCI field. For information indicated by Si is DL or UL, one or two octets comprising the TCI state ID is associated to the (i+1)-th code-point of the TCI field and/or there are no C0,2. For information indicated by Si is DL+UL, one or two or three or four octets comprising the TCI state ID is associated to the (i+1)-th code-point of the TCI field. If C0,1 indicates information of 1 TCI state, (then) TCI state ID0,2 does not associate to DL TCI state pool and/or C0,2 is associated to the TCI state ID0,2. If C0,1 indicates information of 2 TCI states, (then) TCI state ID0,2 associates to DL TCI state pool and/or C0,2 is associated to TCI state ID0,3. If C0,2 indicates information of 1 TCI states, at least one octet comprising the TCI state is associated to the TCI state from UL TCI state pool. Alternatively and/or preferably, Si may be not consecutive for consecutive value i.

Preferably in certain embodiments, the following table could illustrate mechanism for MAC CE (format) of FIG. 22.

| $S_i$ | $C_{i,1}$ | $C_{i,2}$ | #Octets for (i + 1)-th code-point of TCI field | (i + 1)-th code-point of TCI field |
|---|---|---|---|---|
| DL | 1 | No field | TCI state $ID_{i,1}$ | sTRP DL beam indication based on TCI state $ID_{i,1}$ from DL TCI state pool |
| UL | 1 | No field | TCI state $ID_{i,1}$ | sTRP UL beam indication based on TCI state $ID_{i,1}$ from UL TCI state pool |
| DL | 2 | No field | TCI state $ID_{i,1}$ TCI state $ID_{i,2}$ | mTRP DL beam indication based on TCI state $ID_{i,1}$ and TCI state $ID_{i,2}$ from DL TCI state pool |
| UL | 2 | No field | TCI state $ID_{i,1}$ TCI state $ID_{i,2}$ | mTRP UL beam indication based on TCI state $ID_{i,1}$ and TCI state $ID_{i,2}$ from UL TCI state pool |
| DL + UL | 1 | 1 (Exist on octet comprising TCI state $ID_{i,2}$) | TCI state $ID_{i,1}$ TCI state $ID_{i,2}$ | sTRP DL beam indication based on TCI state $ID_{i,1}$ from DL TCI state pool sTRP UL beam indication based on TCI state $ID_{i,2}$ from UL TCI state pool |
| DL + UL | 1 | 2 (Exist on octet comprising TCI state $ID_{i,2}$) | TCI state $ID_{i,1}$ TCI state $ID_{i,2}$ TCI state $ID_{i,3}$ | sTRP DL beam indication based on TCI state $ID_{i,1}$ from DL TCI state pool mTRP UL beam indication based on TCI state $ID_{i,2}$ and TCI state $ID_{i,3}$ from UL TCI state pool |
| DL + UL | 2 | 1 (Exist on octet comprising TCI state $ID_{i,3}$) | TCI state $ID_{i,1}$ TCI state $ID_{i,2}$ TCI state $ID_{i,3}$ | mTRP DL beam indication based on TCI state $ID_{i,1}$ and TCI state $ID_{i,2}$ from DL TCI state pool sTRP UL beam indication based on TCI state $ID_{i,3}$ from UL TCI state pool |
| DL + UL | 2 | 2 (Exist on octet comprising TCI state $ID_{i,3}$) | TCI state $ID_{i,1}$ TCI state $ID_{i,2}$ TCI state $ID_{i,3}$ TCI state $ID_{i,4}$ | mTRP DL beam indication based on TCI state $ID_{i,1}$ and TCI state $ID_{i,2}$ from DL TCI state pool mTRP UL beam indication based on TCI state $ID_{i,3}$ and TCI state $ID_{i,4}$ from UL TCI state pool |

The UE could be configured with one or more TCI states. Preferably, each of the one or more TCI states comprises DL components and/or UL components.

(Each) two bits (from the two octets) could indicate first portion of information for (each) one code-point of the TCI field.

Preferably in certain embodiments, (each) two bits (from the two octets) could indicate information that whether the TCI state (associated to code-point of the TCI field) is associated to at least DL component of the TCI state or UL component of the TCI state.

Alternatively and/or preferably in certain embodiments, (each) two bits (from the two octets) could indicate information whether (each) one code-point of the TCI field associated to one component or two component of one TCI state.

Alternatively and/or preferably in certain embodiments, (each) two bits (from the two octets) could indicate information that one or two components of the TCI state associated to one code-point of the TCI field.

Preferably in certain embodiments, information indicated by two bits (from the two octets) may associate to one or two TCI state (ID) for one code-point of the TCI field.

Based on the MAC CE, at least one of one or more code-points of the TCI field could associate to DL beam indication, UL beam indication, and/or DL beam indication and UL beam indication.

Based on the MAC CE, at least one of one or more code-points of the TCI field could associate to DL component of one TCI state, UL component of one TCI state, or one DL component and UL component of one TCI state.

Based on the MAC CE, at least one of one or more code-points of the TCI field could associate to sTRP DL, sTRP UL, mTRP DL, mTRP UL, sTRP DL and sTRP UL, or mTRP DL and mTRP UL.

Preferably in certain embodiments, sTRP may associate to one TCI state.

Preferably in certain embodiments, mTRP may associate to more than one TCI state.

Preferably in certain embodiments, mTRP may associate to two TCI states

Figures 23, 24:
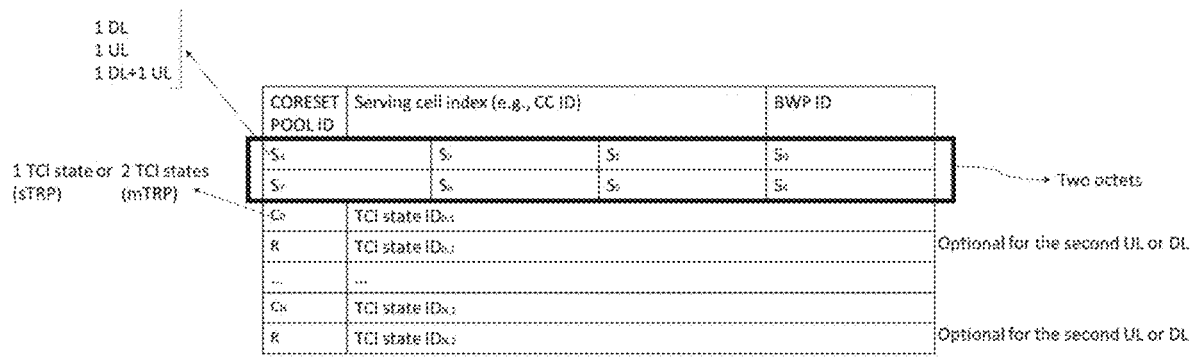
FIG. 23 is an example wherein Si could indicate information of DL and/or UL, and for information indicated by Si, being a combination of DL and UL, at least a DL component and a UL component of one TCI state is applied or associated, in accordance with embodiments of the present invention.
FIG. 24 is an example of a second MAC CE containing a serving cell ID indicating the associated serving cell for the indicated TCI states, in accordance with embodiments of the present invention.

For example, in FIG. 23, Si could indicate information of DL and/or UL. For information indicated by Si, being as combination of the DL and the UL, at least the DL component and the UL component of one TCI state is applied or associated. For information indicated by Ci, being at least of number of 2 for DL and/or UL, the MAC CE for the (i+1)-th code-point of the TCI field may comprise the second octet comprising the TCI state IDi,2. Preferably, Ci could indicate information of sTRP or mTRP for (i+1)-th code-point of TCI field. Preferably, information indicated by Si is (also) associated to the TCI state IDi,2. Preferably, for information indicated by Si, being as combination of DL and UL, the TCI state with the TCI state IDi,2 is associated to at least DL component and UL component of one TCI state. Alternatively and/or preferably, Si may be not consecutive for consecutive value i.

Preferably, the following table could illustrate mechanism for the MAC CE (format) of FIG. 23.

| $S_i$ | #Octets for (i + 1)-th code-point of TCI $C_i$ field | (i + 1)-th code-point of TCI field |
|---|---|---|
| DL | 1 TCI state $ID_{i,1}$ | sTRP DL beam indication based on at least DL component of TCI state associated to TCI state $ID_{i,1}$ |
| UL | 1 TCI state $ID_{i,1}$ | sTRP UL beam indication based on at least UL component of TCI state associated to TCI state $ID_{i,1}$ |

-continued

| $S_i$ | #Octets for (i + 1)-th code-point of TCI $C_i$ field | (i + 1)-th code-point of TCI field |
|---|---|---|
| DL | 2 TCI state $ID_{i,1}$ TCI state $ID_{i,2}$ | mTRP DL beam indication based on at least DL component of TCI states associated to TCI state $ID_{i,1}$ and TCI state $ID_{i,2}$ |
| UL | 2 TCI state $ID_{i,1}$ TCI state $ID_{i,2}$ | mTRP UL beam indication based on at least UL component of TCI states associated to TCI state $ID_{i,1}$ and TCI state $ID_{i,2}$ |
| DL + UL | 1 TCI state $ID_{i,1}$ | sTRP DL beam indication based on at least DL component of TCI state associated to TCI state $ID_{i,1}$ sTRP UL beam indication based on at least UL component of TCI state associated to TCI state $ID_{i,1}$ |
| DL + UL | 2 TCI state $ID_{i,1}$ TCI state $ID_{i,2}$ | mTRP DL beam indication based on at least DL component of TCI states associated to TCI state $ID_{i,1}$ and TCI state $ID_{i,2}$ mTRP UL beam indication based on at least UL component of TCI states associated to TCI state $ID_{i,1}$ and TCI state $ID_{i,2}$ |

Concept 5

The UE could be configured with one or more DL TCI states and one or more UL TCI states in a BWP and/or in a CC. Each of the one or more TCI states is associated with a TCI state ID.

This concept is to have at least two kinds of MAC CEs including a first MAC CE and a second MAC CE. The first MAC CE could include TCI state ID(s) indicating DL TCI state(s) and association between code-point(s) of a DCI and the DL TCI state(s). The second MAC CE could include TCI state ID(s) indicating UL TCI state(s) and association between code-point(s) of a DCI and the UL TCI state(s). When or in response to receiving a DCI (e.g., a beam indication DCI), the UE could determine whether to switch/activate/monitor one or more DL TCI states indicated in the first MAC CE and/or switch/activate one or more UL TCI states indicated in the second MAC CE based on indication/field/format of the DCI.

The first MAC CE could be associated with a logical channel identity (LCID) different from a LCID associated with the second MAC CE.

The first MAC CE could indicate up to 2 DL TCI states for a code-point of a TCI field of a DCI. The second MAC CE could indicate up to 2 UL TCI states for a code-point of a TCI field of a DCI. The DL TCI states could be associated with activation/deactivation of PDSCH and/or PDCCH of the UE. The UL TCI states could be associated with activation/deactivation of PUCCH and/or PUSCH of the UE. Each of the DL TCI states could be associated with a TRP (of a cell).

An example of the second MAC CE is shown in FIG. 24. The second MAC CE contains a serving cell ID indicating the associated serving cell for the indicated TCI states. The second MAC CE could contain BWP ID indicating associated BWP for the indicated TCI states. The bit C0 could indicate whether code-point 0 for DCI indicates two UL TCI state IDs. If the value of C0 is 1, the octet of UL TCI state $ID_{0,2}$ is present, and the code-point 0 is associated with UL TCI state $ID_{0,1}$ and UL TCI state $ID_{0,2}$. If the value of C0 is 0, the octet of UL TCI state $ID_{0,2}$ is not present, and the code-point 0 is associated with UL TCI state $ID_{0,1}$.

An example of the first MAC CE is shown in FIG. 25. The first MAC CE contains a serving cell ID indicating the associated serving cell for the indicated TCI state(s). The first MAC CE could (or may not) contain a CORESET ID indicating associated CORESET with the DL TCI states. Alternatively, the DL TCI states could be associated with all (UE-specific) CORESETs. The first MAC CE could contain BWP ID indicating associated BWP for the indicated TCI states. The bit C0 could indicate whether code-point 0 for DCI indicates two DL TCI state IDs. If the value of C0 is 1, the octet of DL TCI state $ID_{0,2}$ is present, and the code-point 0 is associated with DL TCI state $ID_{0,1}$ and DL TCI state $ID_{0,2}$. If the value of C0 is 0, the octet of DL TCI state $ID_{0,2}$ is not present, and the code-point 0 is associated with DL TCI state $ID_{0,1}$.

The DCI could be a beam indication DCI. The DCI could indicate dynamic switching beams for DL and/or UL of the UE. The DCI may not contain DL assignment or UL grant. The DCI could be addressed to (or scrambled by) a CS-RNTI.

The DCI could contain a DL/UL indication field indicating the DCI is for indicating joint DL/UL TCI state or DL TCI state or UL TCI state. Alternatively, different formats (e.g., associated with different DCI format identifiers) of the DCI could be used to indicate joint DL/UL TCI state or DL TCI state or UL TCI state. In response to receiving the DCI, the UE could determine whether to switch/activate DL and/or UL TCI states indicated by a (previously received) first and/or second MAC CE based on the type/format or value of DL/UL indication field of the DCI. For example, the UE could switch its DL TCI state(s)/beam(s) in response to receiving a beam indication DCI of which DL/UL indication field is set for "DL" (and does not switch its UL TCI state/beam). The UE could switch its UL TCI state(s)/beam(s) in response to receiving a beam indication DCI of which DL/UL indication field is set for "UL" (and does not switch its DL TCI state/beam). The UE could switch its DL TCI state(s)/beam(s) in response to receiving a beam indication DCI of which DL/UL indication field is set for "DL and UL".

Preferably in certain embodiments, the UE could switch/monitor/activate the TCI state(s)/beam(s) based on code-point indicated by the DCI, wherein the code-point is associated with one or two TCI states via the first MAC CE (for activating DL TCI states) and/or second MAC CE (for activating UL TCI states).

Concept 6

This concept is to have a first portion of information in a MAC CE for indicating transmission direction for a (or each) TCI state ID included in the MAC CE. A second portion of information in the MAC CE could indicate a number of TCI state IDs for a (or each) code-point of TCI field.

The first portion of information could be one bit for one (or each) TCI state ID.

The first portion of information could indicate whether the associated TCI state ID is for DL or UL.

The second portion of information could be two (or more) bits for one (or each) code-point of TCI field.

The number of TCI state IDs for a (or each) code-point of the TCI field could be 1 to 4.

The number of TCI state IDs for a (or each) code-point of the TCI field could be 0 to 4.

FIG. 26 is an example. D/Ux field(s) could correspond to the first portion of information. Nx field(s) could correspond to the second portion of information. N0 could be 0 (e.g., number of TCI state ID associated with the code-point 0 is 1 (TCI state ID0,1)). N1 could be 3 (e.g., number of TCI state ID associated with the code-point 1 is 4). N2 could be 0. D/U0 could be 0 (e.g., TCI state ID0,1 is for DL). D/U1 could be 0. D/U2 could be 0. D/U3 could be 1 (e.g., UL). D/U4 could be 1 (e.g., UL). D/U5 could be 1 (e.g., UL).

Figure 27:
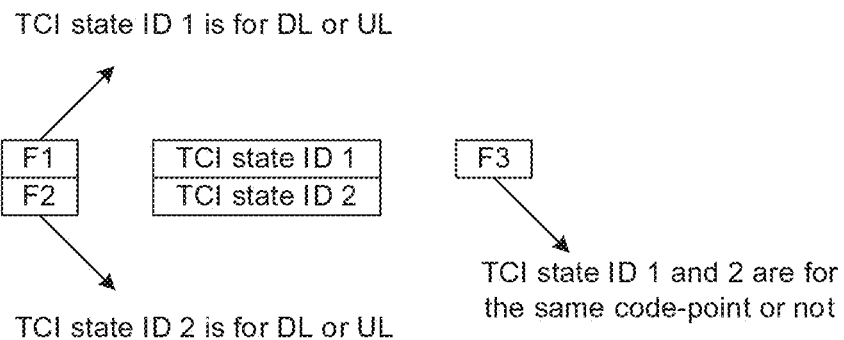
FIG. 27 is an example illustrating association between TCI state ID(s) to a TCI code-point in DCI for sTRP mechanism, in accordance with embodiments of the present invention.

FIG. 27 is an example for illustrating association between TCI state ID(s) to a TCI code-point in DCI for sTRP. F1 filed indicates that TCI state ID 1 is either DL or UL and F2 field indicates that TCI state ID 2 is either DL or UL. F3 field indicates that whether the TCI code-point comprises TCI state ID 1 and TCI state ID 2.

Figure 28:
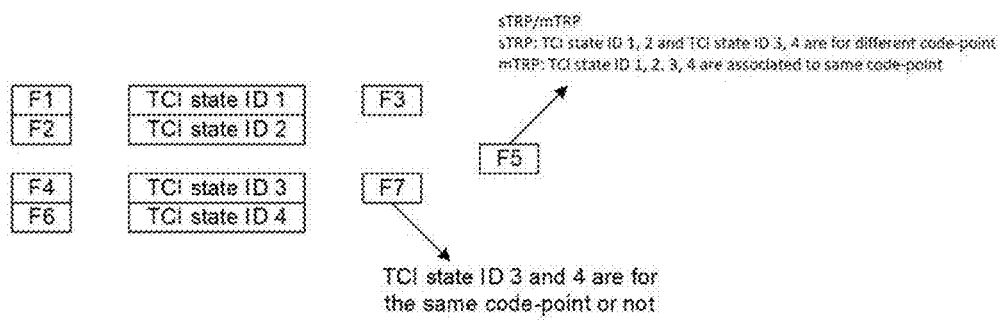
FIG. 28 is an example illustrating association between TCI state ID(s) to a TCI code-point in DCI for mTRP mechanism, in accordance with embodiments of the present invention.

FIG. 28 is an example for illustrating association between TCI state ID(s) to a TCI code-point in DCI for mTRP mechanism. F4, F6, and F7 field indicates same functionality as F1, F2, and F3 field, respectively. F5 filed indicates that whether the TCI code-point is sTRP or mTRP. If F5 field indicates sTRP, TCI state ID 1 and 2, and TCI state ID 3 and 4 are associated to different TCI code-point. If F5 field indicates mTRP, TCI state ID 1, 2, 3, and 4 are associated to same TCI code-point.

Any combination of above concepts can be jointly combined or formed to a new embodiment. The following embodiments can be used to solve at least (but not limited to) the issue mentioned above.

Figure 29:
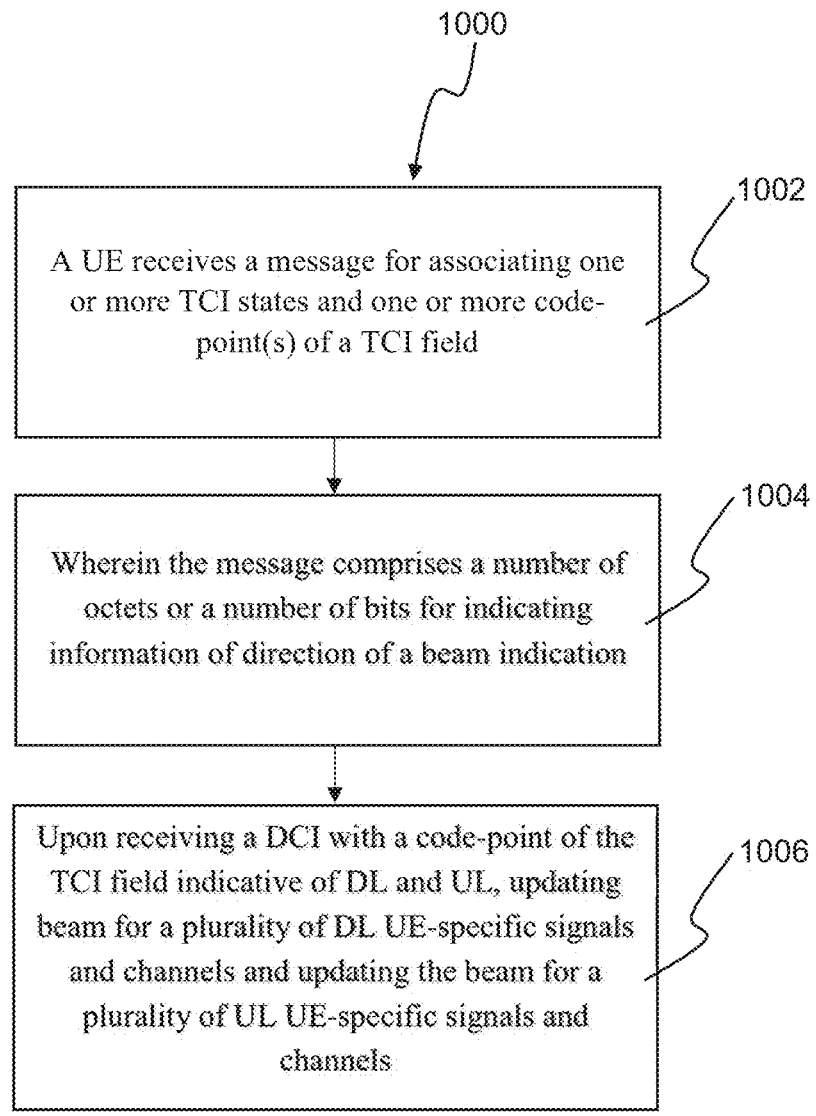
FIG. 29 is a flow diagram of a method of a UE receiving a message for associating one or more TCI states and one or more code-point(s) of a TCI field, in accordance with embodiments of the present invention.

Referring to FIG. 29, with this and other concepts, systems, and methods of the present invention, a method 1000 for a UE in a wireless communication system comprises receiving a message for associating one or more TCI states and one or more code-point(s) of a TCI field (step 1002), wherein the message comprises a number of octets or a number of bits for indicating information of direction of a beam indication (step 1004), and upon receiving a DCI with a code-point of the TCI field indicative of DL and UL, updating a beam for a plurality of DL UE-specific signals and channels and updating the beam for a plurality of UL UE-specific signals and channels (step 1006).

In various embodiments, a beam could be replaced by or equivalent to a QCL type-D relation and/or spatial filter.

In various embodiments, information of direction of beam indication is either DL or UL, or DL and UL.

Referring back to FIGS. 3 and 4, in one or more embodiments from the perspective of a UE, the device 300 includes a program code 312 stored in memory 310 of the transmitter. The CPU 308 could execute program code 312 to: (i) receive a message for associating one or more TCI states and one or more code-point(s) of a TCI field, (ii) wherein the message comprises a number of octets or a number of bits for indicating information of direction of a beam indication, and (iii) upon receiving a DCI with a code-point of the TCI field indicative of DL and UL, updating a beam for a plurality of DL UE-specific signals and channels and updating the beam for a plurality of UL UE-specific signals and channels. Moreover, the CPU 308 can execute the program code 312 to perform all of the described actions, steps, and methods described above, below, or otherwise herein.

Figure 30:
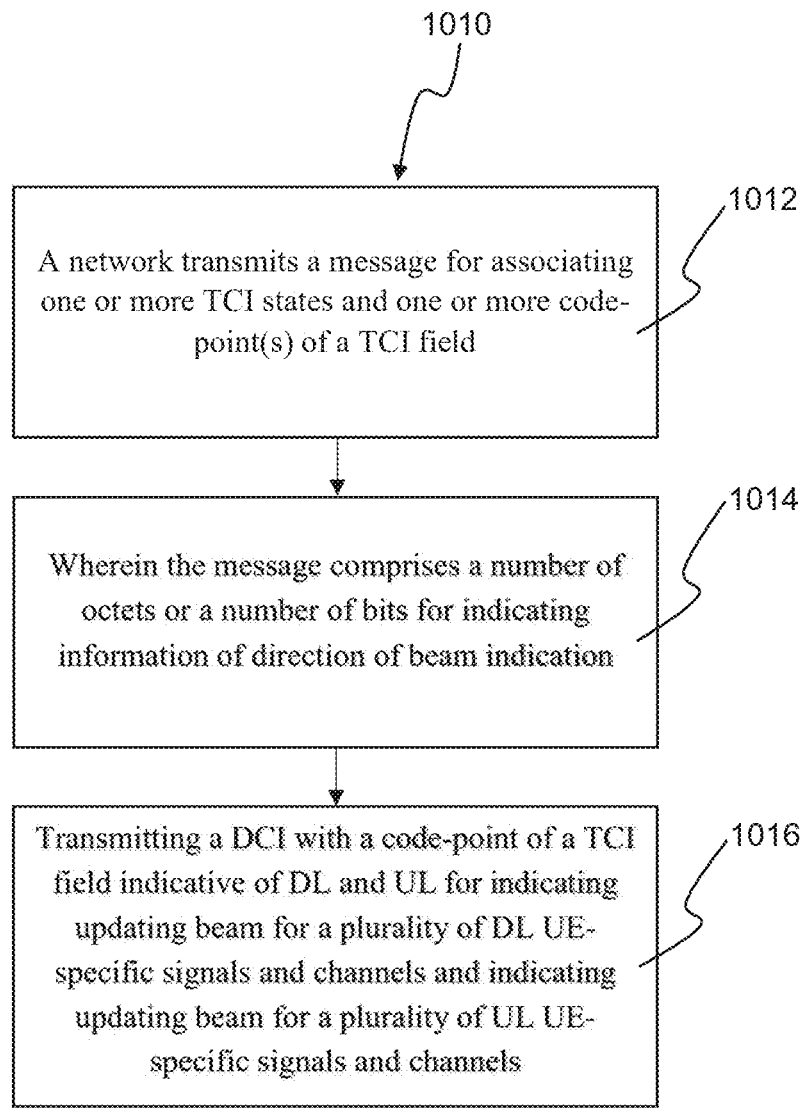
FIG. 30 is a flow diagram of a method of a network transmitting a message for associating one or more TCI states and one or more code-point(s) of a TCI field, in accordance with embodiments of the present invention.

Referring to FIG. 30, with this and other concepts, systems, and methods of the present invention, a method 1010 for a network in a wireless communication system comprises transmitting a message for associating one or more TCI states and one or more code-point(s) of a TCI field (step 1012), wherein the message comprises a number of octets or a number of bits for indicating information of direction of beam indication (step 1014), and transmitting a DCI with a code-point of the TCI field indicative of DL and UL for indicating updating a beam for a plurality of DL UE-specific signals and channels and indicating updating the beam for a plurality of UL UE-specific signals and channels (step 1016).

In various embodiments, a beam could be replaced by or equivalent to QCL type-D relation and/or spatial filter.

In various embodiments, information of direction of beam indication is either DL or UL, or DL and UL.

Referring back to FIGS. 3 and 4, in one or more embodiments from the perspective of a NW, the device 300 includes a program code 312 stored in memory 310 of the transmitter. The CPU 308 could execute program code 312 to: (i) transmit a message for associating one or more TCI states and one or more code-point(s) of a TCI field, (ii) wherein the message comprises a number of octets or a number of bits for indicating information of direction of beam indication, and (iii) transmit a DCI with a code-point of the TCI field indicative of DL and UL for indicating updating a beam for a plurality of DL UE-specific signals and channels and indicating updating the beam for a plurality of UL UE-specific signals and channels. Moreover, the CPU 308 can execute the program code 312 to perform all of the described actions, steps, and methods described above, below, or otherwise herein.

Figure 31:
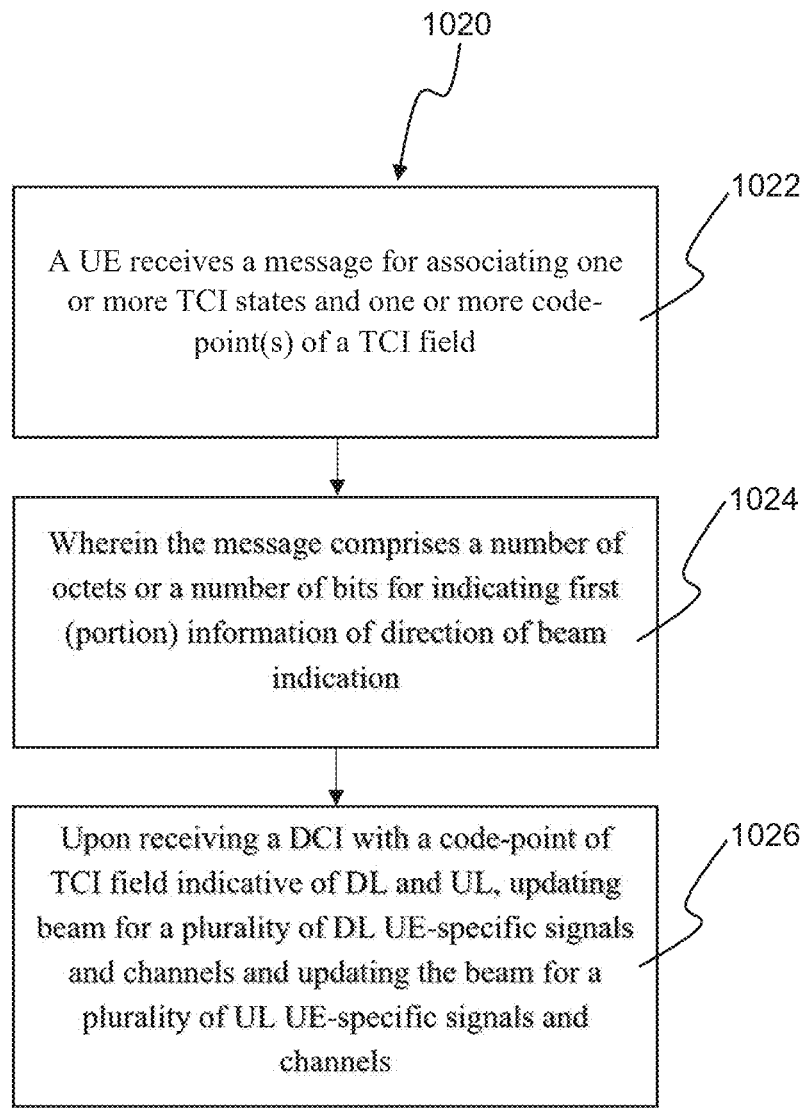
FIG. 31 is a flow diagram of a method of a UE receiving a message for associating one or more TCI states and one or more code-point(s) of a TCI field, in accordance with embodiments of the present invention.

Referring to FIG. 31, with this and other concepts, systems, and methods of the present invention, a method 1020 for a UE in a wireless communication system comprises receiving a message for associating one or more TCI states and one or more code-point(s) of a TCI field (step 1022), wherein the message comprises a number of octets or a number of bits for indicating first (portion) information of direction of beam indication (step 1024), and upon receiving a DCI with a code-point of the TCI field indicative of DL and UL, updating a beam for a plurality of DL UE-specific signals and channels and updating the beam for a plurality of UL UE-specific signals and channels (step 1026).

In various embodiments, one or more MSBs or LSBs of one or more octets comprising a TCI state ID indicates second (portion) information of direction of beam indication.

In various embodiments, first information of direction of beam indication is either DL or UL.

In various embodiments, second information of direction of beam indication is one TCI state or two TCI states, and/or for two TCI states, one TCI state is associated to DL and one TCI state is associated to UL.

In various embodiments, first information of direction of beam indication is one TCI state or two TCI states.

In various embodiments, second information of direction of beam indication is either DL or UL.

Referring back to FIGS. 3 and 4, in one or more embodiments from the perspective of a UE, the device 300 includes a program code 312 stored in memory 310 of the transmitter. The CPU 308 could execute program code 312 to: (i) receive a message for associating one or more TCI states and one or more code-point(s) of a TCI field, (ii) wherein the message comprises a number of octets or a number of bits for indicating first (portion) information of direction of beam indication, and (iii) upon receiving a DCI with a code-point of the TCI field indicative of DL and UL, updating a beam for a plurality of DL UE-specific signals and channels and updating the beam for a plurality of UL UE-specific signals and channels. Moreover, the CPU 308 can execute the program code 312 to perform all of the described actions, steps, and methods described above, below, or otherwise herein.

Figure 32:
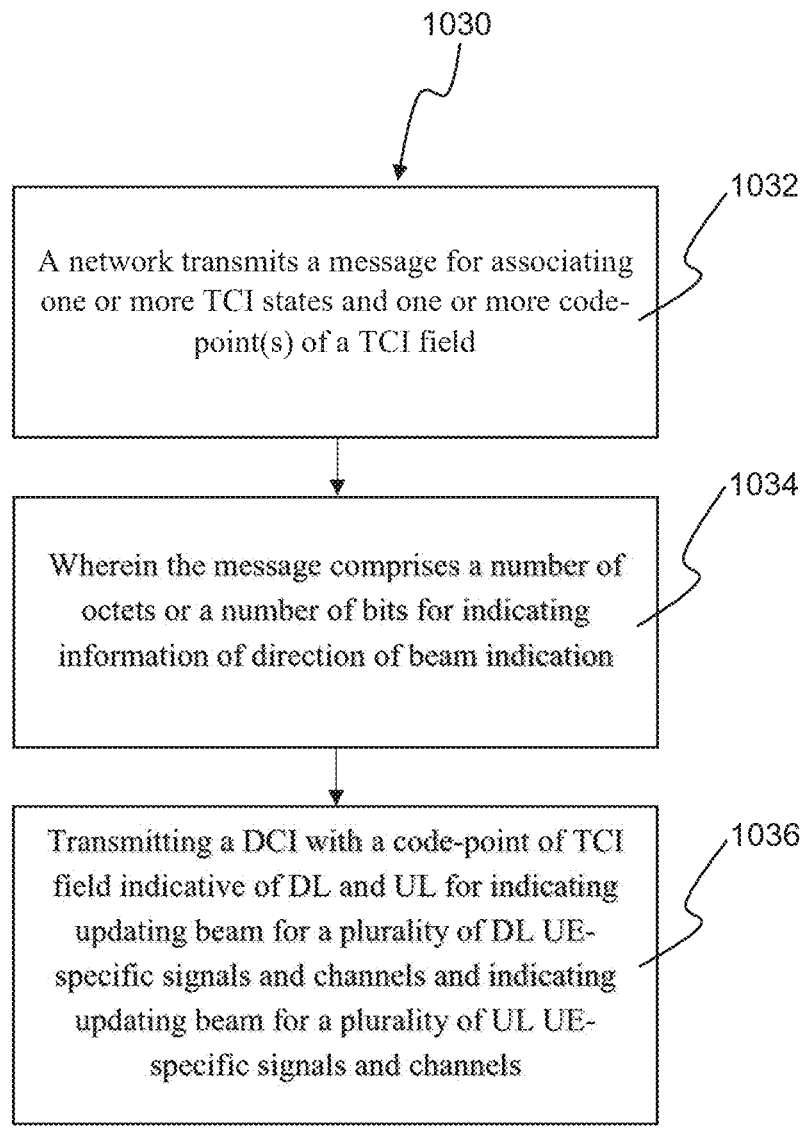
FIG. 32 is a flow diagram of a method of a network transmitting a message for associating one or more TCI states and one or more code-point(s) of a TCI field, in accordance with embodiments of the present invention.

Referring to FIG. 32, with this and other concepts, systems, and methods of the present invention, a method 1030 for a network in a wireless communication system comprises transmitting a message for associating one or more TCI states and one or more code-point(s) of a TCI field (step 1032), wherein the message comprises a number of octets or a number of bits for indicating information of direction of beam indication (step 1034), and transmitting a DCI with a code-point of the TCI field indicative of DL and UL for indicating updating a beam for a plurality of DL UE-specific signals and channels and indicating updating the beam for a plurality of UL UE-specific signal and channel (step 1036).

In various embodiments, one or more MSBs or LSBs of one or more octets comprising a TCI state ID indicates second (portion) information of direction of beam indication.

In various embodiments, first information of direction of beam indication is either DL or UL.

In various embodiments, second information of direction of beam indication is one TCI state or two TCI states, and/or for two TCI states, one TCI state is associated to DL and one TCI state is associated to UL.

In various embodiments, first information of direction of beam indication is one TCI state or two TCI states.

In various embodiments, second information of direction of beam indication is either DL or UL.

Referring back to FIGS. 3 and 4, in one or more embodiments from the perspective of a NW, the device 300 includes a program code 312 stored in memory 310 of the transmitter. The CPU 308 could execute program code 312 to: (i) transmit a message for associating one or more TCI states and one or more code-point(s) of a TCI field, (ii) wherein the message comprises a number of octets or a number of bits for indicating information of direction of beam indication, and (iii) transmit a DCI with a code-point of TCI field indicative of DL and UL for indicating updating a beam for a plurality of DL UE-specific signals and channels and indicating updating the beam for a plurality of UL UE-specific signal and channel. Moreover, the CPU 308 can execute the program code 312 to perform all of the described actions, steps, and methods described above, below, or otherwise herein.

Figure 33:
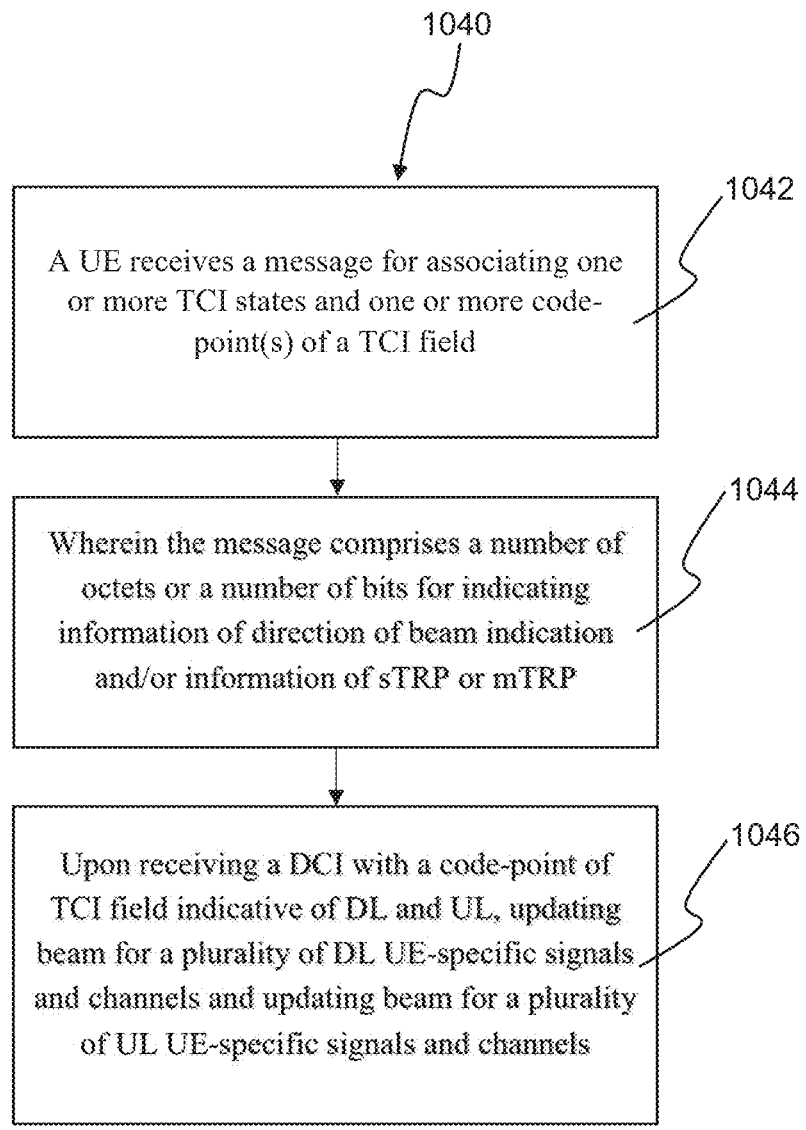
FIG. 33 is a flow diagram of a method of a UE receiving a message for associating one or more TCI states and one or more code-point(s) of a TCI field, in accordance with embodiments of the present invention.

Referring to FIG. 33, with this and other concepts, systems, and methods of the present invention, a method 1040 for a UE in a wireless communication system comprises receiving a message for associating one or more TCI states and one or more code-point(s) of a TCI field (step 1042), wherein the message comprises a number of octets or a number of bits for indicating information of direction of beam indication and/or information of sTRP or mTRP (step 1044), and upon receiving a DCI with a code-point of the TCI field indicative of DL and UL, updating a beam for a plurality of DL UE-specific signals and channels and updating the beam for a plurality of UL UE-specific signals and channels (step 1046).

In various embodiments, information of direction of beam indication and/or information of sTRP or mTRP is either 1 DL or 1 UL or 1 DL and 1 UL, 2 DL, or 2 UL, or 1 DL and 2 UL, or 2 DL and 1 UL, or 2 DL and 2 UL.

In various embodiments, based on information of direction of beam indication and/or information of sTRP or mTRP, the UE determines a number of TCI state IDs associated to one code-point of the TCI field.

Referring back to FIGS. 3 and 4, in one or more embodiments from the perspective of a UE, the device 300 includes a program code 312 stored in memory 310 of the transmitter. The CPU 308 could execute program code 312 to: (i) receive a message for associating one or more TCI states and one or more code-point(s) of a TCI field, (ii) wherein the message comprises a number of octets or a number of bits for indicating information of direction of beam indication and/or information of sTRP or mTRP, and (iii) upon receiving a DCI with a code-point of the TCI field indicative of DL and UL, updating a beam for a plurality of DL UE-specific signals and channels and updating the beam for a plurality of UL UE-specific signals and channels. Moreover, the CPU 308 can execute the program code 312 to perform all of the described actions, steps, and methods described above, below, or otherwise herein.

Figure 34:
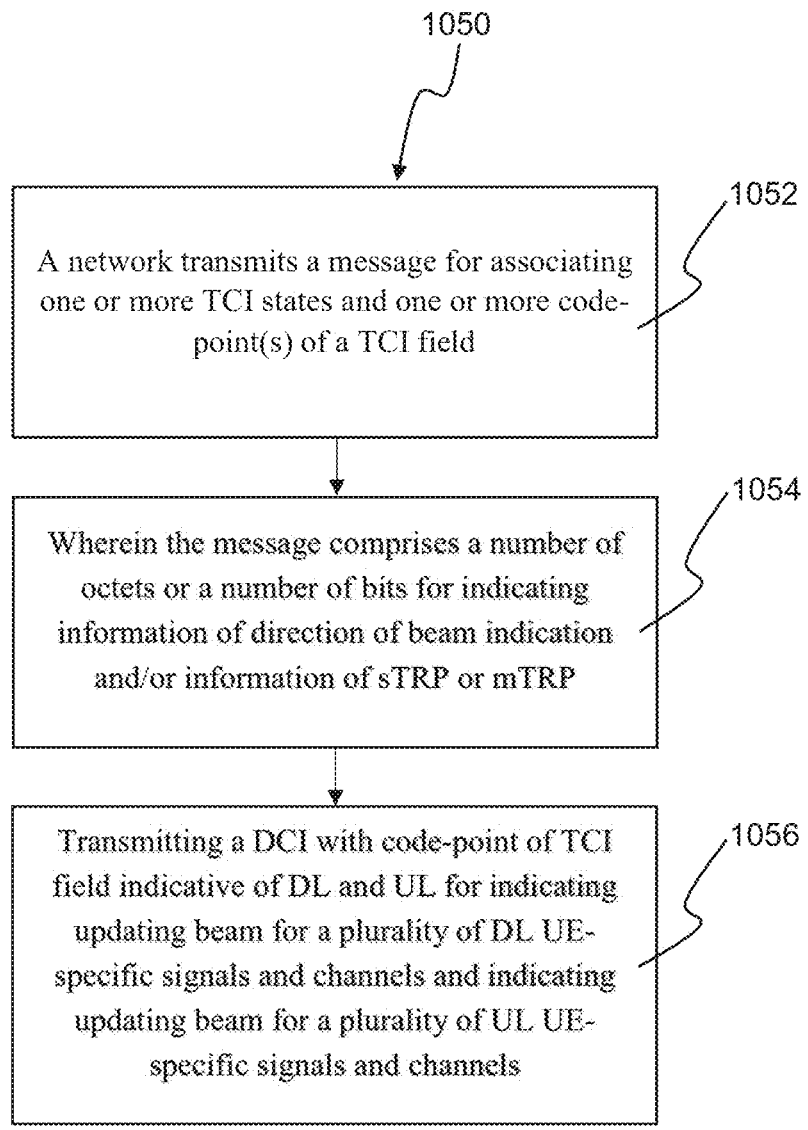
FIG. 34 is a flow diagram of a method of a network transmitting a message for associating one or more TCI states and one or more code-point(s) of a TCI field, in accordance with embodiments of the present invention.

Referring to FIG. 34, with this and other concepts, systems, and methods of the present invention, a method 1050 for a network in a wireless communication system comprises transmitting a message for associating one or more TCI states and one or more code-point(s) of a TCI field (step 1052), wherein the message comprises a number of octets or a number of bits for indicating information of direction of beam indication and/or information of sTRP or mTRP (step 1054), and transmitting a DCI with code-point of the TCI field indicative of DL and UL for indicating updating a beam for a plurality of DL UE-specific signals and channels and indicating updating the beam for a plurality of UL UE-specific signals and channels (step 1056).

In various embodiments, information of direction of beam indication and/or information of sTRP or mTRP is either 1 DL or 1 UL or 1 DL and 1 UL, 2 DL, or 2 UL, or 1 DL and 2 UL, or 2 DL and 1 UL, or 2 DL and 2 UL.

In various embodiments, based on information of direction of beam indication and/or information of sTRP or mTRP, the UE determines a number of TCI state IDs associated to one code-point of the TCI field.

Referring back to FIGS. 3 and 4, in one or more embodiments from the perspective of a NW, the device 300 includes a program code 312 stored in memory 310 of the transmitter. The CPU 308 could execute program code 312 to: (i) transmit a message for associating one or more TCI states and one or more code-point(s) of a TCI field, (ii) wherein the message comprises a number of octets or a number of bits for indicating information of direction of beam indication and/or information of sTRP or mTRP, and (iii) transmit a DCI with code-point of TCI field indicative of DL and UL for indicating updating a beam for a plurality of DL UE-specific signals and channels and indicating updating the beam for a plurality of UL UE-specific signals and channels. Moreover, the CPU 308 can execute the program code 312 to perform all of the described actions, steps, and methods described above, below, or otherwise herein.

Figure 35:
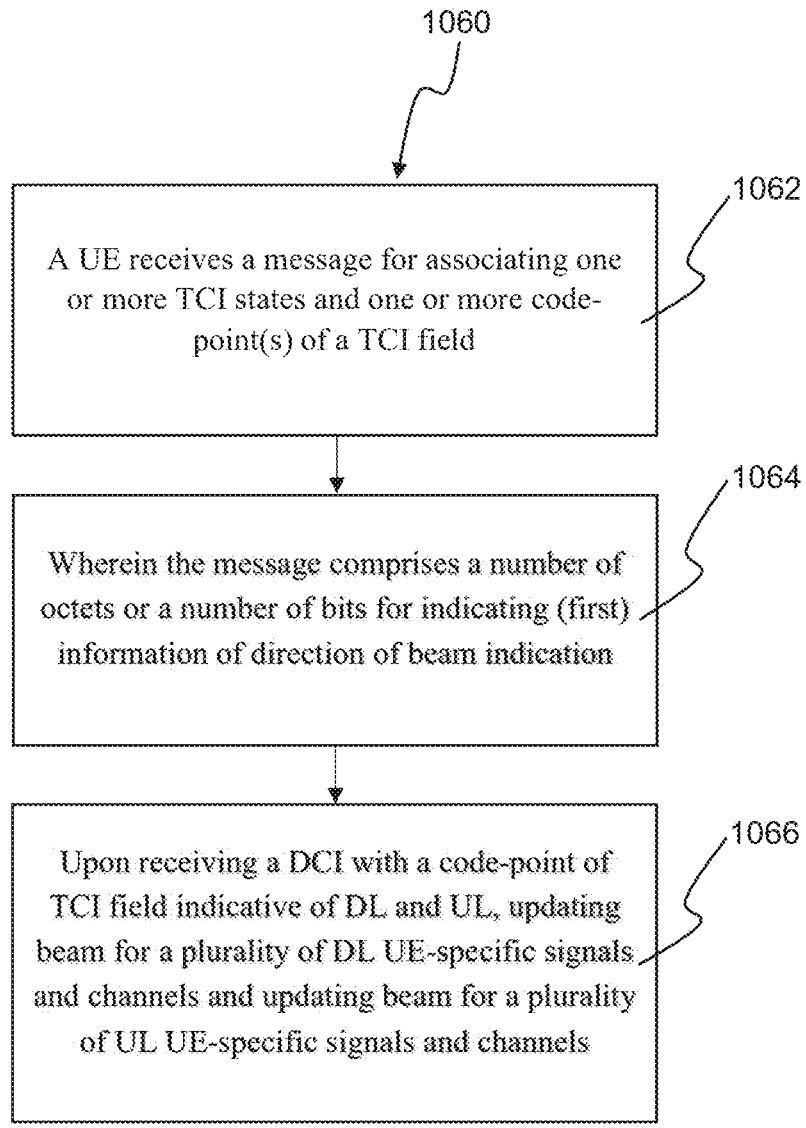
FIG. 35 is a flow diagram of a method of a UE receiving a message for associating one or more TCI states and one or more code-point(s) of a TCI field, in accordance with embodiments of the present invention.

Referring to FIG. 35, with this and other concepts, systems, and methods of the present invention, a method 1060 for a UE in a wireless communication system comprises receiving a message for associating one or more TCI states and one or more code-point(s) of a TCI field (step 1062), wherein the message comprises a number of octets or a number of bits for indicating (first) information of direction of beam indication (step 1064), and upon receiving a DCI with code-point of the TCI field indicative of DL and UL, updating a beam for a plurality of DL UE-specific signals and channels and updating the beam for a plurality of UL UE-specific signals and channels (step 1066).

In various embodiments, one or more MSBs or LSBs of one or more octets comprising TCI state ID indicates second (portion) information of sTRP or mTRP.

In various embodiments, first information of direction of beam indication is either DL, UL or DL+UL.

In various embodiments, for first information indicative of DL+UL for one code-point of the TCI field, the message comprises two MSB or LSB of two octets comprising TCI state ID, and the two MSB or LSB of octets indicates second information of sTRP or mTRP for DL and UL, respectively.

In various embodiments, for first information indicative of DL+UL for one code-point of the TCI field, the message comprises one MSB or LSB of one octet comprising TCI state ID, and the one MSB or LSB of octets indicates second information of sTRP or mTRP for both DL and UL.

In various embodiments (e.g., before the UE receives the DCI), the UE receives one or more DL channels or signals based on a first beam, and/or the UE transmits one or more UL channels or signals based on a second beam.

In various embodiments (e.g., after/upon the UE receiving the DCI), the UE receives one or more DL channels or signals based on a third beam, and/or the UE transmits one or more UL channels or signals based on a fourth beam.

In various embodiments, the code-point of TCI field indicates information of the third beam and the fourth beam.

In various embodiments, if the first beam is the same as the third beam, the UE does not update beam and/or keep using the first beam.

In various embodiments, if the first beam is different than the third beam, the UE changes or updates beam from the first beam to the third beam.

In various embodiments, if the second beam is the same as the fourth beam, the UE does not update the beam and/or keeps using the second beam.

In various embodiments, if the second beam is different than the fourth beam, the UE changes or updates the beam from the second beam to the fourth beam.

In various embodiments, the UE does not receive common DL signal or channel based on the information of the beam from DCI.

In various embodiments, the UE does not transmit common UL signal or channel based on the information of the beam from DCI.

In various embodiments, the DCI is associated to a first CORESET with a first CORESETPoolIndex.

In various embodiments, the message may provide information of CORESETPoolIndex.

In various embodiments, based on information of CORESETPoolIndex, the message is associated to the first CORESETPOOlIndex or a second CORESETPoolIndex.

In various embodiments, the message is a MAC CE for activating TCI state (for CORESET(s) associated to information of CORESETPoolIndex in the message).

In various embodiments, information of CORESETPoolIndex and information of RepetitionSchemeConfig are not allowed to be configured simultaneously.

In various embodiments, one DL may associate to one TCI state from a DL TCI state pool.

In various embodiments, one UL may associate to one TCI state from a UL TCI state pool.

In various embodiments, one DL may associate to DL component of one TCI state.

In various embodiments, one UL may associate to UL component of one TCI state.

In various embodiments, one DL+one UL may associate to one TCI state from a DL TCI state pool and one TCI state from a UL TCI state pool.

In various embodiments, one DL+one UL may associate to DL component and UL component of one TCI state.

In various embodiments, one TCI state may comprise a DL component and/or a UL component and/or a common component (e.g., TCI state ID).

In various embodiments, two DLs may associate to two TCI states from a DL TCI state pool.

In various embodiments, two ULs may associate to two TCI states from a UL TCI state pool.

In various embodiments, two DLs may associate to DL component of one TCI state and DL component of the other TCI state.

In various embodiments, two ULs may associate to UL component of one TCI state and UL component of the other TCI state.

Referring back to FIGS. 3 and 4, in one or more embodiments from the perspective of a UE, the device 300 includes a program code 312 stored in memory 310 of the transmitter. The CPU 308 could execute program code 312 to: (i) receiving a message for associating one or more TCI states and one or more code-point(s) of a TCI field, (ii) wherein the message comprises a number of octets or a number of bits for indicating (first) information of direction of beam indication, and (iii) upon receiving a DCI with code-point of the TCI field indicative of DL and UL, updating a beam for a plurality of DL UE-specific signals and channels and updating the beam for a plurality of UL UE-specific signals and channels. Moreover, the CPU 308 can execute the program code 312 to perform all of the described actions, steps, and methods described above, below, or otherwise herein.

Figure 36:
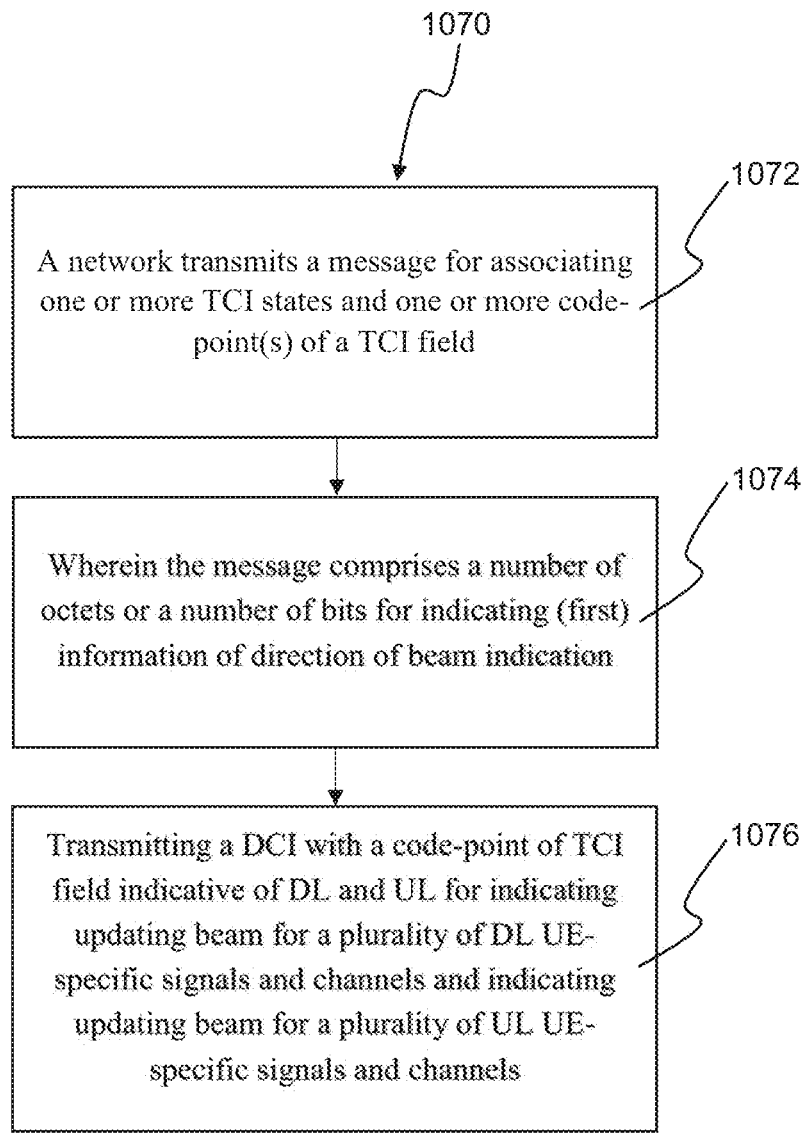
FIG. 36 is a flow diagram of a method of a network transmitting a message for associating one or more TCI states and one or more code-point(s) of a TCI field, in accordance with embodiments of the present invention.

Referring to FIG. 36, with this and other concepts, systems, and methods of the present invention, a method 1070 for a network in a wireless communication system comprises transmitting a message for associating one or more TCI states and one or more code-point(s) of a TCI field (step 1072), wherein the message comprises a number of octets or a number of bits for indicating (first) information of direction of beam indication (step 1074), and transmitting a DCI with code-point of the TCI field indicative of DL and UL for indicating updating a beam for a plurality of DL UE-specific signals and channels and indicating updating the beam for a plurality of UL UE-specific signals and channels (step 1076).

In various embodiments, one or more MSBs or LSBs of one or more octets comprising TCI state ID indicates second (portion) information of sTRP or mTRP.

In various embodiments, first information of direction of beam indication is either DL, UL or DL+UL.

In various embodiments, for first information indicative of DL+UL for one code-point of the TCI field, the message comprises two MSB or LSB of two octets comprising TCI state ID, and the two MSB or LSB of octets indicates second information of sTRP or mTRP for DL and UL, respectively.

In various embodiments, for first information indicative of DL+UL for one code-point of the TCI field, the message comprises one MSB or LSB of one octet comprising TCI state ID, and the one MSB or LSB of octets indicates second information of sTRP or mTRP for both DL and UL.

In various embodiments (e.g., before the UE receives the DCI), the UE receives one or more DL channels or signals based on a first beam, and/or the UE transmits one or more UL channels or signals based on a second beam.

In various embodiments (e.g., after/upon the UE receiving the DCI), the UE receives one or more DL channels or signals based on a third beam, and/or the UE transmits one or more UL channels or signals based on a fourth beam.

In various embodiments, the code-point of TCI field indicates information of the third beam and the fourth beam.

In various embodiments, if the first beam is the same as the third beam, the UE does not update beam and/or keep using the first beam.

In various embodiments, if the first beam is different than the third beam, the UE changes or updates beam from the first beam to the third beam.

In various embodiments, if the second beam is the same as the fourth beam, the UE does not update the beam and/or keeps using the second beam.

In various embodiments, if the second beam is different than the fourth beam, the UE changes or updates the beam from the second beam to the fourth beam.

In various embodiments, the UE does not receive common DL signal or channel based on the information of the beam from DCI.

In various embodiments, the UE does not transmit common UL signal or channel based on the information of the beam from DCI.

In various embodiments, the DCI is associated to a first CORESET with a first CORESETPoolIndex.

In various embodiments, the message may provide information of CORESETPoolIndex.

In various embodiments, based on information of CORESETPoolIndex, the message is associated to the first CORESETPOOlIndex or a second CORESETPoolIndex.

In various embodiments, the message is a MAC CE for activating TCI state (for CORESET(s) associated to information of CORESETPoolIndex in the message).

In various embodiments, information of CORESETPoolIndex and information of RepetitionSchemeConfig are not allowed to be configured simultaneously.

In various embodiments, one DL may associate to one TCI state from a DL TCI state pool.

In various embodiments, one UL may associate to one TCI state from a UL TCI state pool.

In various embodiments, one DL may associate to DL component of one TCI state.

In various embodiments, one UL may associate to UL component of one TCI state.

In various embodiments, one DL+one UL may associate to one TCI state from a DL TCI state pool and one TCI state from a UL TCI state pool.

In various embodiments, one DL+one UL may associate to DL component and UL component of one TCI state.

In various embodiments, one TCI state may comprise a DL component and/or a UL component and/or a common component (e.g., TCI state ID).

In various embodiments, two DLs may associate to two TCI states from a DL TCI state pool.

In various embodiments, two ULs may associate to two TCI states from a UL TCI state pool.

In various embodiments, two DLs may associate to DL component of one TCI state and DL component of the other TCI state.

In various embodiments, two ULs may associate to UL component of one TCI state and UL component of the other TCI state.

Referring back to FIGS. 3 and 4, in one or more embodiments from the perspective of a NW, the device 300 includes a program code 312 stored in memory 310 of the transmitter. The CPU 308 could execute program code 312 to: (i) transmit a message for associating one or more TCI states and one or more code-point(s) of a TCI field, (ii) wherein the message comprises a number of octets or a number of bits for indicating (first) information of direction of beam indication, and (iii) transmit a DCI with a code-point of the TCI field indicative of DL and UL for indicating updating a beam for a plurality of DL UE-specific signals and channels and indicating updating the beam for a plurality of UL UE-specific signals and channels. Moreover, the CPU 308 can execute the program code 312 to perform all of the described actions, steps, and methods described above, below, or otherwise herein.

Figure 37:
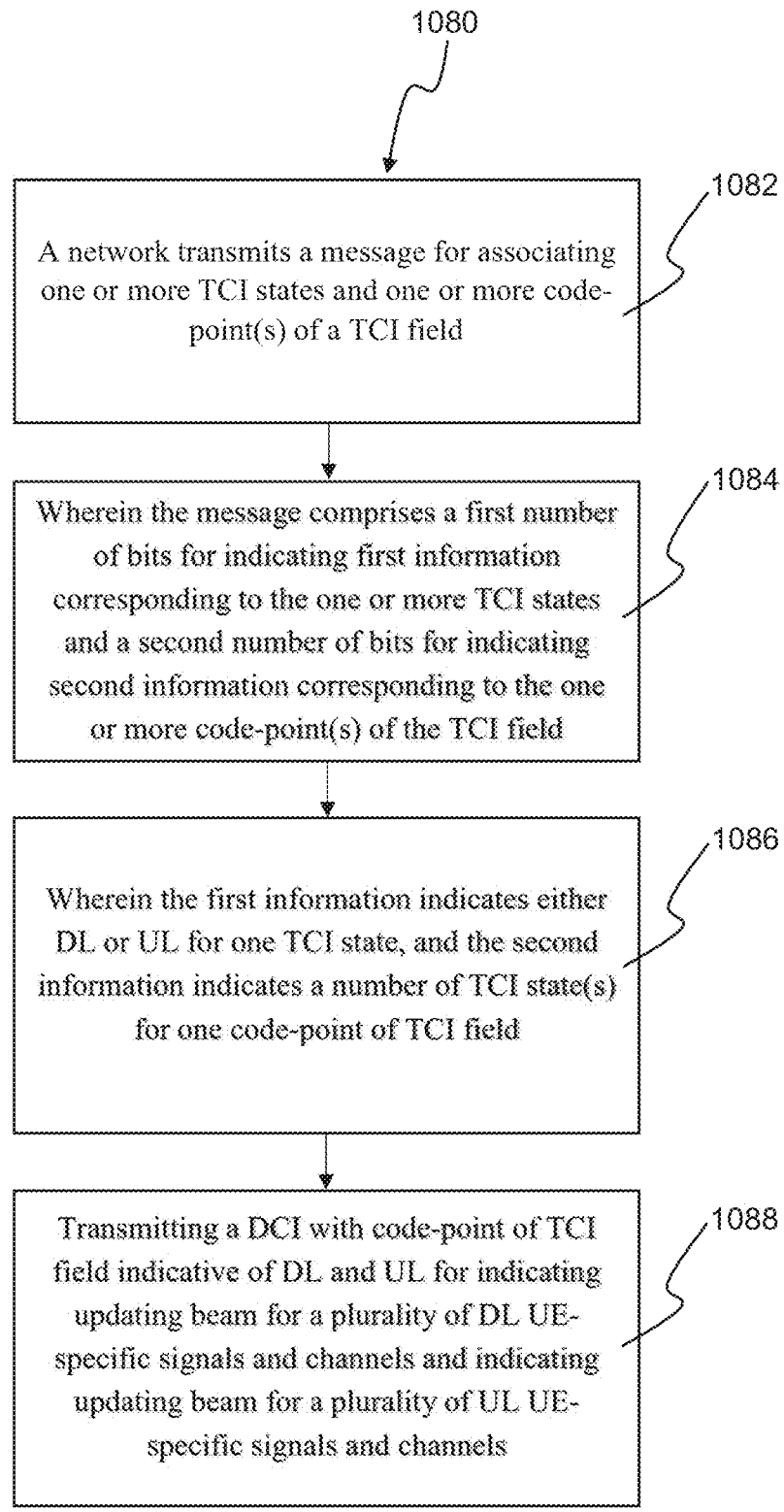
FIG. 37 is a flow diagram of a method of a network transmitting a message for associating one or more TCI states and one or more code-point(s) of a TCI field, in accordance with embodiments of the present invention.

Referring to FIG. 37, with this and other concepts, systems, and methods of the present invention, a method 1080 for a network in a wireless communication system comprises transmitting a message for associating one or more TCI states and one or more code-point(s) of a TCI field (step 1082), wherein the message comprises a first number of bits for indicating first information corresponding to the one or more TCI states and a second number of bits for indicating second information corresponding to the one or more code-point(s) of the TCI field (step 1084), wherein the first information indicates either DL or UL for one TCI state, and the second information indicates a number of TCI state(s) for one code-point of the TCI field (step 1086), and transmitting a DCI with code-point of TCI field indicative of DL and UL for indicating updating a beam for a plurality of DL UE-specific signals and channels and indicating updating the beam for a plurality of UL UE-specific signals and channels (step 1088).

In various embodiments, first information for one TCI state is in a same octet as the one TCI state.

In various embodiments, the UE is configured with separate TCI states, and/or the UE is configured with a first TCI state pool and a second TCI state pool, wherein the first TCI state pool comprises TCI states corresponding to DL channel and/or signal, and the second TCI state pool comprises TCI states corresponding to UL channel and/or signal.

In various embodiments, for first information being as DL for one TCI state, the TCI state is associated to the first TCI state pool, and/or for second information being as UL for one TCI state, the TCI state is associated to the second TCI state pool.

In various embodiments, the second number of bits are in one or two specific octets, and/or the second number of bits, associated to one code-point, are not in a same octet for one or more TCI states associated to the one TCI code-point.

In various embodiments, the number of TCI state(s) is either one or two.

In various embodiments, the number of TCI state(s) is either one, two, three, or four.

In various embodiments, the message comprises a third number of bits for indicating third information corresponding to the one or more code-point(s) of the TCI field.

In various embodiments, the third information indicates either a single TRP or multiple TRPs, and/or the third information indicates whether there are at least two TCI states for DL in one code-point of the TCI field or two TCI states for UL in one code-point of the TCI field.

Referring back to FIGS. 3 and 4, in one or more embodiments from the perspective of a NW, the device 300 includes a program code 312 stored in memory 310 of the transmitter. The CPU 308 could execute program code 312 to: (i) transmit a message for associating one or more TCI states and one or more code-point(s) of a TCI field, (ii) wherein the message comprises a first number of bits for indicating first information corresponding to the one or more TCI states and a second number of bits for indicating second information corresponding to the one or more code-point(s) of the TCI field, (iii) wherein the first information indicates either DL or UL for one TCI state, and the second information indicates a number of TCI state(s) for one code-point of the TCI field, and (iv) transmit a DCI with code-point of TCI field indicative of DL and UL for indicating updating a beam for a plurality of DL UE-specific signals and channels and indicating updating the beam for a plurality of UL UE-specific signals and channels. Moreover, the CPU 308 can execute the program code 312 to perform all of the described actions, steps, and methods described above, below, or otherwise herein.

Figure 38:
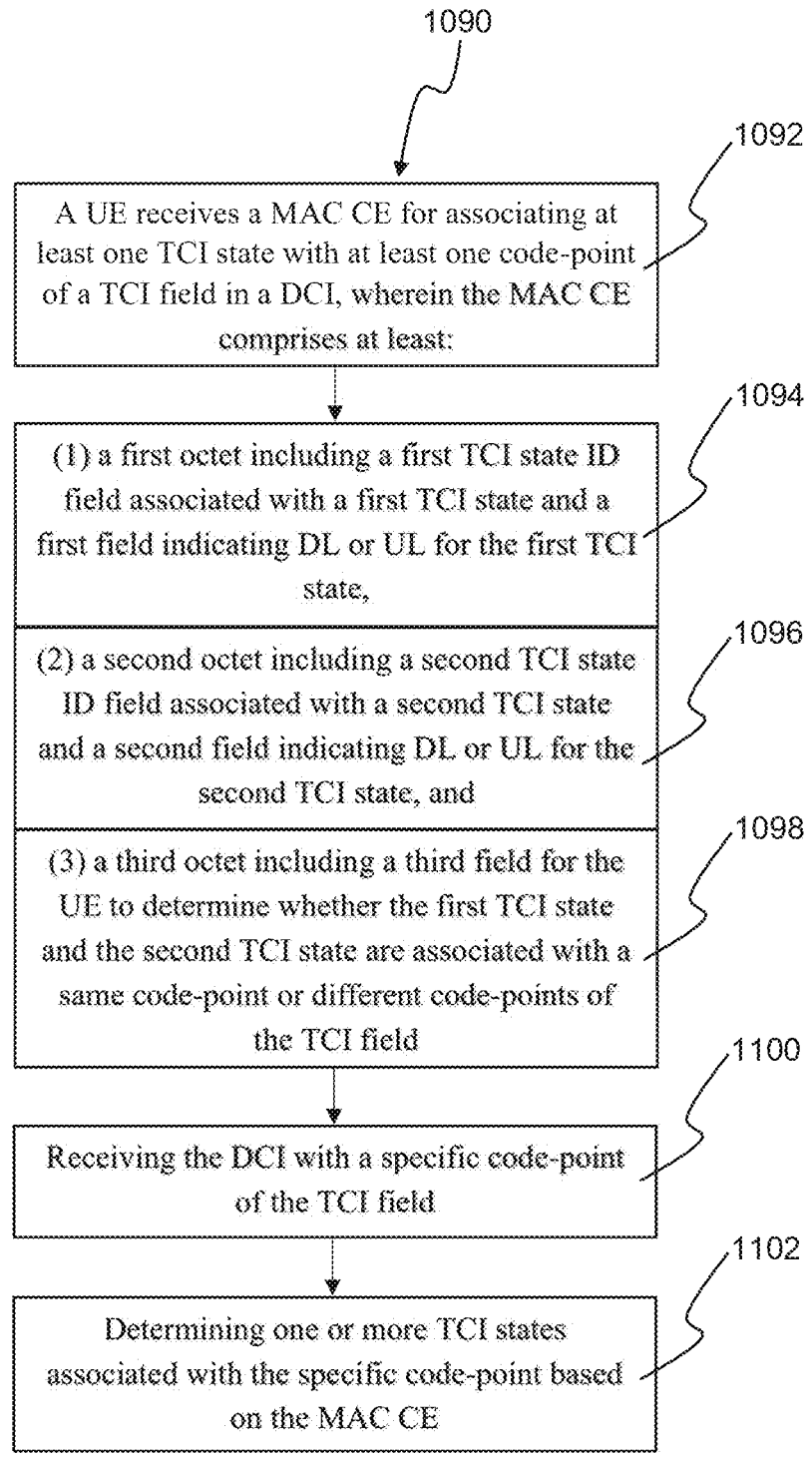
FIG. 38 is a flow diagram of a method of a UE receiving a MAC CE for associating at least one TCI state with at least one code-point of a TCI field in a DCI, in accordance with embodiments of the present invention.

Referring to FIG. 38, with this and other concepts, systems, and methods of the present invention, a method 1090 for a UE in a wireless communication system comprises receiving a MAC CE for associating at least one TCI state with at least one code-point of a TCI field in a DCI (step 1092), wherein the MAC CE comprises at least: a first octet including a first TCI state ID field associated with a first TCI state and a first field indicating DL or UL for the first TCI state (step 1094), a second octet including a second TCI state ID field associated with a second TCI state and a second field indicating DL or UL for the second TCI state (step 1096); and a third octet including a third field for the UE to determine whether the first TCI state and the second TCI state are associated with a same code-point or different code-points of the TCI field (step 1098), with the method further including receiving the DCI with a specific code-point of the TCI field (step 1100), and determining one or more TCI states associated with the specific code-point based on the MAC CE (step 1102).

In various embodiments, the first field, the second field, and the third field are a 1-bit field.

In various embodiments, the third octet is before any of the first and second octets in the MAC CE, comprising a TCI state ID field. The third octet is with smaller octet index than any of octet index of the first and the second octet In various embodiments, the first octet and the second octet are consecutive.

In various embodiments, when the UE determines that the first TCI state and the second TCI state are associated with a same code-point of the TCI field based on the third field, one of the first field and the second field indicates DL and another one of the first field and the second field indicates UL.

In various embodiments, in response to the specific code-point in the DCI, the UE updates at least one beam for receiving a plurality of DL UE-specific signals and channels based on the one or more TCI states, and/or the UE updates at least one beam for transmitting a plurality of UL UE-specific signals and channels based on the one or more TCI states.

In various embodiments, the MAC CE further comprises a fourth octet including a third TCI state ID field associated with a third TCI state and a fourth field indicating DL or UL for the third TCI state, and a fifth field for the UE to determine whether at least the first TCI state, the second TCI state, and the third TCI state are associated with a same code-point or different code-points of the TCI field.

In various embodiments, when the UE determines that the first TCI state, the second TCI state, and the third TCI state are associated with a same code-point of the TCI field based on the fifth field, the first TCI state, the second TCI state, and the third TCI state are associated with different TRPs.

In various embodiments, the MAC CE further comprises a fifth octet including a fourth TCI state ID field associated with a fourth TCI state and a sixth field indicating DL or UL for the fourth TCI state, and a seventh field for the UE to determine whether the third TCI state and the fourth TCI state are associated with a same code-point or different code-points of the TCI field, wherein the seventh field is included in the third octet.

In various embodiments, the UE determines whether the first TCI state, the second TCI state, the third TCI state, and the fourth TCI state are associated with a same code-point or different code-points of the TCI field based on the fifth field.

In various embodiments, when the MAC CE further comprises an eighth field in the third octet, wherein when the eighth field is not associated to any TCI state in the MAC CE, the UE ignores the eighth field.

Referring back to FIGS. 3 and 4, in one or more embodiments from the perspective of a UE, the device 300 includes a program code 312 stored in memory 310 of the transmitter. The CPU 308 could execute program code 312 to: (i) receive a MAC CE for associating at least one TCI state with at least one code-point of a TCI field in a DCI, wherein the MAC CE comprises at least: (ii) a first octet including a first TCI state ID field associated with a first TCI state and a first field indicating DL or UL for the first TCI state, (iii) a second octet including a second TCI state ID field associated with a second TCI state and a second field indicating DL or UL for the second TCI state, (iv) a third octet including a third field for the UE to determine whether the first TCI state and the second TCI state are associated with a same code-point or different code-points of the TCI field, and the CPU 308 further executes the program code 312 to (v) receive the DCI with a specific code-point of the TCI field, and (vi) determine one or more TCI states associated with the specific code-point based on the MAC CE. Moreover, the CPU 308 can execute the program code 312 to perform all of the described actions, steps, and methods described above, below, or otherwise herein.

Figure 39:
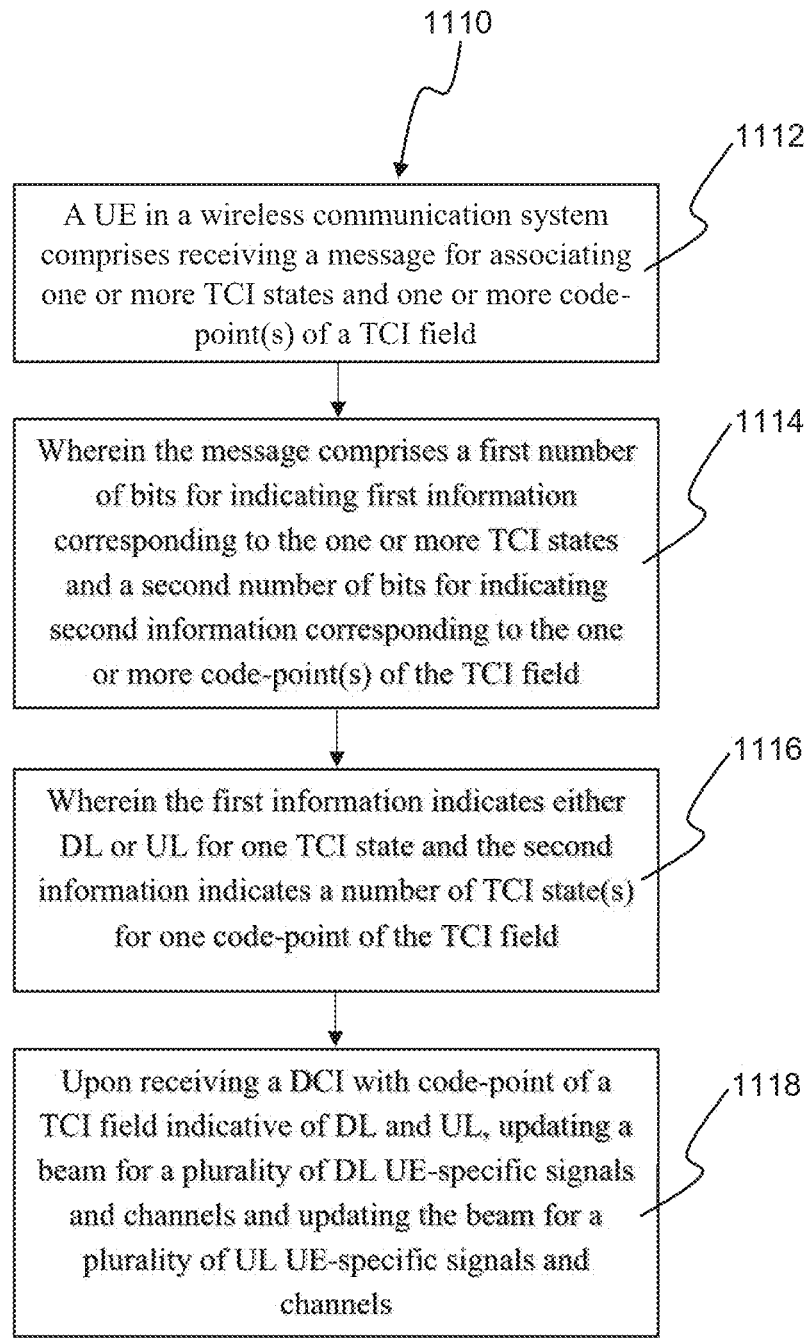
FIG. 39 is a flow diagram of a method of a UE receiving a message for associating one or more TCI states and one or more code-point(s) of a TCI field, in accordance with embodiments of the present invention.

Referring to FIG. 39, with this and other concepts, systems, and methods of the present invention, a method 1110 for a UE in a wireless communication system comprises receiving a message for associating one or more TCI states and one or more code-point(s) of a TCI field (step 1112), wherein the message comprises a first number of bits for indicating first information corresponding to the one or more TCI states and a second number of bits for indicating second information corresponding to the one or more code-point(s) of the TCI field (step 1114), and wherein the first information at least indicates either DL or UL for one TCI state and the second information at least indicates a number of TCI state(s) for one code-point of the TCI field (step 1116), and upon receiving a DCI with code-point of a TCI field indicative of DL and UL, updating a beam for a plurality of DL UE-specific signals and channels and updating the beam for a plurality of UL UE-specific signals and channels (step 1118).

In various embodiments, the first information for one TCI state is in a same octet as the one TCI state.

In various embodiments, the UE is configured with separate TCI states, and/or the UE is configured with a first TCI state pool and a second TCI state pool, wherein the first TCI state pool comprises TCI states corresponding to a DL channel and/or signal, and the second TCI state pool comprises TCI states corresponding to a UL channel and/or signal.

In various embodiments, for the first information being as DL for one TCI state, the TCI state is associated to the first TCI state pool, and/or for the first information being as UL for one TCI state, the TCI state is associated to the second TCI state pool.

In various embodiments, the second number of bits are in one or two specific octets, and/or the second number of bits, associated to one code-point, are not in a same octet for one or more TCI states associated to the one TCI code-point.

In various embodiments, the number of TCI state(s) is either one or two.

In various embodiments, the number of TCI state(s) is either one, two, three, or four.

In various embodiments, the message comprises a third number of bits for indicating third information corresponding to the one or more code-point(s) of the TCI field.

In various embodiments, the third information indicates either a single TRP or multiple TRPs, and/or the third information indicates whether there are at least two TCI states for DL in one code-point of the TCI field or two TCI states for UL in one code-point of the TCI field.

Referring back to FIGS. 3 and 4, in one or more embodiments from the perspective of a UE, the device 300 includes a program code 312 stored in memory 310 of the transmitter. The CPU 308 could execute program code 312 to: (i) receive a message for associating one or more TCI states and one or more code-point(s) of a TCI field, (ii) wherein the message comprises a first number of bits for indicating first information corresponding to the one or more TCI states and a second number of bits for indicating second information corresponding to the one or more code-point(s) of the TCI field, and (iii) wherein the first information indicates either DL or UL for one TCI state and the second information indicates a number of TCI state(s) for one code-point of the TCI field, and (iv) upon receiving a DCI with code-point of a TCI field indicative of DL and UL, update a beam for a plurality of DL UE-specific signals and channels and update the beam for a plurality of UL UE-specific signals and channels. Moreover, the CPU 308 can execute the program code 312 to perform all of the described actions, steps, and methods described above, below, or otherwise herein.

Referring back to FIGS. 3 and 4, in one or more embodiments from the perspective of a communication device, the device 300 includes a program code 312 stored in memory 310 of the transmitter. The CPU 308 could execute program code 312 to perform all of the described actions, steps, and methods described above, below, or otherwise herein.

In various embodiments, the communication device is a UE device.

In various embodiments, the communication device is a network device or node.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a User Equipment (UE) in a wireless communication system, comprising:
   receiving a Medium Access Control (MAC) Control Element (CE) for associating at least one Transmission Configuration Indicator (TCI) state with at least one code-point of a TCI field in a Downlink Control Information (DCI), wherein the MAC CE comprises at least:
      a first octet including a first TCI state identity (ID) field associated with a first TCI state and a first field indicating Downlink (DL) or Uplink (UL) for the first TCI state;
      a second octet including a second TCI state ID field associated with a second TCI state and a second field indicating DL or UL for the second TCI state; and
      a third octet including a third field for the UE to determine whether the first TCI state and the second TCI state are associated with a same code-point or different code-points of the TCI field;
   receiving the DCI with a specific code-point of the TCI field; and
   determining one or more TCI states associated with the specific code-point based on the MAC CE.

2. The method of claim 1, wherein the first field, the second field, and the third field are a 1-bit field.

3. The method of claim 1, wherein the third octet is before any of the first and second octets in the MAC CE, comprising a TCI state ID field, and/or the third octet is with a smaller octet index than any octet index of the first and the second octet.

4. The method of claim 1, wherein the first octet and the second octet are consecutive.

5. The method of claim 1, wherein when the UE determines that the first TCI state and the second TCI state are associated with a same code-point of the TCI field based on the third field, one of the first field and the second field indicates DL and another one of the first field and the second field indicates UL.

6. The method of claim 1, wherein in response to the specific code-point in the DCI, the UE updates at least one beam for receiving a plurality of DL UE-specific signals and channels based on the one or more TCI states, and/or the UE updates at least one beam for transmitting a plurality of UL UE-specific signals and channels based on the one or more TCI states.

7. The method of claim 1, wherein the MAC CE further comprises:
   a fourth octet including a third TCI state ID field associated with a third TCI state and a fourth field indicating DL or UL for the third TCI state; and
   a fifth field for the UE to determine whether at least the first TCI state, the second TCI state, and the third TCI state are associated with a same code-point or different code-points of the TCI field.

8. The method of claim 7, wherein when the UE determines that the first TCI state, the second TCI state, and the third TCI state are associated with a same code-point of the TCI field based on the fifth field, the first TCI state, the second TCI state, and the third TCI state are associated with different Transmission/Reception Points (TRPs).

9. The method of claim 7, wherein the MAC CE further comprises:
   a fifth octet including a fourth TCI state ID field associated with a fourth TCI state and a sixth field indicating DL or UL for the fourth TCI state; and
   a seventh field for the UE to determine whether the third TCI state and the fourth TCI state are associated with a same code-point or different code-points of the TCI field, wherein the seventh field is included in the third octet.

10. The method of claim 9, wherein the UE determines whether the first TCI state, the second TCI state, the third TCI state, and the fourth TCI state are associated with a same code-point or different code-points of the TCI field based on the fifth field.

11. The method of claim 1, wherein when the MAC CE further comprises an eighth field in the third octet, wherein when the eighth field is not associated to any TCI state in the MAC CE, the UE ignores the eighth field.

12. A method for a User Equipment (UE) in a wireless communication system, comprising:
   receiving a message for associating one or more Transmission Configuration Indicator (TCI) states and one or more code-points of a TCI field, wherein the message comprises a first number of bits for indicating first information corresponding to the one or more TCI states and a second number of bits for indicating second information corresponding to the one or more code-points of the TCI field, and wherein the first information at least indicates either Downlink (DL) or Uplink (UL) for one TCI state, and the second information at least indicates a number of TCI states for one code-point of the TCI field; and
   upon receiving a Downlink Control Information (DCI) with code-point of a TCI field indicative of DL and UL, updating a beam for a plurality of DL UE-specific signals and channels and updating the beam for a plurality of UL UE-specific signals and channels.

13. The method of claim 12, wherein the first information for one TCI state is in a same octet as the one TCI state.

14. The method of claim 12, wherein the UE is configured with separate TCI states, and/or
   the UE is configured with a first TCI state pool and a second TCI state pool, wherein the first TCI state pool comprises TCI states corresponding to a DL channel and/or signal, and the second TCI state pool comprises TCI states corresponding to a UL channel and/or signal.

15. The method of claim 14, wherein for the first information being as DL for one TCI state, the TCI state is associated to the first TCI state pool, and/or
   for the first information being as UL for one TCI state, the TCI state is associated to the second TCI state pool.

16. The method of claim 12, wherein the second number of bits are in one or two specific octets, and/or the second number of bits, associated to one code-point, are not in a same octet for one or more TCI states associated to the one TCI code-point.

17. The method of claim 12, wherein the number of TCI states is either one or two.

18. The method of claim 12, wherein the number of TCI states is either one, two, three, or four.

19. The method of claim 12, wherein the message comprises a third number of bits for indicating third information corresponding to the one or more code-points of the TCI field.

20. The method of claim 19, wherein the third information indicates either a single TRP or multiple TRPs, and/or the third information indicates whether there are at least two TCI states for DL in one code-point of the TCI field or two TCI states for UL in one code-point of the TCI field.

* * * * *